(12) United States Patent
Liang et al.

(10) Patent No.: US 7,330,176 B2
(45) Date of Patent: *Feb. 12, 2008

(54) METHOD FOR DISPLAYING FLIPPING PAGES VIA ELECTROMECHANICAL INFORMATION BROWSING DEVICE

(75) Inventors: Chee Cheng J Liang, Singapore (SG); Jason Bradley, Oakley (AU); Seng Beng Ho, Singapore (SG)

(73) Assignee: E-Book Systems Pte Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 11/350,762

(22) Filed: Feb. 10, 2006

(65) Prior Publication Data

US 2006/0125802 A1 Jun. 15, 2006

Related U.S. Application Data

(63) Continuation of application No. 10/142,858, filed on May 13, 2002, now Pat. No. 7,071,915.

(60) Provisional application No. 60/318,638, filed on Sep. 13, 2001.

(51) Int. Cl.
*G09G 5/00* (2006.01)

(52) U.S. Cl. ........................ 345/156; 345/901

(58) Field of Classification Search ................ 345/156, 345/173, 901
See application file for complete search history.

(56) References Cited

U.S. PATENT DOCUMENTS

| 5,237,651 | A | 8/1993 | Randall |
| 5,463,725 | A | 10/1995 | Henckel et al. |
| 5,467,102 | A | 11/1995 | Kuno et al. |
| 5,500,929 | A | 3/1996 | Dickinson |
| 5,802,516 | A | 9/1998 | Shwarts et al. |
| 5,900,876 | A * | 5/1999 | Yagita et al. ................ 715/776 |
| 5,909,207 | A | 6/1999 | Ho |
| 6,064,384 | A | 5/2000 | Ho |
| 6,229,502 | B1 | 5/2001 | Schwab |
| 6,320,591 | B1 | 11/2001 | Griencewic |
| 6,407,757 | B1 | 6/2002 | Ho |
| 6,486,895 | B1 | 11/2002 | Robertson et al. |
| 6,496,803 | B1 | 12/2002 | Seet et al. |
| 6,747,680 | B1 | 6/2004 | Igarashi et al. |
| 6,943,773 | B2 * | 9/2005 | Wong et al. ................. 345/156 |
| 7,136,061 | B2 * | 11/2006 | Cordner ...................... 345/419 |
| 2003/0052900 | A1 | 3/2003 | Card et al. |
| 2004/0039750 | A1 | 2/2004 | Anderson et al. |

* cited by examiner

*Primary Examiner*—Ricardo Osorio
(74) *Attorney, Agent, or Firm*—Oblon, Spivak, McClelland, Maier & Neustadt, P.C.

(57) ABSTRACT

A method for displaying flipping pages of an electronic book via an electromechanical information browsing device that controls page flipping actions of information displayed as an e-book on a display device. The browsing device includes a controller that provides tactile feedback so as to lessen the user-interface differences between conventional books and e-books. Sensors and control mechanisms in the controller generate a series of electrical signals that are interpreted by the computer that displays the e-book to control various browsing operations, such as flipping pages, controlling a rate of page flipping, jumping to pre-set locations in the e-book, etc.

19 Claims, 44 Drawing Sheets

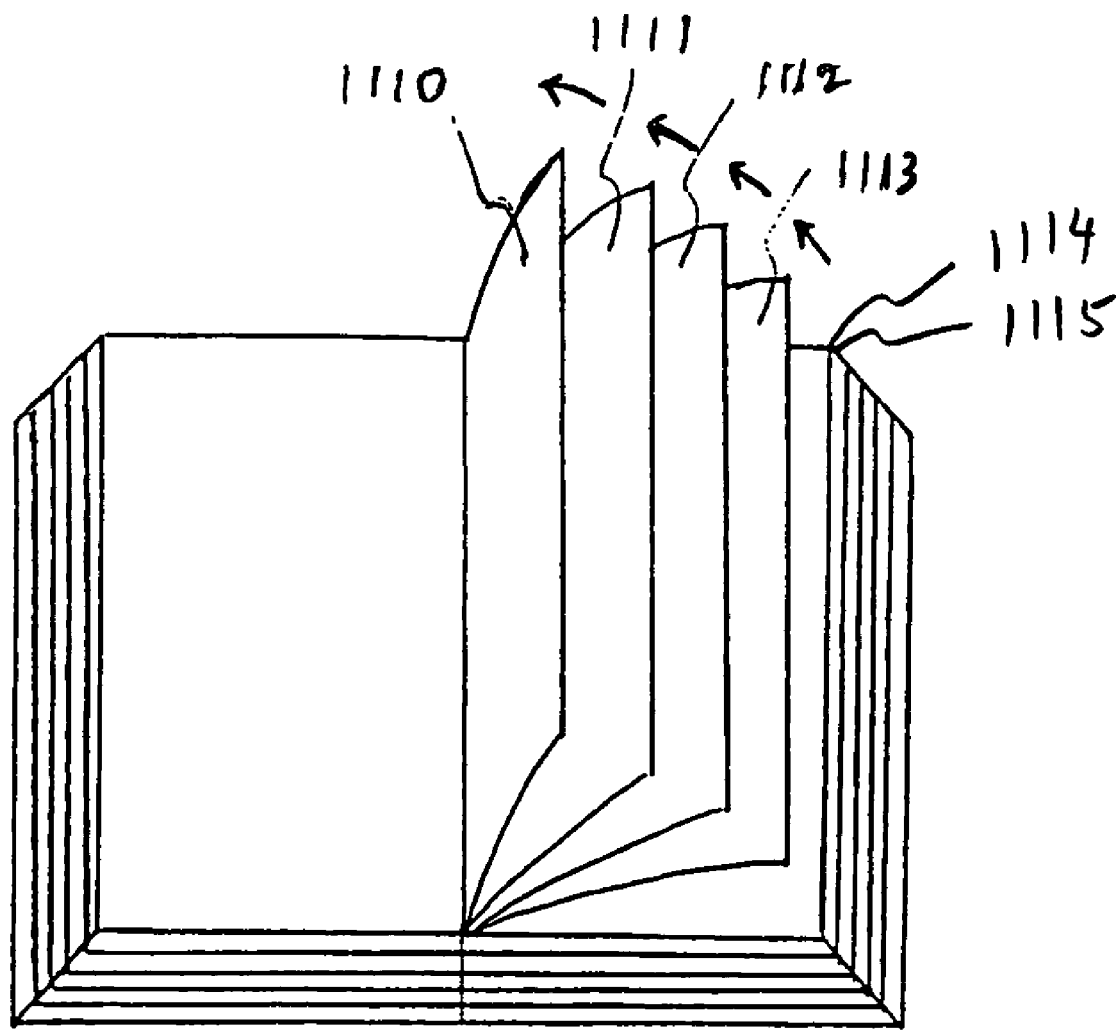
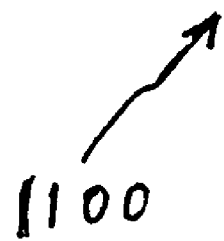
Figure 19

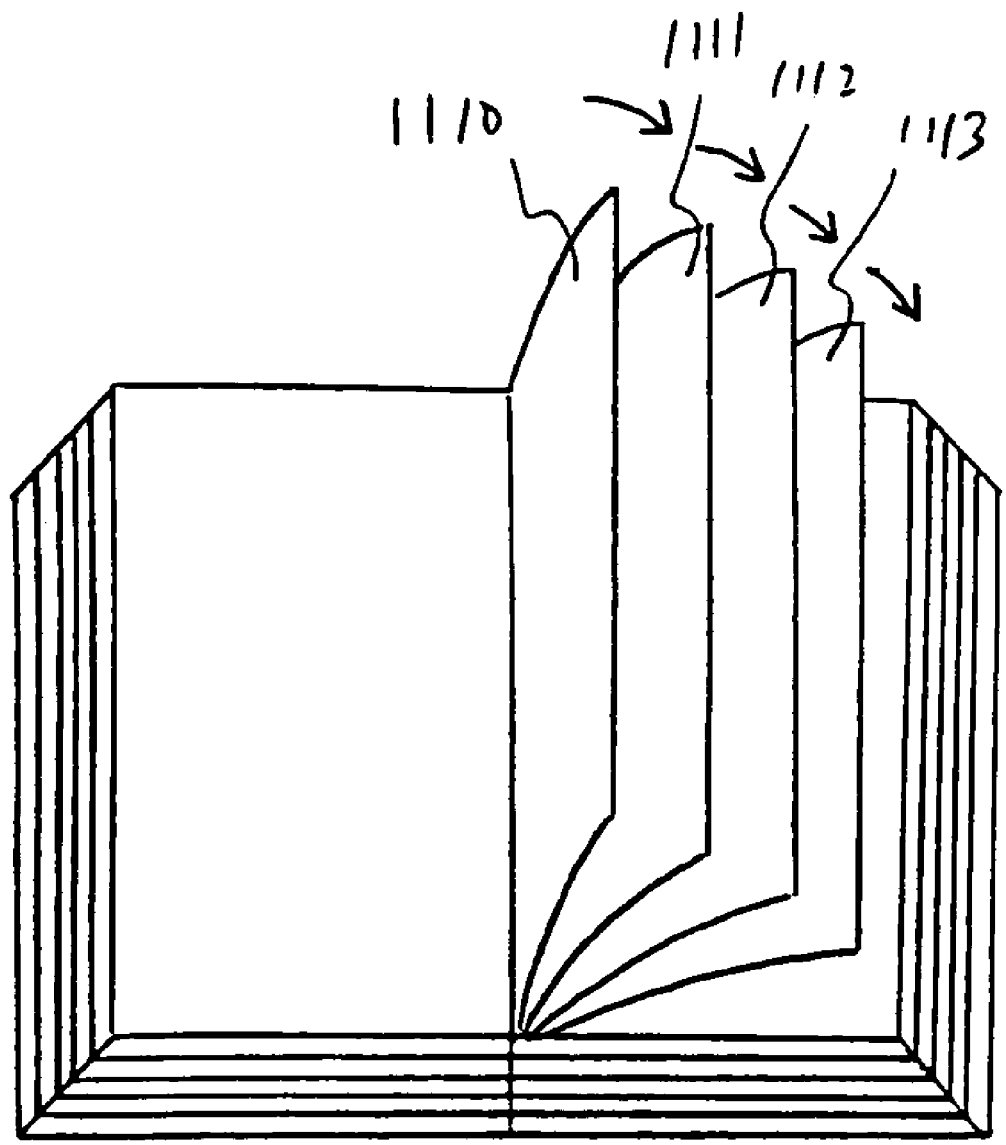
Figure 20

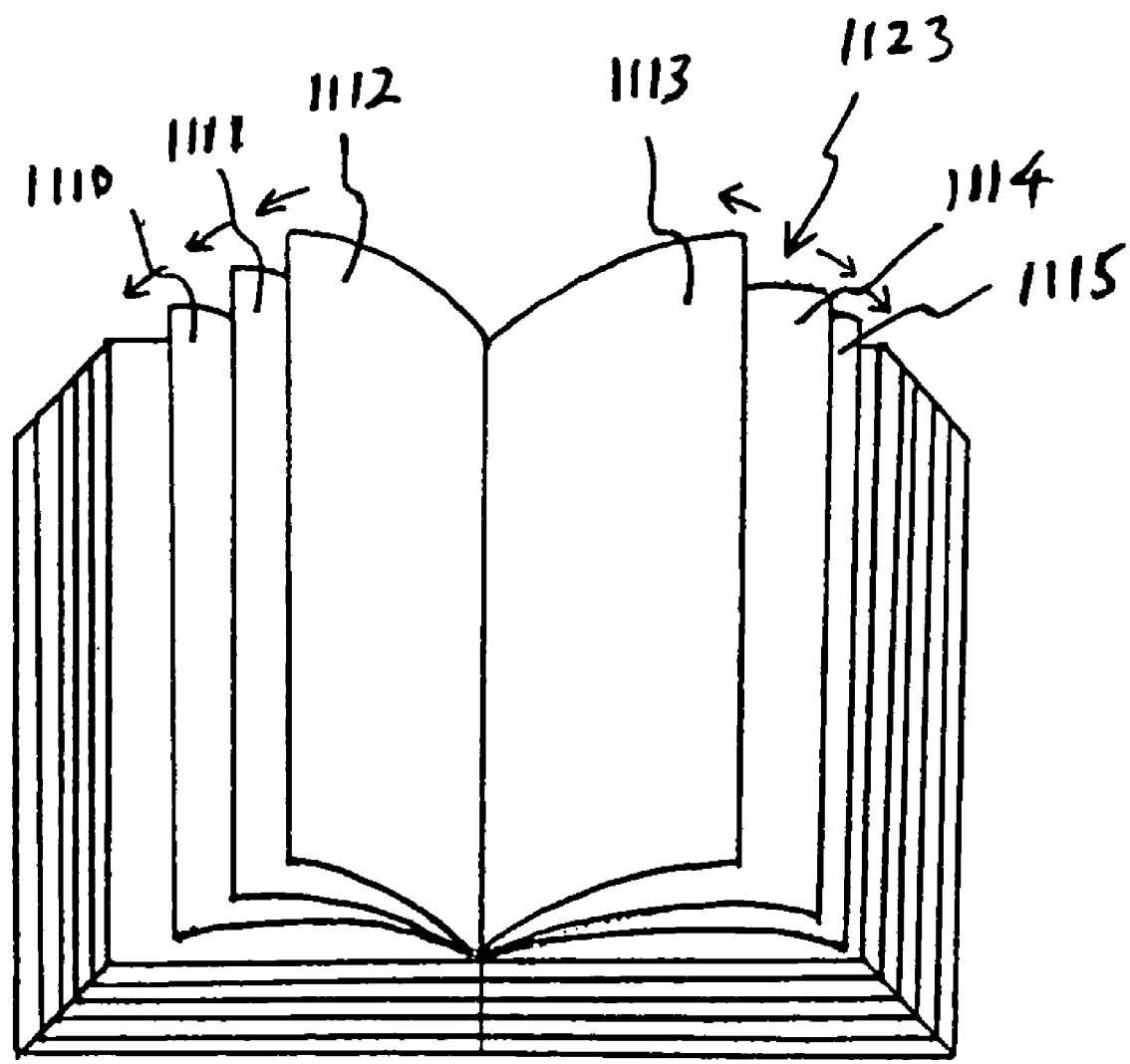
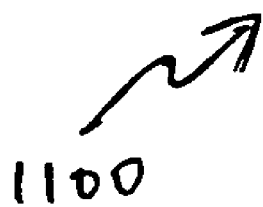
Figure 24

BASIC AND COMPLEX FLIPPING ACTIONS

1901 Direction of Movement
1902 Speed of Movement
1903 Select to Jump to a Specified Point in Document
1904 Jump to a Specified Point in Document
1905 Permanent Bookmarking
1906 Finger Bookmarking
1907 Launch a Single Flipping Page
1908 Launch Multiple Flipping Pages at a Specific Interval (Speed)
1909 Reverse Direction of Last Trailing Page ("Opening Up")
1910 Reverse Direction of Last N Trailing Pages ("Opening Up")
1911 Reverse Direction of Any Selected Group of Flipping Pages ("Opening Up")
1912 Freeze One or More Than One Flipping Pages in Mid-flip
1913 Unfreeze Frozen Pages and Let Pages Continue to Flip in Directions Prior to Freezing
1914 Unfreeze Frozen Pages and Let Pages All Flip in the Same Direction
1915 Unfreeze Frozen Pages and Some Pages Flip to Left Side and Some to Right Side of Book
1916 Unfreeze Frozen Pages and Let Subgroups of Pages Flip in Different Directions
1917 Jump and Make a Thick Collection of Pages Flip Together
1918 Launch Flipping Pages While Thick Collection of Pages is Flipping
1919 Launch One or More Other Thick Collections of Pages While Other Pages are Flipping
1920 Select to Hold a Page
1921 Move Held Single Page in Any Desired Direction at Desired Speed
1922 Select to Hold a Thick Collection of Pages
1923 Move Held Single Thick Collection of Pages in Any Desired Direction and Speed
1924 Select to Hold More Than One Page or Thick Collection of Pages
1925 Move Held Pages and Thick collections of Pages in Any Desired Direction and Speed
1926 Hold a Single Page in Mid-flip and Collect Other Pages That Flip Onto It
1927 Hold a Single Thick Collection of Pages in Mid-flip and Collect Other Pages That Flip Onto It
1928 Hold a Single Page or a Thick Collection of Pages in Mid-flip and Execute All (All the Above as well as This) Page Flipping Actions Between It and One of the Thicknesses on the Side of the Book
1929 Hold Any Two Pages or Thick Collections of Pages In Mid-flip and Execute All (All the Above as well as This) Page Flipping Actions Between Them
1930 Hold a Single Thick Collection of pages in Mid-flip While Releasing One or More Pages From the Collection
1931 Select a Desired Split Point on a Held Single Thick Collection of Pages in Mid-flip and Split the Collection of Pages into Two Separate Collections of Pages.

Figure 39

METHOD FOR DISPLAYING FLIPPING PAGES VIA ELECTROMECHANICAL INFORMATION BROWSING DEVICE

CROSS REFERENCE TO RELATED PATENT DOCUMENTS

This application is a continuation application of Ser. No. 10/142,858, filed May 13, 2002, pending, and claims priority from parent provisional application Ser. No. 60/318,638 filed on 13 Sep. 2001. This application contains subject matter related to that described in U.S. Pat. No. 5,909,207, U.S. Pat. No. 6,064,384, copending U.S. patent applications, Ser. No. 09/571,361, filed May 15, 2000; Ser. No. 09/617,043, filed Jul. 14, 2000; Ser. No. 09/686,902, filed Oct. 12, 2000, now U.S. Pat. No. 6,496,803; and Ser. No. 09/686,965, filed Oct. 12, 2000, now U.S. Pat. No. 6,725,203, each of which being incorporated herein by reference.

BACKGROUND OF THE INVENTION

1. Field of the Invention

The present invention relates to a computer hardware and software system including a computer input device that can be operatively combined with several methods of display on a computer screen under software and hardware control for the purpose of browsing through, information, such as documents stored in a computer readable memory. The invention facilitates the browsing of a document stored in a computer readable memory in such a way that it allows a rapid view of what contents are present and the organization of the material in the document, as well as rapid access to the items in the document involved. Specifically, the present invention relates to mechanical browsing devices that provide a mechanical interface to a users' fingers in such a way that users can receive force and frictional feedback so that the control of the browsing process can be effected at high speed and accuracy and without unnecessary stress to the fingers and hands. Another aspect of the present invention concerns the complex displays and manipulations of flipping pages in a virtual book effected by the mechanical browsing device or other devices.

2. Description of the Background

Currently, the method that is mainly used for viewing documents stored in a computer is through a computer monitor screen. For documents that are longer/larger than can be contained within one screen, a user input device is provided to scroll the document up and down or to jump to a particular point in the document (through the use of, for example, a "mouse" coupled with scroll bars at the edges of the document displayed on the screen or through the use of hypertext links).

However, as recognized by the present inventors most people do not find this a particularly convenient way to view a document, as compared with a book. That this is true is evidenced in that despite the fact that the computer has been in increasing use, there is not only no corresponding reduction in paper use, but an increase in paper quantity is required to print what is conveniently stored in a computer that can be seemingly easily and flexibly manipulated for viewing. Sometimes the printed version of the information involved is necessary, like in the case of printing a picture on a sheet of paper to be pasted on some surface (e.g., a wall), or in the case of the convenience of having a relatively light, hardy paperback book for reading in almost any possible situation and location, but there are times when a reader is quite happy to sit at a desk in front of a desktop computer or handle a notebook computer away from the desk, and yet the reader would still prefer a printed version of the document in a hand-held format. This is especially true in the case of looking through manuals, including software manuals, to understand how to operate a device or software application. The irony is that computer software packages usually come with thick and heavy manuals containing information that can easily be stored on a lightweight CD-ROM, and even if the manuals are sometimes dispensed in the form of a CD-ROM, more often than not people would print them out into a hard-copy format in order to facilitate reading.

What is involved when one interacts with the printed material in a book is a subtle and complicated process. To start with, material in a book is presented in a sequential order, with a continuity of material from page to page, and there is also a hierarchical structure in the material presented (as the material is organized into chapters, sections, subsections, etc.) because ideas in the material are related to each other in some kind of conceptual hierarchy. The human perceptual system inputs data in a sequential manner, and after a book is read from the beginning to the end in a sequential fashion, the brain then recreates the conceptual hierarchy after viewing the material involved. However, very often one does not read a book (or input the material involved) from the beginning to the end because (a) one wants to have an overview of the material present; (b) one is searching for something of interest to him/her; or (c) one is interested in reading only portions of the book (in the case of, say, reading the manual to understand how to operate something). In these cases, one browses through the subject book to find the material of unique interest to that reader.

Two basic things are achieved in the browsing process. First, the browser has a glimpse of what are the contents of the book document. Second, the browser has an idea of approximately where the items of interest are so that the browser can (a) return to look for them later when needed, and (b) have an understanding of the relationships between the material currently being viewed and other material (i.e., an understanding of the hierarchical structure involved). When browsing a book document, many finger-operations are required of the browser in order to flip through the pages and, together with the inherent sequential order imposed by the pages, very quickly allow the browser to have an understanding of the nature, location and organization of the material involved.

In the process of browsing through a book, one can perform the following operations:
  (a) flip through the pages at varying speeds depending on the level of detail at which one wishes to view the material in the book;
  (b) jump to the approximate location of the item of interest;
  (c) change the direction of flipping (forward or backward) very rapidly because
    (i) one would like to compare and contrast material on different pages,
    (ii) after jumping to an approximate location of some items of interest one would like to find their exact locations, or
    (iii) one is unsure of where the item of interest is and is in the process of searching for it; and
  (d) mark the locations of some pages of interest that one may want to later return.

All these operations are performed very rapidly with the fingers interacting with the flipping pages and with minimal unnecessary movements of the fingers and hands. Interestingly, a book/magazine with soft and flexible pages is harder to handle because more finger and hand movements are needed to browse through it, while books with stiff pages can be browsed with almost no movement of the hand.

In currently available methods of browsing through documents stored in a computer, e.g., the use of a mouse combined with scroll bars and buttons on the computer screen, more movements of the hands are necessary to effect the various operations described above. Also, fine control of the hand or fingers (depending on whether the mouse uses hand movement to move the cursor on the screen or finger movement like in the case of a track ball) is necessary to position the cursor on the screen at the required places. The process is both lengthy and clumsy. The lengthiness of the process taxes the human short term memory's ability to remember items encountered in the recent past for the purpose of establishing the relationships between items and the clumsiness of the process creates distraction and interferes with the short term memory process, a well known effect in perceptual psychology.

Because material in a book is organized into pages, it also enhances the ability of the reader to better remember the location of various portions of the material involved. Also, unlike the process of scrolling through a document on a screen like what is normally done in a word-processor, wherein the contents become a blur and reading is impossible, when one moves through the material in a book through flipping, one is still able to read at least the approximate contents, if not the details. It is due to these features that a person browsing through a book can acquire a good understanding of its contents, the location of specific items and organization of the material.

It is because of the reasons set forth above, people still prefer to read a book in their hands, rather than a document image displayed on a computer screen using currently available methods.

U.S. Pat. No. 5,467,102 (Kuno et al.) discloses a device for document viewing that consists of two display screens. One of the purposes of using two display screens is to allow the user to display two different pages from the document so that they can be read side-by-side (e.g., a diagram and its textual explanation). Another purpose is to allow a large picture to be displayed simultaneously on both pages. The Kuno et al. device allows users to change the speed of movement through the document through a pressure sensor—the more pressure applied, the faster the pages in the document are moved through. The Kuno et al. device also allows the document to be viewed in the forward or backward direction by pressing on a forward sensor area or a reverse sensor area respectively. One can also select a page to jump to by pressing on an icon displayed on the screen. However the Kuno et al. device still does not provide the same convenience as browsing through a book, primarily because when switching between the operations for different controls—the speed of movement through the document, the change of direction of viewing, and the jumping to different parts of the document—there are a lot more hand and finger movements than is the case in manipulating a physical book. Moreover, the Kuno et al. device is a specialized, relatively costly device with sensors and hardware built onto two display screens, whereas the present inventor recognizes that a lower cost and more practical device would be one that adds modularly to the existing computer system.

Currently, there are also computer mice that can eliminate the above-mentioned problem of positioning cursor on the computer screen with a conventional mouse (i.e., fine control of the hand or fingers is needed). These mice allow the user to specify "hot locations" on the screen on which the cursor "homes onto" with less fine control than conventional mice. Furthermore, a subset of these mice can generate "vertical only" or "horizontal only" movement of the cursor so that the scrolling process requires less fine control of the muscle than is required with a conventional mouse. These mice eliminate some, but not all, of the problems associated with the conventional methods of computer input as far as computer-based document browsing is concerned.

In U.S. Pat. No. 5,417,575 (1995) McTaggart discloses an electronic book that comprises laminated sheets bound together in the form of a book. On each of these sheets, printed material is arranged on the top layer and below that layer is an electronic backdrop containing thin light-emitting diodes (LED's) and pressure sensitive switches affixed onto a backing sheet. The LED's generate visual signals that can be seen through the top layer for the purpose of highlighting parts of the printed material. The pressure switches, positioned under certain items in the printed material, are for the purpose of sensing the user's selection of those items. A speaker is also provided on the book to generate audio signals for explaining the text or giving the user audio feedback. Contact or photo-sensitive switches are also embedded in the pages to allow the electronic circuits to know which pages are currently being viewed, so that the appropriate audio and visual signals can be generated. Even though this apparatus is in a form that allows a person to handle it like handling a typical book, with visual and audio enhancements of the printed material as well as facilities that accept the user's feedback, it is basically a hard-wired device that is not reprogrammable and different hardware has to be configured for books with different contents. No provision is available for downloading document files from a computer for display on the electronic book nor is the electronic book able to display any arbitrary document file. This device is hence not suitable for browsing through documents stored in a computer.

U.S. Pat. No. 5,909,207 (Ho) discloses a computer-based system that allows users to view and manipulate documents in the form of an electronic virtual book that addresses the above problems in browsing information in the electronic medium. This virtual book system simulates the paper book very closely and has two major components. One is the representation of the paper book on the computer screen, complete with realistic flipping pages and thickness representation. The other is the use of a browsing device that allows 1. rapid change of direction of flipping, 2. rapid change of speed of flipping, 3. selection and jumping to any desired page, and 4. bookmarking of the pages. The browsing device allows one to use the fingers to manipulate the pages in the book much in the same way as in the case of the paper book. Therefore, the virtual manipulation of the pages together with the book image on the screen constitute a virtual book system. This virtual book system improves on the methods used in current electronic means of information browsing in a very significant way such that the ease of browsing information can approach that obtainable with a paper book. This allows users to be able to quickly browse through a large number of pages (perhaps thousands of pages) of information and obtain the idea of the structure and contents involved and hence a good overview of the entire collection of material in the "virtual book". Other than being able to have a good idea of the structure and contents of the material involved, the process of browsing through the material presented in the form of a virtual book much like in the case of the paper book also facilitates subsequent searches for items in the material.

In U.S. Pat. No. 5,909,207 (Ho) the virtual book browsing device that mainly includes a pressure and position sensor. The pressure the finger exerts on the pressure sensor controls the speed of flipping through the pages of the virtual book. The movement of the finger on the position sensor on the browsing device in the virtual book system corresponds to the movement of the finger on the thickness of the paper book to select a page to jump to. The combination of the pressure and position sensor therefore allows one to rapidly browse through the virtual book.

However, the method of speed and page-jumping control in U.S. Pat. No. 5,909,207 (Ho) suffers from one shortcoming. Because an electronic pressure and position sensor is used, it is not able to provide the user with force and frictional feedback. Because our motor/muscular system is adapted to function in the real physical world, it expects resistance when it exerts forces on objects. This allows it to precisely determine the amount of force to exert in order to bring about certain desired consequences. It is because of this nature of the motor/muscular system that despite the fact that electronic touch pads have been widely in use on, say, notebook computers to allow one to use the finger to control the "mouse" cursor on the computer screen, many people still prefer to use, say, a physical "mouse" to control the cursor. The physical mouse, when moving on a table top, encounters friction and this information is fed back to the motor system controlling it through the fingers, hand and arm. This information facilitates the motor system's sending the right kind of neural signals to control the fingers/hand/arm that in turn control the mouse to position the cursor very rapidly and accurately on the computer screen, with minimum stress to the neural system. An analogous situation exists in the case of the virtual book system of U.S. Pat. No. 5,909,207 (Ho). A mechanical browsing device that feeds back information on force and friction will bring about highest accuracy and speed and minimum stress to the browsing process for the virtual book.

Also, presently, the methods for manipulating flipping pages in a virtual book that have been described in a number of patents (e.g., U.S. Pat. No. 5,909,207, Ho) are confined to mainly very simple and basic manipulations of single or multiple flipping pages. For example, when multiple pages are being flipped across the computer screen, there is no means to control these pages individually. However, when one or more pages are flipping across a virtual book, a lot more information can be obtained from them (e.g., on the contents and structure of the virtual book) and in a quicker way, and the visual search process for desired items in the virtual book can be made a lot more efficient if the user is allowed to manipulate these flipping pages in more complex and flexible ways.

Therefore, the inventor has identified there exists a need for a mechanical browsing device for the virtual book system for rapid browsing of information and there also exists a need for more complex methods of displaying and manipulating the flipping pages on a virtual book to better obtain information from the virtual book.

SUMMARY OF THE INVENTION

In view of the aforementioned short-comings of presently available schemes for constructing a browsing device to be used in conjunction with a computer and/or a handheld electronic device for the purpose of browsing through electronic documents, one objective of the present invention is to provide a mechanical browsing device to provide better accuracy and speed of control as well as lower stress to the motor neural system that controls it.

Another objective of the present invention is to provide a mechanical browsing device that exploits the use of finger operations normally involved in browsing through a book, namely, the change of speed of movement through the document involved, the change of direction of movement through the document, the jumping to other portions of the document, and the bookmarking of pages (e.g., when a page is bookmarked, it can be returned/jumped to later very quickly by using the controls operated by the fingers).

A further objective of the present invention is to provide a number of different mechanical browsing devices that provide different mechanical sensor interfaces for the control of the user's finger or other instruments. For example, the mechanical control interface can provide a sliding motion effected in x-, y- and z-directions, or a rocking or rotating motion effected around some predetermined axes.

Still a further objective of the invention is to provide a dual-resistance method for the mechanical browsing device's actions.

Another objective of the invention is that the positioning and design of the controls for the above-mentioned operations performed by the fingers are such that they allow almost no movement of the hand and minimal movements of the fingers, thus maximizing the ease of browsing through the stored document. The dexterity of the human fingers is to be fully exploited for these controls.

Another objective of the invention is to provide a means to display, on the computer screen, the document to be browsed through using the browsing device. The display is in the form of a computer book together with showing the thicknesses of material in the document before and after the currently viewed material, showing of the bookmarks, and showing, on the thicknesses, of the location of the pages that would be jumped to at any given time if jumping were to be effected.

Another objective of the invention is to provide a means to display, on the computer screen, a number of flipping pages under the control of the browsing device.

Yet another objective of the invention is to provide a means to display, on the computer screen, the change of direction of flipping of selected groups of single or collections of flipping pages in the computer book.

Another objective of the invention is to provide the means to display, on the computer screen, the freezing and unfreezing actions of a number of flipping pages in the computer book.

Still another objective of the invention is to provide the means to display, on the computer screen, the launching and flipping of a sequence of single pages and/or collections of pages.

Another objective of the invention is to provide the means to display, on the computer screen, the picking up and flipping about of a single page or a collection of pages.

Another objective of the invention is to provide the means to display, on the computer screen, the picking up and holding of a single page or a collection of pages followed by the flipping and collection of a number of other pages onto this held page.

Yet another objective of the invention is to provide the means to display, on the computer screen, the creation of "sub-books" within a computer book within which the usual browsing and manipulation of pages can be carried out.

Another objective of the invention is to provide a method, using the browsing device or other means, for launching a number of flipping pages on the computer book, changing the direction of flipping of selected groups of single or collections of flipping pages in the computer book, actuating the freezing and unfreezing actions of a number of flipping pages in the computer book, launching and flipping of a sequence of single pages and/or collections of pages, picking up and flipping about of a single page or a collection of pages, picking up and holding of a single page or a collection of pages followed by the flipping and collection of a number of other pages onto this held page, and creating "sub-books" within a computer book within which the usual browsing and manipulation of pages can be carried out.

Still another objective of the invention is to provide a computer touch screen method to control the various complex flipping actions.

Another objective of the invention is to provide the means to display, on the computer screen, both sides of a flipping page in a computer book.

Another objective of the invention is to provide a means to display, on the computer screen, the fine control mechanisms for controlling a cursor used for selecting and jumping to a desired page.

Another objective of the invention is to provide a method for the fine control mechanisms for controlling a cursor used for selecting and jumping to a desired page.

Still another objective of the invention is to provide a means to display, on the computer screen, a computer book whose one side is bent in such a way as to reduce the amount of space needed to display the computer book on a computer screen.

Another objective of the invention is to use the above-mentioned browsing facility in conjunction with other software that can reorganize the material in the document involved to facilitate browsing/viewing—for example, the positioning of material for comparison side by side on the pages currently being viewed.

Another objective of the invention is to use the above-mentioned browsing facility in conjunction with software that can highlight selected portions of the material or annotate on the pages in the document involved to facilitate browsing/viewing/reading.

Yet another objective of the invention is to provide the above-mentioned browsing facility to a word processor to facilitate the entering, processing, and viewing/browsing of material in a word processor.

Another objective of the invention is to provide the above-mentioned browsing facility to any software in which information cannot be fitted within one computer screen for viewing or manipulating.

Yet another objective of the invention is to provide a new metaphor—the "library metaphor"—to the computer operating system's human interface in which information on the computer screen which is traditionally presented in the form of windows can now be presented in the form of "books".

The above-mentioned objects can also be achieved by providing a browsing device for browsing through document that includes, a top surface, a sensor surface and a bottom surface. A mechanical sensor on the sensor surface detects x-, y-, z, translational movements of a finger or instrument or its rocking and rotational movement around some specific axes. The browsing device also includes four buttons/on-off switches on the bottom surface, and four additional buttons/on-off switches on the said top surface, each of which is operated by the fingers. An electrical circuit converts the force and position of the finger on the sensor area as detected by the force and position sensors on that area into electrical forms and outputs them. The electrical circuit also outputs the on/off states of the four buttons/on-off switches on the bottom surface, and four additional buttons/on-off switches on the said top surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 19 is a top perspective view of a computer book at the beginning of some complex flipping processes.

FIG. 20 is a top perspective view of a computer book showing the change of direction of all the flipping pages.

FIG. 24 is a top perspective view of a computer book showing the change of direction of the trailing page in a right subgroup of flipping pages.

FIG. 39 is a list of the basic and complex flipping actions according to the present invention.

DESCRIPTION OF THE PREFERRED EMBODIMENTS

Figure 1:
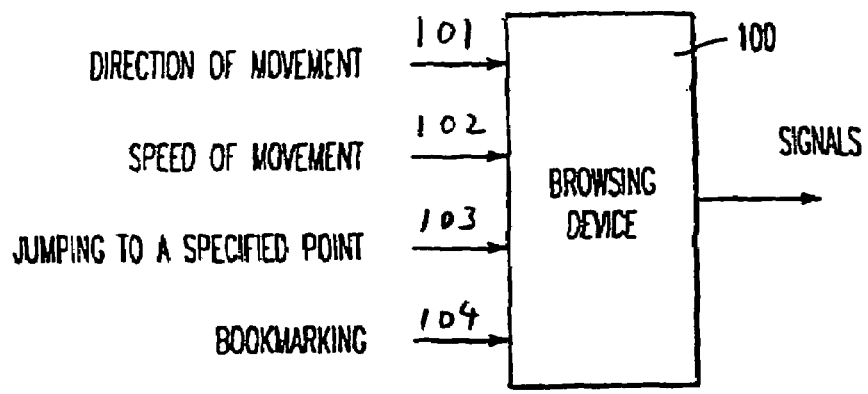
FIG. 1 is the block diagram of the browsing device according to the present invention, detailing input commands and output signals.

Referring now to the drawings, wherein like reference numerals designate identical or corresponding parts throughout the several views, and more particularly to FIG. 1 thereof, which depicts the browsing device 100 according to the present invention that can be used in conjunction with existing computer systems for the purpose of browsing through documents or any information stored in the computer. Four browsing commands (101-104) are input and detected by the browsing device 100. These commands include the following: (a) direction of movement command 101, specifying whether a movement in a forward direction or in a backward direction through the document is to be performed; (b) speed of movement command 102, specifying a speed of the movement described in (a); (c) jump to a specified point command 103, jumping to a specified location in the document or information involved; and (d) bookmarking command 104, specifying that certain portions of the document or the information involved is to be bookmarked. Based on these commands, signals are generated and output to effect the necessary operations in a computer system (e.g., computer 199 in FIG. 4) attached to the browsing device 100.

Figure 2:
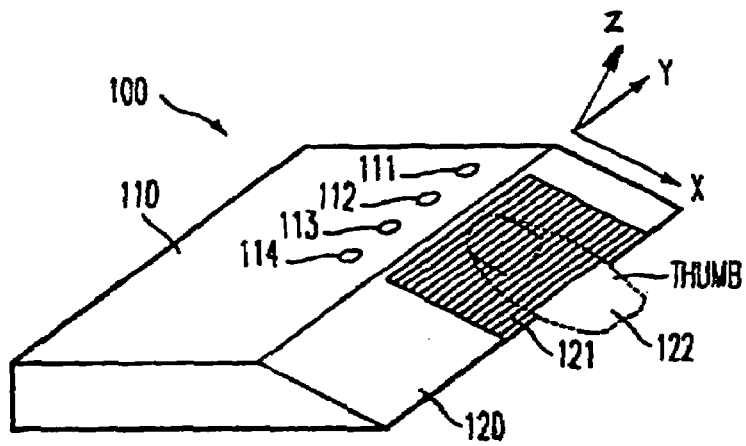
FIGS. 2-3 are schematic perspective views of a first embodiment of the browsing device.
Figure 3:
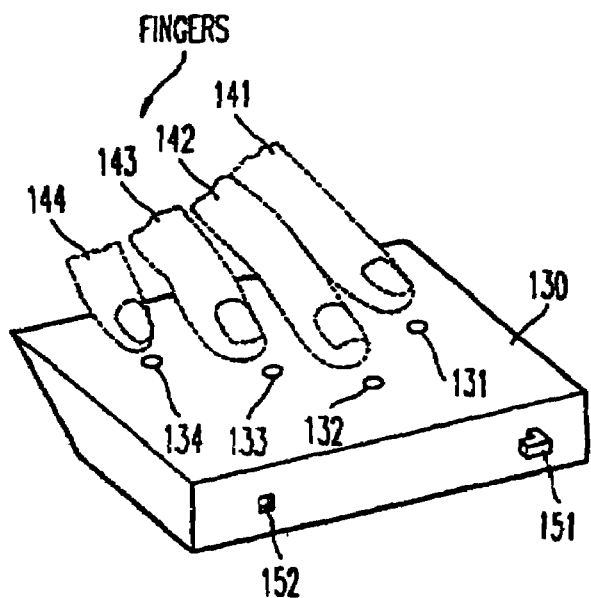

FIGS. 2-3 depict one embodiment of the primary browsing device 100 according to the present invention. The browsing device 100 includes a slanted surface 120, extending from a top surface 110 of the browsing device 100. The slanted surface 120 supports a user's thumb 122 on which to rest, although the user may use another instrument or finger as well. During operation, four other fingers 141-144 are placed on a bottom surface 130 of the device, opposed to the thumb 122.

On the slanted surface 120 a browsing controller 121 (the construction of which will be described below) detects signals to activate one or more of the browsing commands specified above. Henceforth the direction of the slant is referred to as an x-direction, as shown in FIG. 2, where the positive x-direction points away from the edge that adjoins the top surface 110 and the slanted surface 120. The positive z-direction is defined to be a direction perpendicular to the slanted surface 120 and pointing "upward" from the slanted surface 120 as shown in FIGS. 2-3.

As shown in FIG. 3, four buttons/switches 131-134 are placed on the bottom surface 130, within easy reach of the four fingers (141-144) during those operations when these fingers (141-144) are placed on the bottom surface 130. On the top surface 110 of the device 100, another four buttons/switches (111-114) are placed, preferably parallel to the edge adjoining the top surface 110 and the slanted surface 120, as shown in FIG. 2. The buttons (131-134, and 111-114) on the bottom and top surfaces (130 and 110 respectively) are for the purposes of bookmarking. The use of these buttons (131-134, 111-114) depends on the particular configuration in which the browsing device 100 is used and has been described in U.S. Pat. No. 5,909,207 (Ho) and U.S. Pat. No. 6,064,384 (Ho), the entire contents of each of which being incorporated herein by reference. Other methods of using these buttons are described below.

Latching mechanisms 151 and 152 allow two pieces of the primary browsing device 100 to be joined together.

Figure 4:
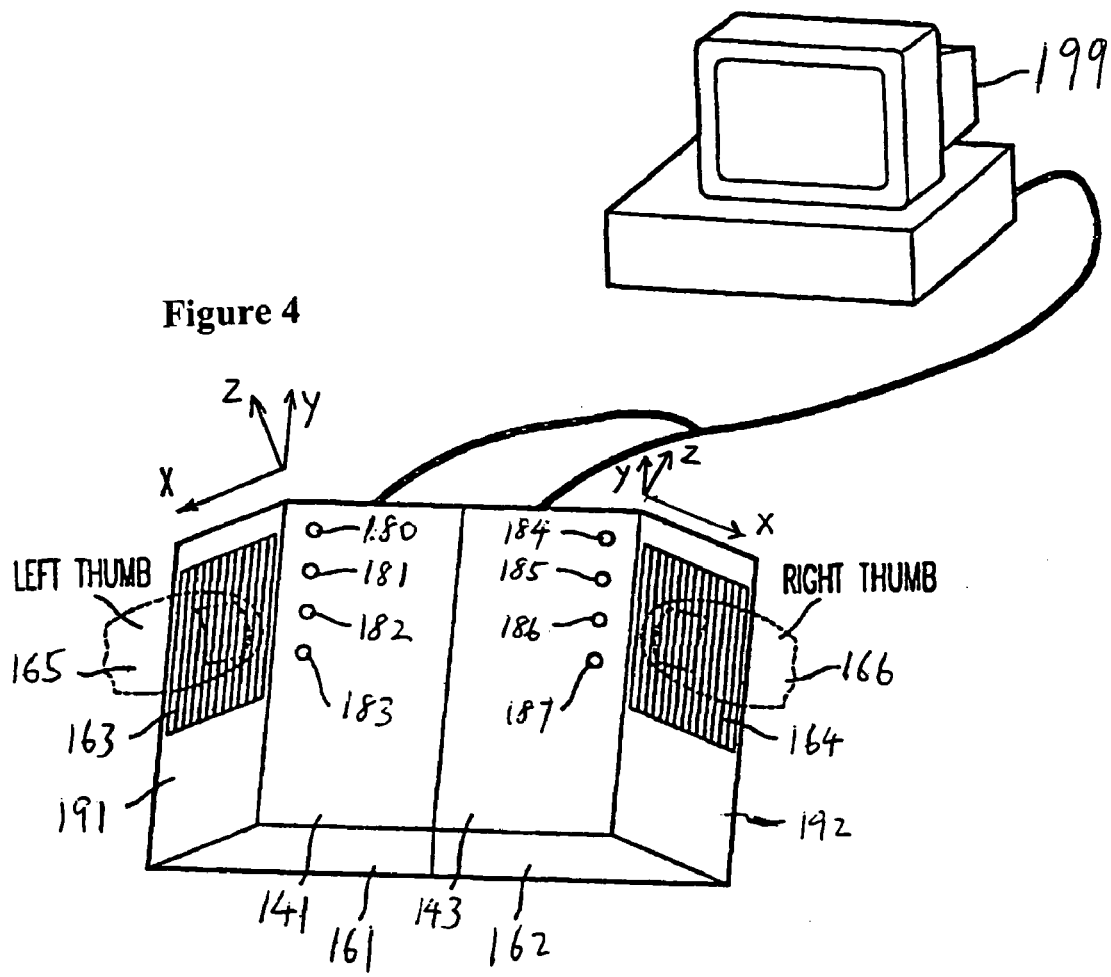
FIGS. 4-5 are respective top and bottom perspective views of the browsing device configured from a left-hand and a right-hand piece to be used in conjunction with a computer.
Figure 5:
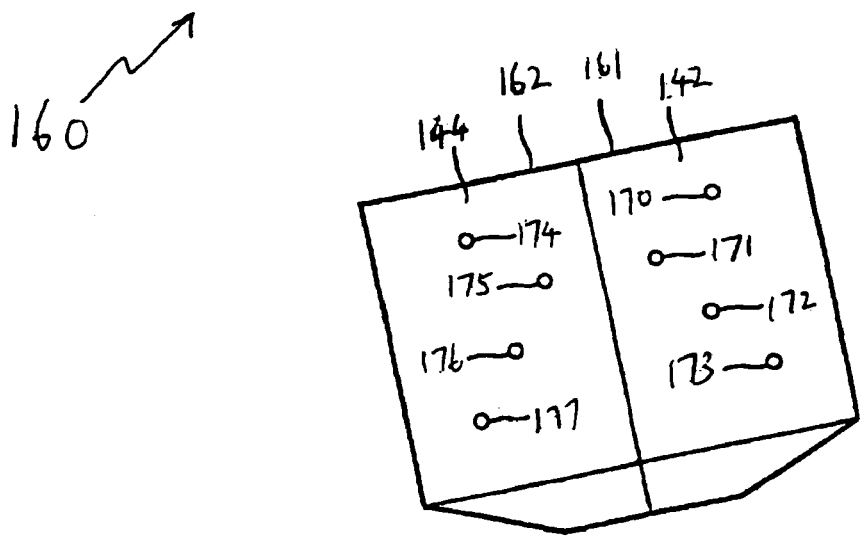

One use of the browsing device 100 depicted in FIGS. 2-3 would be to combine two pieces, a left-hand piece 161 and a right-hand piece 162 in a composite browsing device 160 such as the one shown in FIGS. 4-5. The browsing device 160 is connected to a computer 199 or other kinds of electronic devices that include a processor. The command signals 101, 102, 103, and 104 as depicted in FIG. 1 as detected by the browsing devices 160 are used to control the browsing of document in a book-like interface displayed on the computer 199 or other kinds of electronic devices, one embodiment of a book-like interface is depicted in FIG. 6.

The left-hand piece 161, as shown in FIG. 4, has a top surface 141 on which 4 bookmarking buttons 180-183 are placed and a bottom surface 142 on which another 4 bookmarking buttons 170-173 are placed. The left-hand piece 161 also has a slanted surface 191 on which a browsing controller 163 is placed. The right-hand piece 162 has a top surface 143 on which 4 bookmarking buttons 184-187 are placed and a bottom surface 144 on which another 4 bookmarking buttons 174-177 are placed. The right-hand piece 162 also has a slanted surface 192 on which a browsing controller 164 is placed. The left browsing controller 163 is controlled by the left thumb 165 or another finger or instrument and the right browsing controller 164 is controlled by the right thumb 166 or another finger or instrument.

Figure 6:
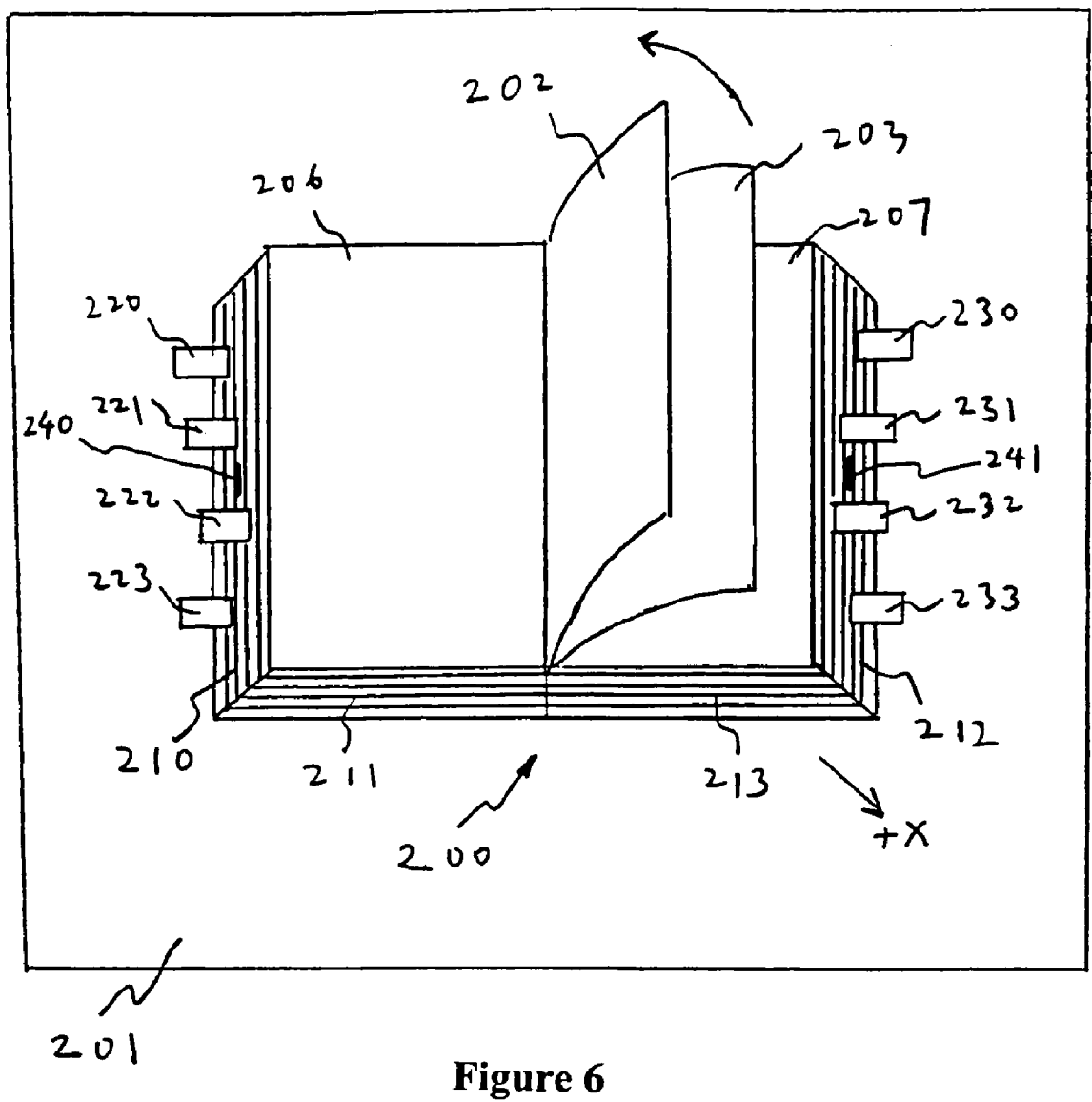
FIG. 6 is a top perspective view of a computer book displayed on a screen that is to be browsed through using browsing device of the present invention.

FIG. 6 depicts an embodiment of a computer book 200 shown on a computer screen 201 that is used to display electronic information on a computer or computer-like device that can be controlled by some kind of computer input device such as a computer mouse, a touch screen, the browsing device 100 depicted FIGS. 2-3, or the browsing device 160 depicted in FIG. 4. The computer book 200 consists of any number of flipping pages, such as 202 and 203, a resting page 206 on the left and a resting page 207 on the right, left side thickness 210, left bottom thickness 211, right side thickness 212, right bottom thickness 213, bookmarks 220, 221, 222, and 223 on the left side thickness 210, bookmarks 230, 231, 232, and 233 on the right side thickness 212, jump cursor 240 on the left side thickness 210, and jump cursor 241 on the right side thickness 212.

The particular embodiment of the computer book 200 in FIG. 6 is in the horizontal display mode. The computer book 200 can likewise be oriented on the computer screen 201 in a vertical display mode in which the pages are flipped from the top of the screen to the bottom of the screen or vice versa, and the thicknesses and other features are accordingly displayed. In general, the computer book 200 can be oriented in any direction on the computer screen 201.

The browsing device 160 as depicted in FIG. 4 can be used to control the browsing of and movement through an electronic document on a computer presented in the form of the computer book 200 depicted in FIG. 6 in the following manner. The direction of movement command 101 (FIG. 1), causes the flipping pages such as 202 and 203 to flip from right to left or vice versa, depending on the direction desired. This can be achieved by a movement of the left and right thumbs 165 and 166 (or any other fingers or instrument) on the left and right browsing controllers 163 and 164 respectively on the browsing device 160.

One method to generate the direction of movement command 101 involves using the right thumb 166 to apply a "downward" force (in the −z direction) on the left browsing controller 164 to effect a right to left flipping movement of the pages (202, 203, etc.) and using the left thumb 165 to apply a "downward" force (in the −z direction) on the right browsing controller 166 to effect a left to right flipping movement of the pages (202, 203, etc.).

The speed of movement command 102 dictates the speed of movement through the document. Different speed of movement can be achieved by basically two methods. In one method, the individual flipping pages (such as 202, 203, etc.) move faster or slower across the computer screen 201. In another method, more or fewer flipping pages (such as 202, 203, etc) go across the computer screen 201 at any given time. The two methods can also be combined: for example, more pages going across the screen at any give time as well as faster movement of each page achieve a faster movement through the document. Therefore, for faster speed of movement through the document, the flipping pages move faster and/or more pages are flipped across the computer screen 201 at the same time. For slower speed of movement through the document, the flipping pages move slower and/or fewer pages are flipped across the computer screen 201 at the same time.

One method to generate the speed of movement command 102 involves using the pressure of the thumbs 165 and 166 on the browsing controllers 163 and 164 respectively to specify the desired speed of flipping from left to right and from right to left respectively. One method of specifying the speed is to use a larger pressure to signify a higher speed and a smaller pressure to signify a lower speed.

To generate the jumping to a specified point command 103 the first step is to select the point in the document to jump to. One method is to use the movement in the x-direction of the thumbs 165 and 166 on the browsing controllers 163 and 164 respectively. Sliding the right thumb 166, say, in the +x or −x direction causes the right jump cursor 241 (FIG. 6) to move in the +x (down) and −x (up) direction respectively on the right side thickness 212 of the computer book 200. When a desired point is selected, one method is to use the pressure (in the −z direction) applied by the thumb (165 and 166) to the corresponding browsing controllers (163 and 164 respectively) to effect the jumping to the specified point.

To generate the bookmarking command 104, one method is to use the buttons 170-177 on the bottom of the browsing device 160 or the buttons 180-187 on the top of the device 160. One method of using the buttons is as follows: buttons 174-177 or 184-187 on the right-hand device 162 generate the corresponding bookmarks 230-233 on the right side thickness 212 of the computer book 200, while buttons 170-173 or 180-183 on the left-hand device 161 generate the corresponding bookmarks 220-223 on the left side thickness 210 of the computer book 200. The bookmark, say, 230, is generated when the computer book 200 is showing the page that it bookmarks, and the corresponding button 174 or 184 is depressed once. Later, to return to the page that the bookmark 230 bookmarks, the button 174 or 184 is depressed once. There are basically two kinds of bookmarks—permanent bookmarks and finger bookmarks. Permanent bookmarks, once created, are always there until a specific bookmark removal command is given. A finger bookmark, on the other hand, is removed automatically when the flipping of the pages in the document moves pass the page where the bookmark resides. This is the same process as the use of our fingers to bookmark pages of a physical book that we are browsing. The process of permanent and finger bookmarking have been described in U.S. Pat. No. 5,909,207 (Ho) and U.S. Pat. No. 6,064,384 (Ho).

FIGS. 7-10 depict the basic canonical mechanical actions that a finger 310 or instrument can effect on a sensor surface (300-303) to specify and activate the desired browsing commands 101-104. The methods of generating the browsing commands 101-104 described above require x-, y- and z-direction, and possibly some rotational (r-direction) movements of the finger. In the mechanical methods for generating browsing commands 101-104 to be described, the finger 310 moves the sensor surface (300-303) in one of 4 modes (306-309).

In Mode 306, the sensor surface 300 moves basically in the x and z directions. These movements are translational movements. Movement in the y direction is also allowed. In Mode 307, the sensor surface 301 translates in the z direction as well as rotates around an axis 320 that lies close to the sensor surface's 301 midline—a line that goes through the center of gravity of the sensor surface 301 and parallel to one side of the sensor surface 301. In Mode 308, the sensor surface 302 translates in the x direction as well as rotates around an axis 321 that lies some distance away from the sensor surface's 308 midline. In Mode 309, the sensor surface 303 rotates around an axis 322 that is close to the sensor surface's 303 midline as well as rotates around an axis 323 that lies some distance away from the sensor surface's 303 midline. In Modes 307-309, movement in the y-direction is also allowed (not shown in FIGS. 7-10).

Figure 11:
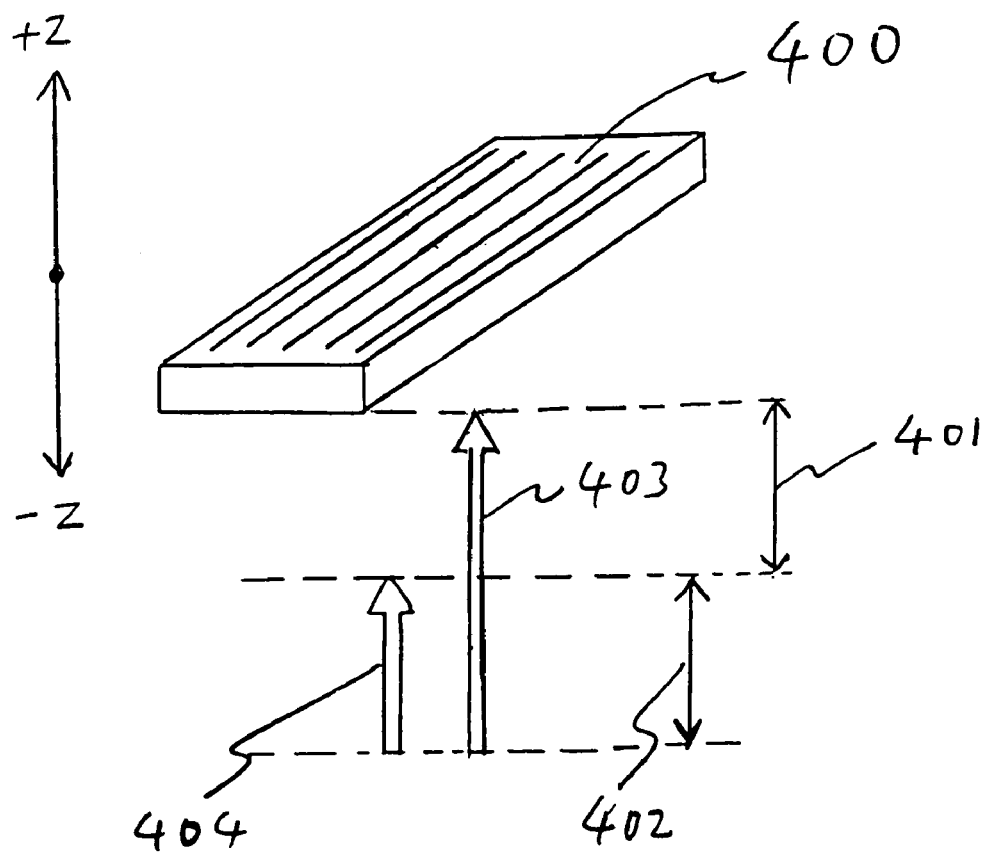
FIG. 11 is a top perspective view of a mechanical sensor surface for generating page-flipping commands using a mechanical dual-resistance region method.

Another way to derive specific signals from a moving mechanical sensor surface is to use multiple resistance regions to oppose its movement. FIG. 11 depicts a basic canonical dual-resistance action that can be imposed on a sensor surface 400. The process is as follows. Firstly, through the use of springs or other resilient mechanisms, the sensor surface 400, when translating in the −z direction, say, experiences a certain magnitude of force 403, say, opposite its direction of movement while it is moving in the upper region 401. Then, when its −z direction translation movement enters a region 402, the sensor surface 400 will experience a second resisting force 404 in addition to the first resisting force 403. The total force will be the addition of force 403 and 404, thus resulting in a stronger resisting force that the finger or instrument applying force on the sensor surface 400 will receive compared to when only the first force 403 is present. The dual-resistance action can be generalized to triple or more resistance action.

Figure 7:
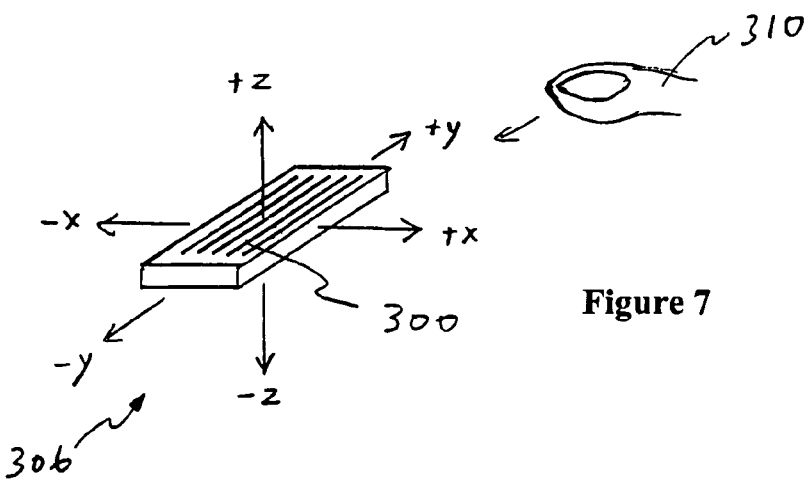
FIGS. 7-10 show the top perspective views of a mechanical sensor surface used in a number of basic mechanical methods for creating various page-flipping commands in a computer book.
Figure 12:
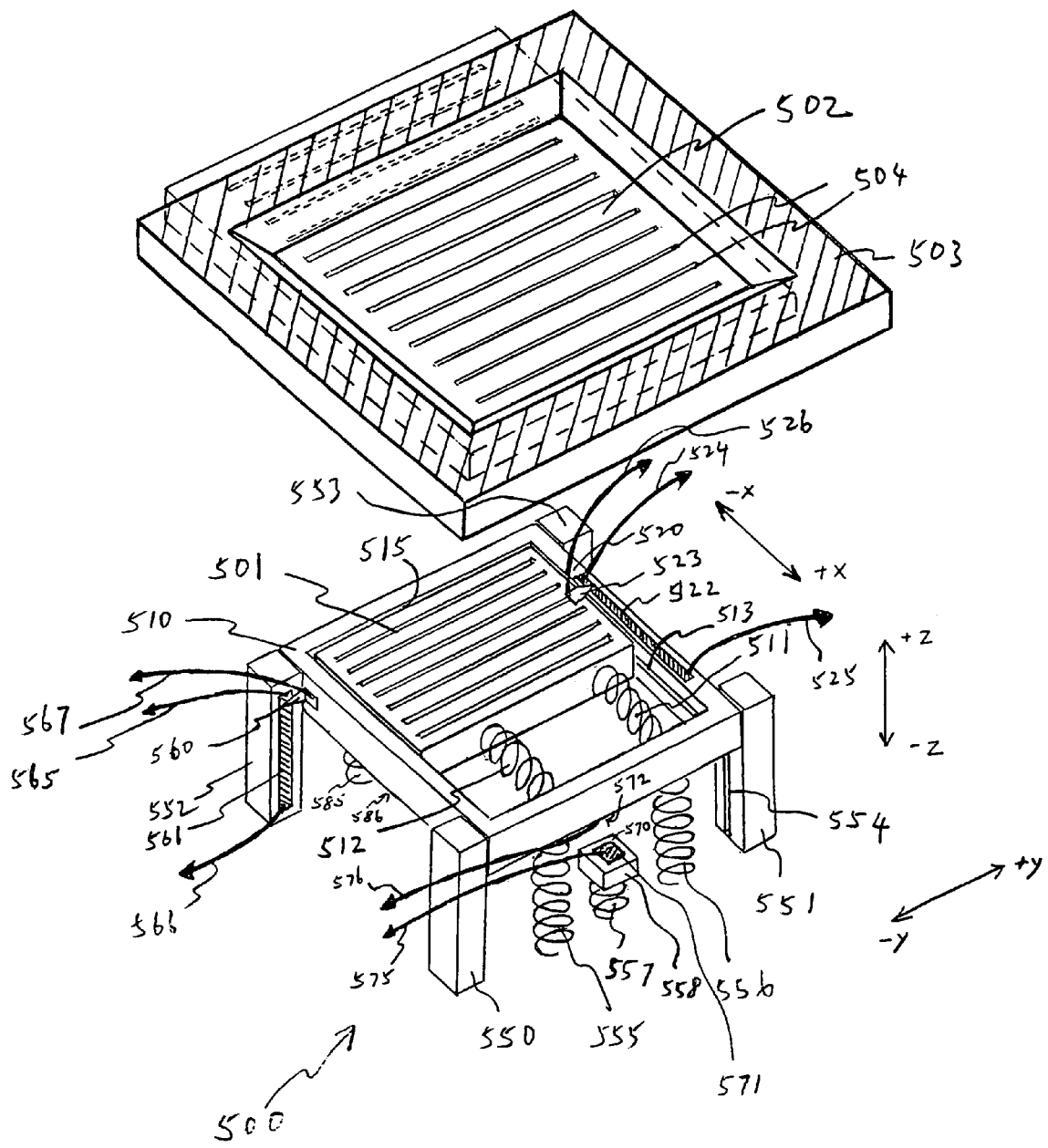
FIG. 12 is a front perspective view of an embodiment of the mechanical browsing device using movement along two translational axes for the generation of browsing signals.

FIG. 12 depicts an embodiment of a browsing controller 500 based on the basic mechanical action Mode 306 (FIG. 7). The controller 500 has of a movable control platform 501. This control platform 501 is coupled to a sensor surface 502 where the user's thumb or another finger or instrument rests. The control platform 501 and the sensor surface 502 move in unison. The sensor surface 502, as well as the rest of the mechanism associated with the control platform 501, is hidden by a cover 503 so that when the entire browsing controller 500 is mounted in a browsing device 100 (FIG. 1), say, only the sensor surface 502 is visible and accessible to the thumb or other instrument. The sensor surface 502 has grooves 504 or other frictional material coated on it, or formed in it, to provide friction to the finger or instrument acting on it.

The platform 501 can be translated in the x- or z-direction. The platform 501 slides in the x-direction within the frame 510. Grooves (such as groove 513) on the appropriate inner sides of the frame 510 together with appropriate protruding parts from the platform 501 (not shown in FIG. 12) that fit into the grooves (such as groove 513) constrains the platform 501 to move within the frame 510. Springs 511 and 512 within the frame 510 function to restore the platform 510 to the neutral position, which is when the platform rests against the "upper" edge 515 of the frame 510. The positive x-direction is as shown in FIG. 12. When the platform 501 is moved in the positive x-direction by the thumb or another finger or instrument, the springs 511 and 512 are compressed and as soon as the thumb's x-direction force is removed from the platform 501, the platform 501 will be returned to its neutral position (resting against the edge 515).

FIG. 12 further depicts the mechanism by which the movement of the platform 501 in the x-direction generates an x-position signal of the platform 501 relative to the frame 510. On one edge 520 of the frame 510 is coated a strip of thin film resistive material 522. A metallic pointer 523 sticking out from the movable platform 501 touches the resistive strip 522. The resistive strip 522 together with the metallic pointer 523 form a linear potentiometer from which the x-position of the platform 501 can be determined. Two wires 524 and 525 are attached to both ends of the resistive strip 522 and one wire 526 is attached to the metallic pointer 523. These wires allow electrical signals to be read from the linear potentiometer form by the resistive strip 522 and the metallic pointer 523.

FIG. 12 illustrates the mechanism by which the platform 501 together with the frame 510 translates in the z-direction. Supports 550-553 together with appropriate grooves on the appropriate inner sides of the supports 550-553 (such as groove 554) and appropriate protruding parts from the frame 510 (not shown in FIG. 12) that fit into the grooves (such as groove 554) constrain the frame 510 to move only in the z-direction. Springs 555, 556, 585 and 586 (hidden) function to restore the frame 510 and hence platform 501 to the neutral position, which is the "highest" position in the positive z-direction along the supports 550-553. Spring 557 together with a small platform 558 provides a second resistance region for the movement of the frame 510 and platform 501 in the negative z-direction. A conductor 571 is coated on the top surface 570 of the small platform 558. This, together with a conductor 572 coated on the corresponding bottom surface of the frame 510 forms a switch that can generate an electrical signal to indicate that the second resistance region is reached. Wires 575 and 576 are connected to conductors 571 and 572 respectively to allow the reading of the electrical signal. (A similar assembly that provides this second resistance region is hidden from view in the corresponding opposite side of the construction 500. This is for the purpose of providing a symmetrical "upward" or +z direction resistive force.)

FIG. 12 also illustrates the mechanism by which the movement of the platform 501 in the z-direction generates a z-position electrical signal relative to the supports 550-553. On one corner of the frame 510 a metallic pointer 560 extends from the frame 510. This pointer 560 touches a resistive strip 561 mounted vertically and on one side of the support 552. Two wires 565 and 566 are attached to both ends of the resistive strip 561 and one wire 567 is attached to the metallic pointer 560. The configuration comprising the metallic pointer 560 and the resistive strip 561 forms a linear potentiometer from which the z-position of the frame 510 and platform 501 can be measured electrically.

All the mechanisms hidden under the sensor surface 502 present the following mechanical action to any finger or instrument acting on the surface 502. The sensor surface 502 can move in the z-direction or x-direction. Its neutral z-position is when it is resting against the cover 503. Its neutral x-position is when it is at a certain extreme negative x-position. Movement in the positive x-direction is met with a restoring force in the negative x-direction and movement in the −z direction is met with a resistance in the +z direction. Moreover, the movement in the −z direction experiences a dual-resistance action, that is, for some departure from the neutral position, a certain resistive force is experienced and for further departure from the neutral position a stronger resistive force is experienced.

Though the movement in the y-direction (perpendicular to both the x- and z-directions) is not shown in the construction 500, the entire construction 500 can be mounted on similar mechanisms as the mechanisms to create the x- and z-direction movements to allow it to move in the y-direction as well as allow it to return to a neutral y-position when no y-direction force is applied to it.

One method of using the various movements and actions of the sensor surface 502 of the browsing controller 500 for generating the various browsing commands 101-103 is as follows. Each quick depression (in the −z direction) and release of the sensor surface 502 (say, within 100 milliseconds) activates the basic flipping of a page and if this browsing controller 500 is mounted as a right browsing controller such as the browsing controller 164 in FIG. 4, then it signifies a flipping/launching of a page from the right side of the computer book 200 to the left (direction of movement command 101). If the sensor surface 502 is depressed in the −z direction and held for a while (e.g., 300 ms or more), more than one flipping pages (202, 203, etc.) may be launched in the computer book 200. The interval of launch of the flipping pages (202, 203, etc.) is inversely proportional to the −z position of the sensor surface 502. That is, "deeper" depression of the sensor surface 502 causes the interval of launch of the multiple flipping pages (202, 203, etc.) to be shorter, hence more pages are launched in a given interval, hence more pages travel across the computer book 200 at any given time, and hence a faster movement through the computer book 200 or the electronic document involved (speed of movement command 102). A shallower depression of the sensor surface 502 corresponds to a lower speed of movement through the computer book 200, hence fewer flipping pages launched in a given time, hence fewer pages traveling across the computer book 200 at any given time, and hence a slower movement through the computer book 200. When no force is applied to the sensor surface 502 in the −z direction and it returns to the neutral position, no more new pages will be launched (and the pages that have been launched earlier are allowed to continue flipping to the other side of the computer book 200, in one mode of operation).

While the browsing controller provides tactile feedback to the person browsing the document, regarding the rate of speed that the document is being browsed, the visual display provides a further indication of the rate of speed. Auditory feedback may be provided as well where the pitch and/or audible level of a "flipping" sound (output through a speaker) is varied based on the flipping speed, and amount of material being moved through.

The jump to a specified point command 103 can be achieved as follows. Firstly, to select a point to jump to, the sensor surface is moved in the +x direction. If this browsing controller 500 is mounted as a right-hand browsing controller such as the right-hand browsing controller 164 in FIG. 4, then it activates the right jump cursor 241 on the right side thickness 212 of the computer book 200. The neutral position of the right jump cursor 241 is at the left-most edge of the right side thickness 212 of the computer book 200. This corresponds to the neutral x-position of the sensor surface 502 (that is, when the control platform 501 is against the extreme −x direction edge 515 of its supporting frame 510). As the sensor surface 502 is moved in the +x direction, the right jump cursor 241 moves along the +x direction away from the left-most edge of the right side thickness 212 of the computer book 200 as shown in FIG. 6. The sensor surface 502 can be moved back and forth in the +x and −x direction respectively to activate the back and forth movement of the jump cursor 241 for the selection of a desired point on the thickness 212 which corresponds to a desired point in the computer book 200 or document involved. When a desired point on the right side thickness 212 is reached (i.e., when a desired point in the computer book 200 or document is reached), a quick depression and release of the sensor surface 502 in the −z direction activates a jump to the desired point. If no jump is desired, releasing the force in the x-direction on the sensor surface 502 returns the sensor surface 502 automatically back to the neutral position, which also returns the jump cursor 241 to the neutral position on the thickness 212 of the computer book 200.

Some mechanisms can be added to the construction 500 to allow it to move in the y-direction (not shown in FIG. 12). The entire construction 500 can be mounted on some mechanisms similar to the x- and z-direction movement mechanisms described above that allow it to move in the y-direction, with an ability to always return to a neutral y position. One embodiment of this is having the neutral y-position at a certain limiting +y position and any movement in the −y direction is opposed by some spring action. If movement in this direction is possible, it can be used for the generation of the bookmarking command 104. The entire assembly 500 shown in FIG. 12 may be made to slide in tracks in the y-direction, which resilient members that bias the assembly to one of the extreme positions, +y or −y. Instead of using the bookmarking buttons, such as the bookmarking buttons 170-177 and 180-187 in the browsing device 160 depicted in FIG. 4 for the purpose of bookmarking, the y-direction movement can be used to create and subsequently jump to some or all of the bookmarks 220-223 and 230-233 depicted in FIG. 6. For example, a quick sliding in the −y direction and release of the sensor surface 502 (thereby a quick return to a neutral y-position in a limiting +y position) can create, say, a bookmark 230 on the right-hand page 207 of a computer book 200, if the browsing controller 500 is used as the right-side browsing controller 164 in a browsing device 160 such as depicted in FIG. 4.

Subsequently, because of further flipping of the pages in the computer book 200, the bookmark 230 may migrate further down the side of the right thickness 212 in the +x direction, and at this time, another quick sliding in the −y direction and release of the sensor surface 502 will trigger a jump to the page bookmarked by bookmark 230.

A typical use of the bookmarking buttons 170-177 and 180-187 as depicted in FIG. 4 is to use each one to create and jump to one corresponding bookmark. Therefore, bookmark 230 in FIG. 6 may correspond to button 174 (bottom surface 144 of the browsing device 160) as well as button 184 (top surface 143 of the browsing device 160), and bookmark 231 to button 175 and button 185, and so on. This way, up to 4 bookmarks can be created on each side of the computer book 200. The above method of using the y-direction movement can only create one bookmark on each side of the computer book 200. If switches (or electrical, magnetic or optical sensors) are placed on the controller 500 in such a way that when the controller 500 is moved to the limit of its −y direction movement, an electrical signal is generated. This electrical signal is then used to further create a second bookmark. For example, a quick sliding in the −y direction all the way to the limit of allowable movement in the −y direction, thereby hitting the switch and generating a signal, and then releasing of the sensor surface 502 so that it returns to its neutral y-position can create a second bookmark such as bookmark 231 on the computer book 200. The second time this same action is effected, a jump to the page bookmarked by bookmark 231 is effected.

More complex mechanisms controlling the y-direction movement can allow the creation of up to 4 bookmarks. For example, if mechanisms (such as opposing springs on opposite sides of the controller 500) are added to the controller 500 in such as way that the sensor surface's 502 neutral y-position is in the mid-point of its entire allowable range of y-direction movement, and appropriate limiting switches are installed, two more bookmarks can be created and used by using (1) a quick sliding in the +y direction and releasing of the sensor surface 502, and (2) a quick sliding all the way to the limit switch in the +y direction and releasing of the sensor surface 502.

In another mode of operation of the browsing controller 500, the second resistance region as provided by the spring 557 and small platform 558 can be used to create the jump to a specified point command 103. Earlier, it was described that a quick depression and releasing of the sensor surface 502 activates the launch of a flipping page in the appropriate direction. A depressing-and-holding action of the sensor surface 502 activates the launching of multiple flipping pages, again in the appropriate direction. This depressing-and-holding action that activates the multiple page flipping has to take place within the first resistance region in the −z direction, that is, the region before the spring 557 and its associated small platform 558 come into play. If the sensor surface 502 is depressed in the −z direction quick enough and the traversal of the first resistance region in the −z direction is made in a short enough interval (say, less than 100 milliseconds) and at the end of this interval the spring 557 and its associated small platform 558 are brought into action to provide the second resistance (hence a stronger opposing force in the +z direction against the continued "downward" or −z direction movement of the sensor surface 502), then a jump cursor control action is triggered. The entering of this second resistance region is signified by a signal generated by the switch formed by the two conductors 571 and 572 and their corresponding wires 575 and 576. Alternatively, a resilient member with non-linear resistance characteristics (e.g., exhibits resistance amounts in discretely increased levels). Likewise, for each discrete mechanical resistance increment, a corresponding increase in the electrical signal (analog or digital) value is created so as to impart a greater rate of flipping speed. When digital signals are output, the controller includes an embedded processor that includes an analog to digital converter. Alternatively, the controller includes the analog to digital converter without a processor contained in the controller.

When a second resistance region is entered, the right jump cursor 241, say, (i.e., if the browsing controller 500 is used as the right browsing controller such as the browsing controller 164 in FIG. 4.) in the computer book 200 will begin to move away from its neutral position at the left-most edge of the right thickness 212 of the computer book 200 and move in the +x direction on the thickness 212 (FIG. 6). The +z or −z direction movement of the sensor surface 502 in this second resistance region allows the jump cursor 241 to move in the −x and +x direction respectively on the thickness 212 and traverse the entire width of the thickness 212 for the selection of a desired point in the computer book 200 to jump to (FIG. 6). When the desired point on the thickness 212 is reached, one method to trigger the jumping action is to depress one of the buttons 174-177 or 184-187 on the right-hand piece 162 of the browsing device 160 as shown in FIG. 4.

In the dual-resistance mode of operation, having selected the desired point in the computer book to jump to, another method to activate the jumping action is to use the y-direction movement of the sensor surface 502, when the sensors, guides and resilient members are added to the controller 500 depicted in FIG. 12 to make this possible. One method is to use a movement in the −y direction, say, of the sensor surface 502 away from a neutral y-position to activate the jump, and thereafter the sensor surface 502 returns to the neutral y-position. Yet another method is to use a rapid depression of the sensor surface to the extreme −z position (say, within 100 milliseconds) from any position to activate the jump. A relatively slow, continued depression of the sensor surface 502 in the −z direction does not activate a jump. Instead, it continues to move the right jump cursor 241 in the +x direction shown in FIG. 6.

In yet another mode of operation of the browsing controller 500, instead of using the z-direction movement of the sensor surface 502 for launching flipping pages and the generation of the speed of movement command 102, and using the x-direction movement of the sensor surface 502 for selecting the point to jump to in the computer book 200 and the generation of the jump to a specified point command 103, the x-direction movement can be used for launching flipping pages and the generation of the speed of movement command 102 and the z-direction movement can be used for selecting the point to jump to in the computer book 200 and the generation of the jump to a specified point command 103. Y-direction movement mechanisms may also be used for either the speed of movement command 102 or jump to a specified point command 103, instead of the bookmarking command 104 described above. In general, any one of the x-, y-, and z-movement can be used to generate any one of the browsing commands 101-104.

Figure 8:
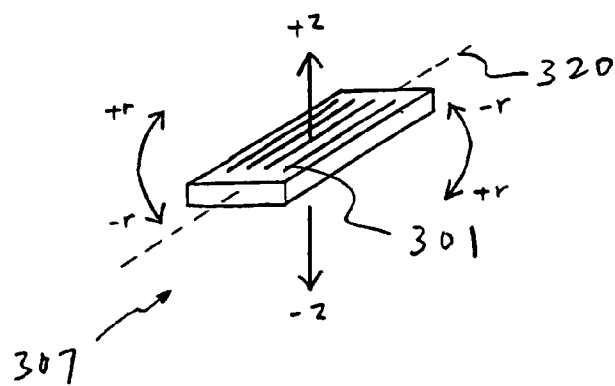
Figure 13:
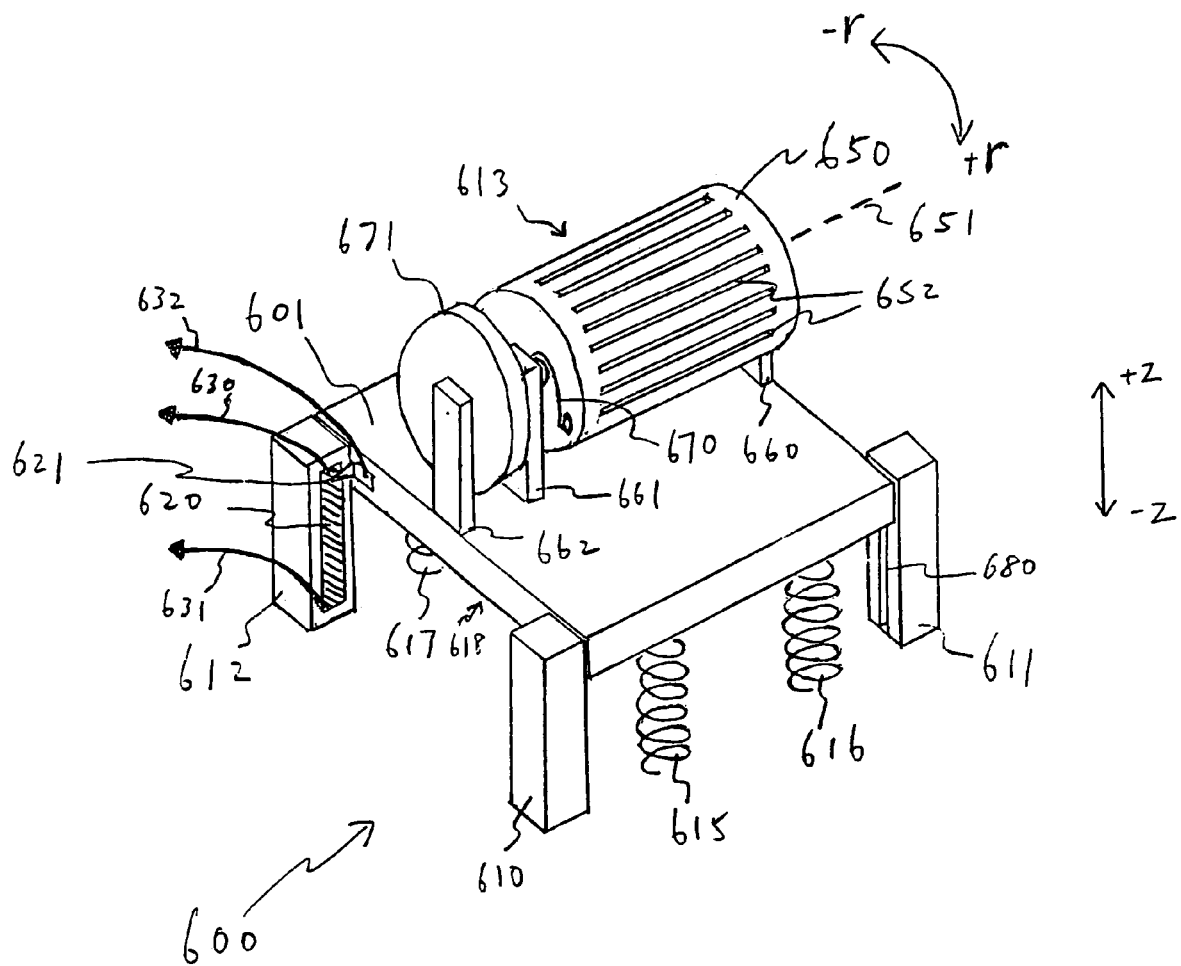
FIG. 13 is a front perspective view of an embodiment of the mechanical browsing device using a cylindrical roller for its mechanical sensor surface and using one translational movement and one rotational movement for the generation of browsing signals.

FIG. 13 depicts an embodiment of a browsing controller 600 based on the mechanical action of Mode 307 (FIG. 8). The controller 600 includes a platform 601 that moves in the z-direction and a cylindrical roller 650 that rotates around the main axis 651 of the cylindrical roller 650. A cover similar to the cover 503 depicted in FIG. 12 can optionally be placed over the entire controller 600 such that only the top part of the roller 650 is exposed and accessible for the control of a finger or any instrument.

The operation of the browsing controller 600 is as follows. The platform 601 is supported by the four supports 610, 611, 612 and 613 (hidden from view). Grooves on the appropriate inner sides of the supports 610-613 (such as groove 680 on support 611) together with appropriate protruding parts from the platform 601 (not shown in FIG. 13) constrain the platform to move in the z-direction. Four springs 615, 616, 617, and 618 (hidden from view) return the platform to the extreme +z position which is the highest +z position allowable by the four supports 610-613.

A resistive strip 620 is coated on one of the vertical surfaces of the support 612. A metallic pointer 621 is fixed on one of the sides of the platform 601 such that it contacts the resistive strip 620. Two wires 630 and 631 are connected to the two ends of the resistive strip 620 and a wire 632 is connected to the metallic pointer 621. The resistive strip 620, the metallic pointer 621 and the wires 630-632 connected to them together form a linear potentiometer from which the z-position of the platform 601 can be electrically measured.

The roller 650 is mounted between two supports 660 and 661. It can rotate in the +r and −r direction as defined in FIG. 13. Grooves 652 on the roller 650 provide friction for a finger or instrument to effect a rotational movement of the roller 650 around its main axis 651. The roller 650 is coupled to a rotary potentiometer 671 that is mounted between two supports 661 and 662. The rotary potentiometer allows the angular position (defined in the +r direction with respect to a starting point—the neutral position) of the roller 650 to be measured. A spring 670 provides a rotating force in the −r direction and returns the roller 650 to a neutral angular position. Some protruding parts (not shown) on the roller's face facing the support 661, say, together with some protruding parts (not shown) on the face of the support 661 facing the roller prevents the roller from rotating in the −r direction beyond the neutral position.

One method to generate a direction of movement command 101 and a speed of movement command 102 is similar to the method described above for browsing controller 500. Each quick depression (in the −z direction) and releasing of the roller 650 activates the basic flipping/launching of a page and if this browsing controller 600 is mounted as a right browsing controller such as the browsing controller 164 in FIG. 4, then it signifies a flipping of a page from the right side of the computer book 200 (FIG. 6) to the left (direction of movement command 101). If the roller 650 is depressed in the −z direction and held for a while, more than one flipping pages (202, 203, etc.) may be launched in the computer book 200 (FIG. 6). The interval of launch of the flipping pages (202, 203, etc.) is inversely proportional to the −z position of the sensor surface 502. That is, "deeper" depression of the sensor surface 502 causes the interval of launch of the multiple flipping pages (202, 203, etc.) to be shorter, hence more pages are launched in a given interval, hence more pages travel across the computer book 200 at any given time, and hence a faster movement through the computer book 200 or the electronic document involved (speed of movement command 102). A shallower depression of the sensor surface 502 corresponds to a lower speed of movement through the computer book 200, hence fewer flipping pages launched in a given time, hence fewer pages traveling across the computer book 200 at any given time, and hence a slower movement through the computer book 200. When no force is applied to the roller 650 in the −z direction and it returns to the neutral position, no more new pages will be launched (and the pages that have been launched earlier are allowed to continue flipping to the other side of the computer book 200, in one mode of operation).

To generate the jump to a specified point command 103, the first step is to select the point in the computer book 200 or the document to jump to. This is achieved by rolling the roller 650 in the +r direction. If the browsing controller 600 is used as the right side browsing controller 164 in a browsing device 160 such as depicted in FIG. 4, any +r direction angular departure from the neutral angular position of the roller 650 triggers a movement of the right jump cursor 241 on the thickness 212 of the computer book 200 in the +x direction. When a desired point is reached, a jump can be activated by a vertical depression (i.e., in the −z direction) of the roller 650. If no jump is desired, the release of force on the roller 650 causes it to return to the neutral angular position and hence the corresponding return of the right jump cursor 241 to its neutral position on the thickness 212—i.e., the left most position.

A construction similar to the construction used to provide a second resistive force region as depicted in the browsing controller 500 in FIG. 12 (spring 557 and small platform 558) can be added to the browsing controller 600 that can provide another method for generating the jump to a specified point command 103 as described above for browsing controller 500.

Figure 14:
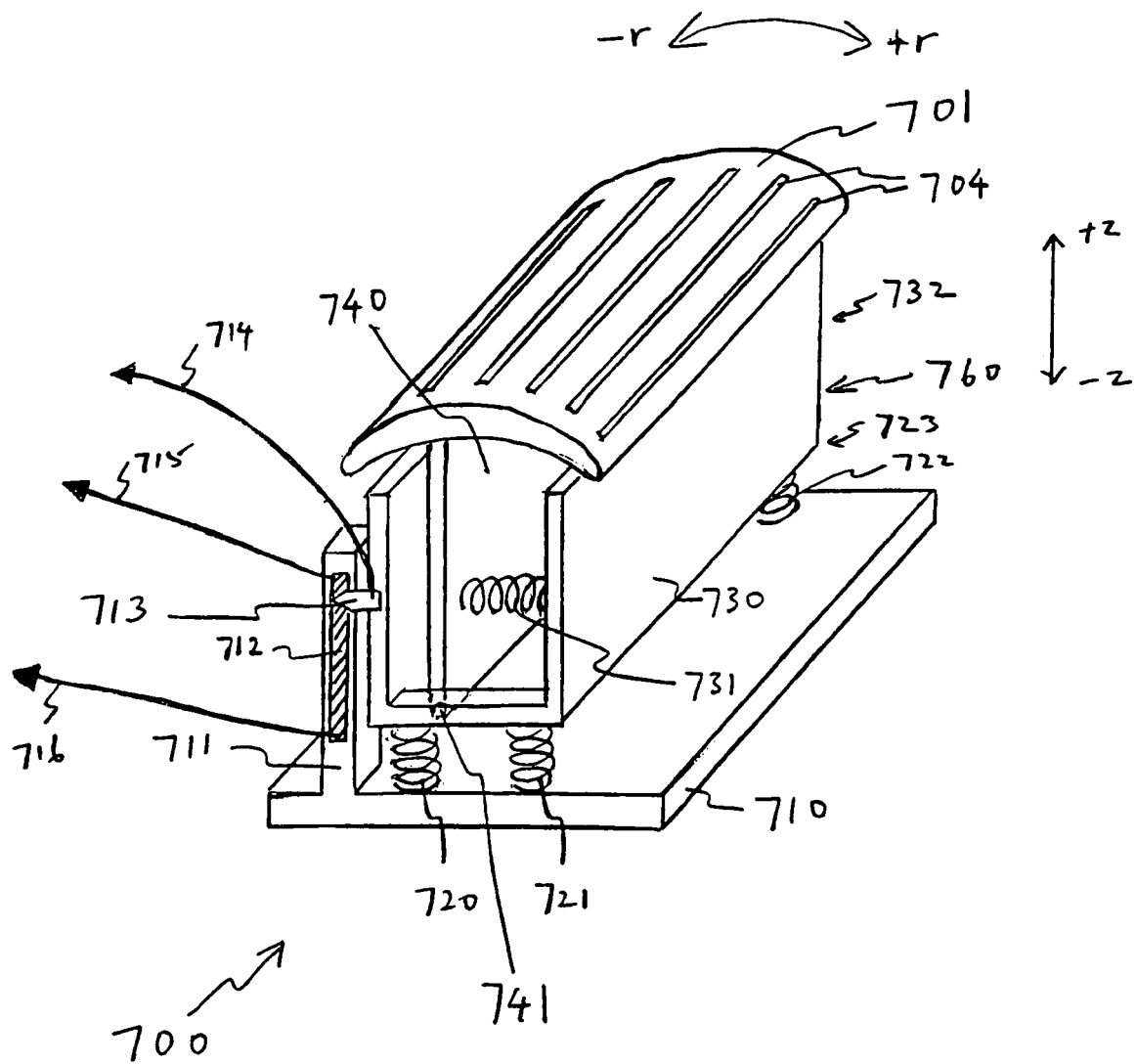
FIG. 14 is a front perspective of an embodiment of the mechanical browsing device using a rocking movement for its mechanical sensor surface and using one translational movement and one rotational movement for the generation of browsing signals.

FIG. 14 depicts yet another embodiment of a browsing controller 700 based on the basic mechanical action Mode 307 (FIG. 8). The controller 700 includes a sensor surface 701 that is supported in such a way that it can translate in the +z and −z directions as well as rock in +r and −r directions as shown in FIG. 14. The entire construction 700 can optionally be hidden under a cover much like in the case of the cover 503 of FIG. 12 so that only the sensor surface 701 is exposed and accessible for finger or instrumental control.

The sensor surface 701 is mounted on a vertical support 740 that is in turn pivoted 741 in a casing 730 that allows the sensor surface 701 to rock in the +r and −r directions. Springs 731 and 732 (hidden) are mounted between the casing 730 and the support 740 in such a way that the sensor surface 701 is always returned to some neutral position. Any rocking movement of the sensor surface 701 in the +r direction causes the sensor surface 701 to experience a force in the −r direction that attempts to return it to the neutral position.

The casing 730 is in turn mounted on a platform 710 through springs 720, 721, 722 and 723 (hidden). These springs return the casing 730 hence the sensor surface 701 to a neutral z-position. Any movement of the sensor surface 701 in the −z direction is met with a opposing force in the +z direction that attempts to return it to the neutral position.

Mounted on a upward protruding section 711 of the platform 710 is a resistive strip 712. A metallic pointer 713 extends from one side of the casing 730 to contact the resistive strip 712. Two wires 715 and 716 are connected to the end points of the resistive strip 712 and a wire 714 is connected to the metallic pointer 713. The resistive strip 712, the metallic pointer 713 and their associated wires 715, 716 and 714 together form a linear potentiometer from which the z-position of the sensor surface can be electrically determined. Alternatively, a non-linear sensor may be used as well to create an electrical signal with non-linearly increasing values as the controller is depressed in an linearly increased amount.

Hidden from view is a rotary potentiometer 760 mounted to a pivot directly opposite the pivot 741 on the other side of the casing 730. This potentiometer allows the r-position of the sensor surface 701 to be determined.

One method of using the browsing controller 700 to generate the direction of movement 101 and speed of movement 102 commands to move through the document or computer book 200 is similar to one of the methods these commands are generated using the browsing controllers 500 and 600 as depicted in FIGS. 12 and 6 respectively and described above—that is, using the z-direction movement of the sensor surface 701. One method of using the browsing controller 700 to generate the jump to a specified point 103 command is similar to one of the methods used in the browsing controller 600 as depicted in FIG. 13 and described above—that is, using the r-direction movement of the sensor surface 701. For example, rocking the sensor surface 701 in the +r and −r directions controls the movement of the jump cursor 241, say, on the thickness 212, say, of the computer book 200. After the desired point is selected on the thickness 212, a jump is activated by the depression of the sensor surface 701 in the −z direction.

A construction similar to the construction used to provide a second resistive force region as depicted in the browsing controller 500 in FIG. 12 (spring 557 and small platform 558) can be added to the browsing controller 700 that can provide another method for generating the jump to a specified command 103 as described above for browsing controller 500.

Figure 9:
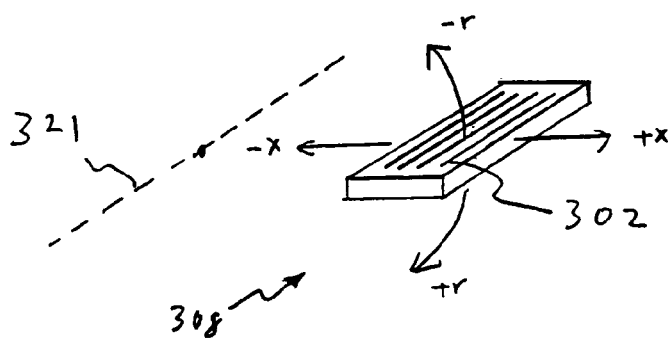
Figure 15:
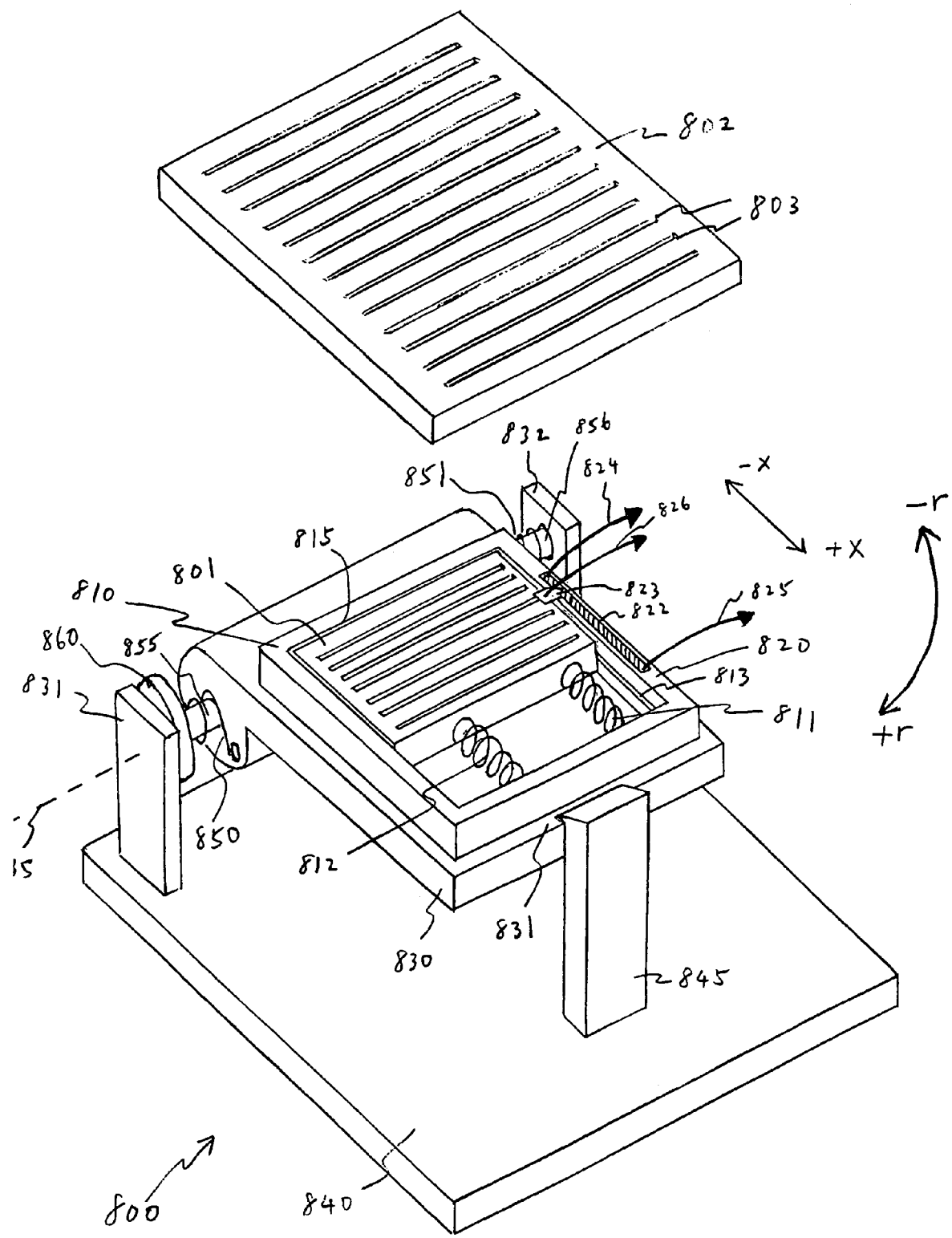
FIG. 15 is a front perspective of an embodiment of the mechanical browsing device using a platform for its mechanical sensor surface and using one translational movement and one rotational movement for the generation of browsing signals.

FIG. 15 depicts an embodiment of a browsing controller 800 based on the basic mechanical action Mode 308 (FIG. 9). The controller 800 includes a movable control platform 801. This control platform 801 is coupled to a sensor surface 802 where the user's thumb or another finger or instrument rests. The control platform 801 and the sensor surface 802 move in unison. The sensor surface 802 as well as the rest of the mechanism associated with the control platform 801 are hidden by a cover (not shown) that is much like the cover 503 in FIG. 12 so that when the entire browsing controller 800 is mounted in a browsing device 100 (FIG. 1), say, only the sensor surface 802 is visible and accessible to the thumb or other instrument. The sensor surface 802 has grooves 803 or other frictional material coated on it, or formed in it, to provide friction to the finger or instrument acting on it.

The platform 801 can be translated in the x-direction or rotated in the redirection as shown in FIG. 15. The platform 801 slides in the x-direction within the frame 810. Grooves (such as groove 813) on the appropriate inner sides of the frame 810 together with appropriate protruding parts (not shown in FIG. 15) from the platform 801 that fit into the grooves (such as groove 813) constrains the platform 801 to move within the frame 810. Springs 811 and 812 within the frame 810 function to restore the platform 810 to the neutral position, which is when the platform rests against the "upper" edge 815 of the frame 810. The positive x-direction is as shown in FIG. 15. When the platform 801 is moved in the positive x-direction by the thumb or another finger or instrument, the springs 811 and 812 are compressed and as soon as the thumb's x-direction force is removed from the platform 801, the platform 801 will be returned to its neutral position (resting against the edge 815).

FIG. 15 further depicts the mechanism by which the movement of the platform 801 in the x-direction generates an x-position signal of the platform 801 relative to the frame 810. On one edge 820 of the frame 810 is coated a strip of thin film resistive material 822. A metallic pointer 823 sticking out from the movable platform 801 touches the resistive strip 822. The resistive strip 822 together with the metallic pointer 823 form a linear potentiometer from which the x-position of the platform 801 can be determined. If a non-linear response is desired than the resistive value can be altered in a non linear fashion. Two wires 824 and 825 are attached to both ends of the resistive strip 822 and one wire 826 is attached to the metallic pointer 823. These wires allow electrical signals to be read from the linear potentiometerby the resistive strip 822 and the metallic pointer 823.

The frame 810 is mounted on a platform 830 that is in turn mounted at one of its ends through two axles 855 and 856 on two supports 831 and 832 in such a way that it is allowed to rotate about an axis 835. These supports 831 and 832 together with a catch 845 that defines the neutral rotational position of the platform 830 are mounted on a platform 840.

Springs 850 and 851 are mounted on the two axles 855 and 856 of the platform 830 in such a way that they rotate the platform 830 in the −r direction. The neutral angular position of the platform 830 is when one of its edges 831 is restrained by the catch 845. The platform 830 is coupled through the axle 855 to a rotary potentiometer 860 that allows the angular position of the platform 830 to be measured.

One method of using the sensor surface 802 of the browsing controller 800 for generating the direction of movement command 101 and speed of movement command 102 is as follows. Each quick rotation about the axis 835 in the +r direction and releasing of the sensor surface 802 activates the basic flipping of a page and if this browsing controller 800 is mounted as a right browsing controller such as the browsing controller 164 in FIG. 4, then it signifies a flipping of a page from the right side of the computer book 200 (FIG. 6) to the left (direction of movement command 101). If the sensor surface 802 is rotated in the +r direction and held for a while (200 ms to 2 seconds, for example), more than one flipping pages (202, 203, etc.) may be launched in the computer book 200 (FIG. 6). The interval of launch of the flipping pages (202, 203, etc.) is inversely proportional to the +r angular position of the sensor surface 802. That is, further rotation of the sensor surface 802 from the neutral position causes the interval of launch of the multiple flipping pages (202, 203, etc.) to be shorter, hence more pages are launched in a given interval, hence more pages travel across the computer book 200 at any given time, and hence a faster movement through the computer book 200 or the electronic document involved (speed of movement command 102). A smaller rotational displacement of the sensor surface 802 from the neutral angular position corresponds to a slower speed of movement through the computer book 200, hence fewer flipping pages launched in a given time, hence fewer pages traveling across the computer book 200 at any given time, and hence a slower movement through the computer book 200. When no force is applied to the sensor surface 802 in the +r direction and it returns to the neutral position, no more new pages will be launched (and the pages that have been launched earlier are allowed to continue flipping to the other side of the computer book 200, in one mode of operation).

One method of the use of the browsing controller 800 to generate a jump to a specified point command 103 is similar to that described for browsing controller 500 as depicted in FIG. 12 and described above—that is, using the x-direction movement of the sensor surface 802.

A second resistance region for the rotational movement of the platform 830 is provided by a construction similar to that formed by the spring 557 and the small platform 558 depicted in FIG. 12, and mounted near the catch 845 just below one edge 831 of the platform 830. This second resistance region can provide another method of generating the jump to a specified point command 103 similar to that described for browsing controller 500 above.

Figure 10:
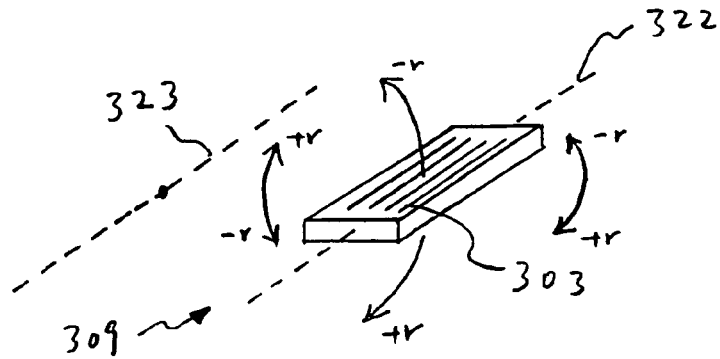

To implement basic canonical mechanical action Mode 309 depicted in FIG. 10, in which two rotational axes are involved, a roller mechanism such as the mechanism associated with roller 650 depicted in FIG. 13 can be mounted on a rotating platform similar to the rotating platform 830 depicted in FIG. 15. This way, two rotational actions are made available for generating some or all of the browsing commands 101-103.

Figure 16:
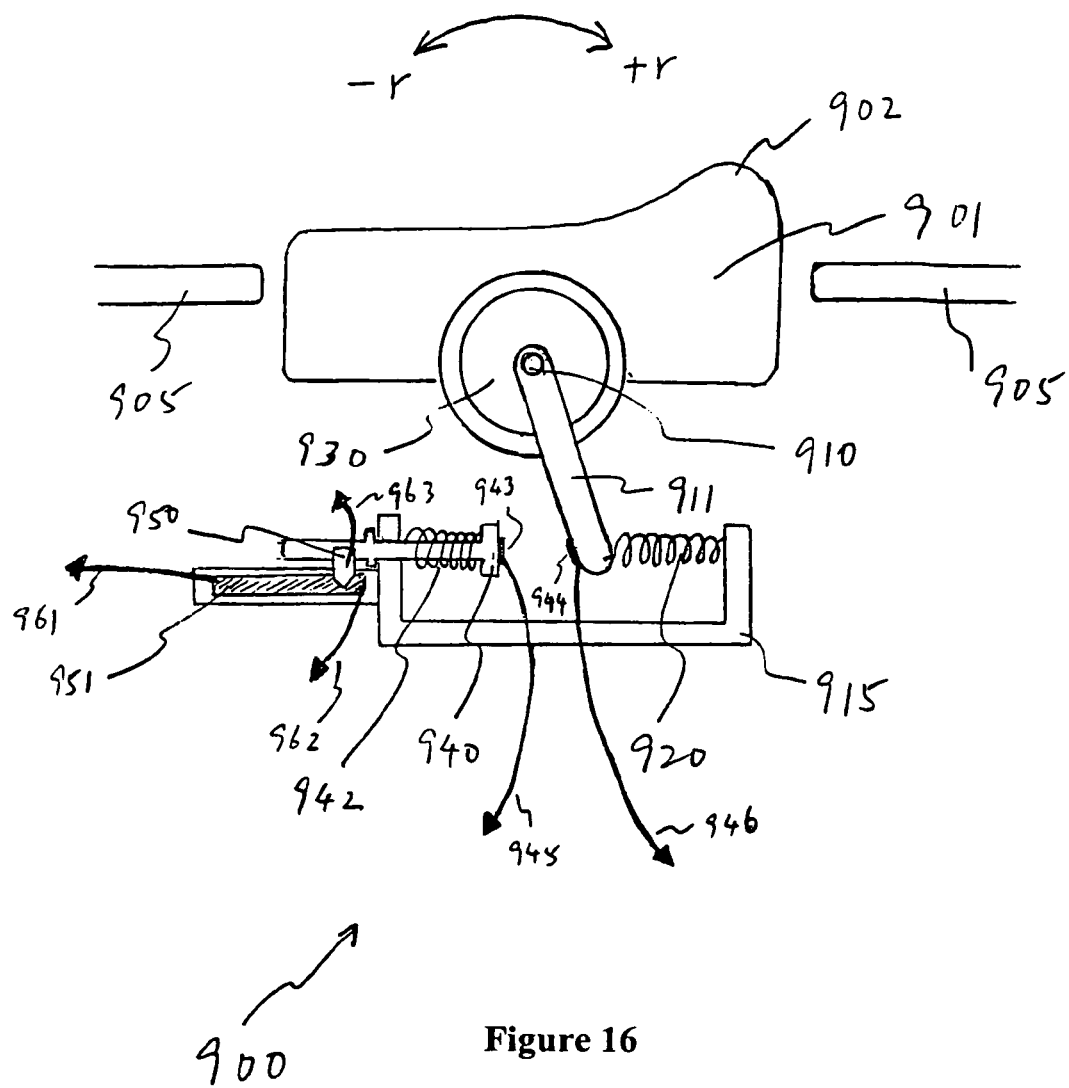
FIG. 16 is a side view of an embodiment of the mechanical browsing device using a dual-resistance method for the generation of browsing signals.

FIG. 16 depicts a browsing controller 900 that uses a dual-resistance region combined with a rocking action (in the redirection) of a mechanical sensor 901 to generate the various browsing commands 101-103. In FIG. 16, an "exposed" side view of the browsing controller 900 is shown to better illustrate the mechanisms involved.

The mechanical sensor 901 is mounted through a pivot 910 to some fixed structure (not shown in FIG. 16). A cover 905 hides the controller's 900 internal mechanism from view. The mechanical sensor is rigidly coupled to a coupling bar 911 that is in turn connected to a spring 920 as shown in FIG. 16. The rotational movement of the mechanical sensor 901 in the +r direction is countered by the spring 920, which is in turn mounted on a fixed structure 915. The neutral position of the mechanical sensor is when the spring 920 is not extended at all. Any extension of the spring generates a force to bring the mechanical sensor back to its rotational neutral position. A convenient point for a finger or an instrument to act on the mechanical sensor 901 is at one end 902 of it. The angular position of the mechanical sensor 901 is measured by a rotary potentiometer 930 mounted on the same axis as the rotational axis of the mechanical sensor 901.

The first resistance region is when the coupling bar 911 traverses the space from the neutral position to the point when it comes into contact with a plunger 940. In this region the resistance is provided by the spring 920. As soon as the plunger 940 is contacted, a spring 942 mounted on the axis of the plunger 940 provides a further resistive force against the further +r direction rotation of the mechanical sensor 901. The neutral position of the plunger 940 is when the spring 942 is not compressed at all. Metallic contacts 943 and 944 attached to one end of the plunger 940 and one end of the coupling bar 911 respectively comprise a switch that provides an electrical signal that the second resistance region is entered. Wires 945 and 946 are connected to the contacts 943 and 944 to allow the electrical signal to be read.

A metallic pointer 950 that is attached to the plunger 940 contacts a resistive strip 951 that is fixed to a part of the fixed structure 915. Two wires 961 and 962 are connected to the two ends of the resistive strip 951 and a wire 963 is connected to the metallic pointer 950. The resistive strip 951, the metallic pointer 950, and their associated wires 961, 962 and 963 together form a linear potentiometer from which the linear displacement of the plunger 940 can be measured. The linear displacement of the plunger 940 from its neutral position corresponds to the further angular movement in the +r direction of the mechanical sensor 901 after it has entered the second resistance region. More plunger/resistive strips may be added in parallel with the plunger 940, although with longer or shorter springs than 942. Such an arrangement allows for multiple gradations of resistance to be added, thus increasing the rate of change of electrical signal values from a first sensor displacement location to a second displacement location when the user moves the sensor 901 further from its neutral position, thus engaging more plungers.

One method of using the browsing controller 900 to generate the various browsing commands 101-103 is as follows. A quick depressing and releasing of the mechanical sensor 901 at one end 902 activates the launch of one flipping page of the computer book 200 (FIG. 6). Depressing the end 902 and holding it for more than a certain amount of time, say 100 milliseconds, triggers the continued launching of more than one flipping pages, the interval of which is determined by the angular displacement in the +r direction of the mechanical sensor 901. The further the displacement, the more pages are launched in a given time (speed of movement command 102).

One method of generating the jump to a specified point command 103 is as follows. Suppose the mechanical sensor 901 starts from its neutral position. Suppose now a force is applied to depress the end 902 so that the coupling bar 911 traverses the first resistance region quick enough (say, within 100 milliseconds) before the second resistance is entered (signified by the activation of the switch formed by contacts 943 and 944), then there is no launching of flipping pages in the computer book 200 (of FIG. 6). Instead the right jump cursor 241, say, is activated at the point where the second resistance region is entered. (The right jump cursor 241 is activated if the browsing controller is used as a right-hand browsing controller such as the browsing controller 164 in the browsing device 160 depicted in FIG. 4.) The right jump cursor 241 will begin to move in the x-direction on the thickness 212 of the computer book 200 as soon as it is activated. Further angular movement of the mechanical sensor 901 in the +r and −r directions allow the jump cursor 241 to move in the +x (down) direction and −x (up) direction on the thickness 212 of the computer book 200 respectively for the selection of a point in the computer book 200 or the document to jump to.

When a desired jump-point is reached, one method of activating a jump is to press one of the buttons (174-177 or 184-187) on the right-hand piece 162 of the browsing device 160 depicted in FIG. 4. Another method is to depress rapidly (within 100 milliseconds, say) the end point 902 of the mechanical sensor 901 all the way to the end, where the plunger 940 reaches its limits of displacement, at which point a jump is activated. Alternatively, two rapid movements of the mechanical sensor 901, may be used, such as a "double click" (or even a triple click). Furthermore, since the controller will be used with a computer, the user may customize the user-preferred settings for what actions by the user constitute a predetermined activity (such a flipping multiple pages versus flipping one page at a time). One method of measuring that the mechanical limit is reached is by the reading of a certain resistance value from the linear potentiometer associated with the plunger 940. This setting may also be customized by the user, so as to set the user's preferred values in computer readable memory for a customized "feel." Another method is to use a switch (not shown in FIG. 16) that is activated when the plunger 940 reaches its displacement limit. This method may be used to define the default value, if the user opts not to customize the sensor parameters.

In summary, the above description specifies how a mechanical sensor surface (one of 300-303 in FIGS. 7-10, say) moving in a certain mode (one of Modes 306-309, say) can be used to generate some or all of the browsing commands 101-104, which are types of electrical signals, depicted in FIG. 1. Even though only a few methods have been described in detail, in general, any one of the x-, y-, z- and r-movement can be used to generate any one of the browsing commands 101-104. Furthermore, an embedded transmitter (IR or RF) may be used to produce an output wireless signal that conveys the browsing commands 101-104. A dual-resistance mechanism depicted in FIG. 11 can also be used to supplement the basic Modes 306-309 to generate the various browsing commands 101-104.

Figure 17:
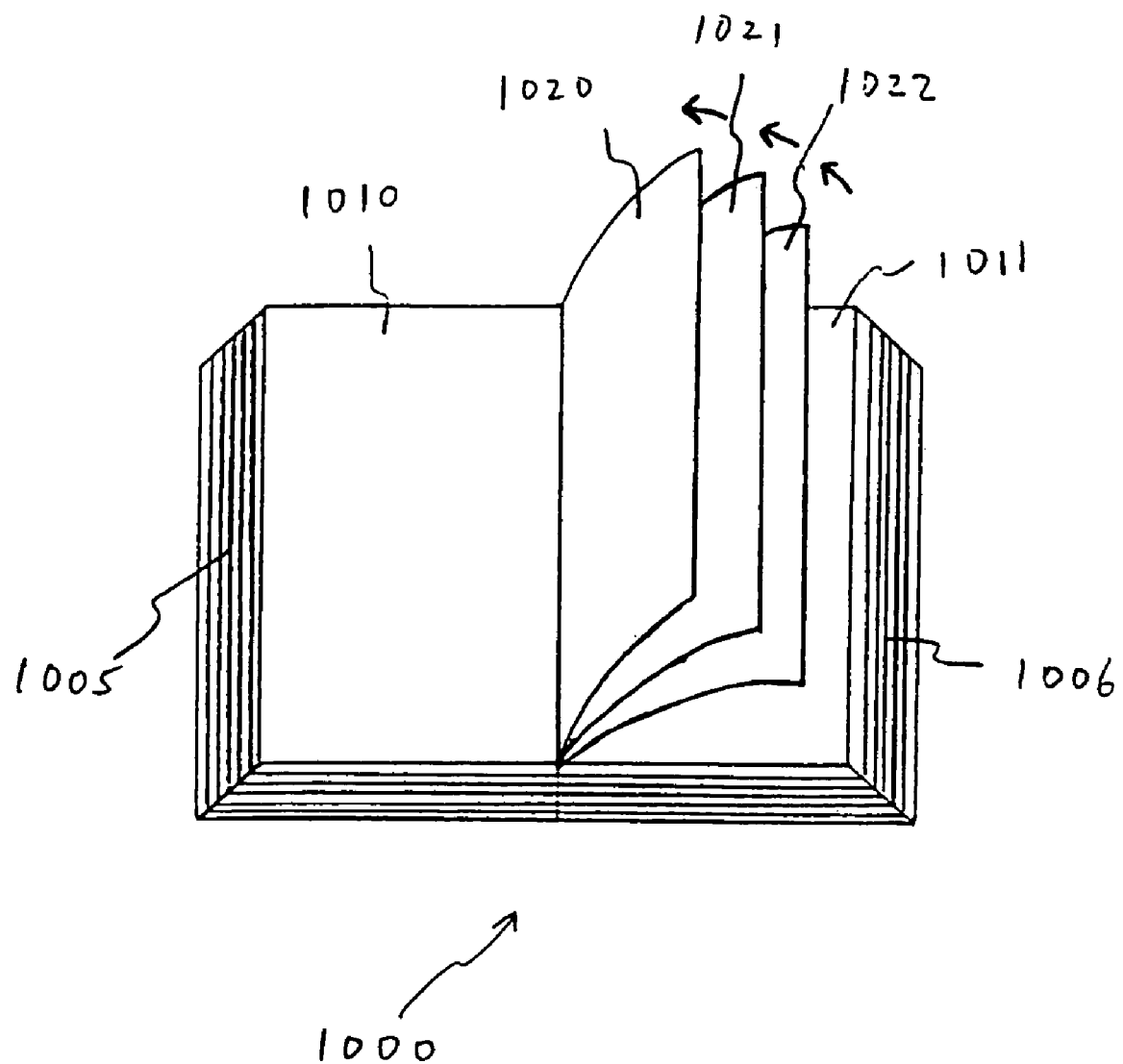
FIG. 17 is a top perspective view of a computer book showing a flipping process according to the present invention.

FIG. 17 depicts the basic flipping mechanisms of a computer book 1000 on a computer screen. A left page 1010 and a right page 1011 are stationary while three pages 1020, 1021, and 1022 are being flipped across from the right side to the left side simultaneously. The faster the movement through the book, the more pages are flipped simultaneously and vice versa. The speed of movement through the computer book 1000, is also proportional to the speed of movement of each flipping page while it flips from the right to the left side of the computer book 1000 or vice versa. When the flipping pages 1020, 1021, and 1022 reach the left side of the computer book 1000, they are collected there, forming part of the left side of the computer book 1000. The thicknesses 1005 and 1006 on both sides of the computer book change accordingly as a result of disappearance of pages from or accumulation of pages on the corresponding side.

Figure 18:
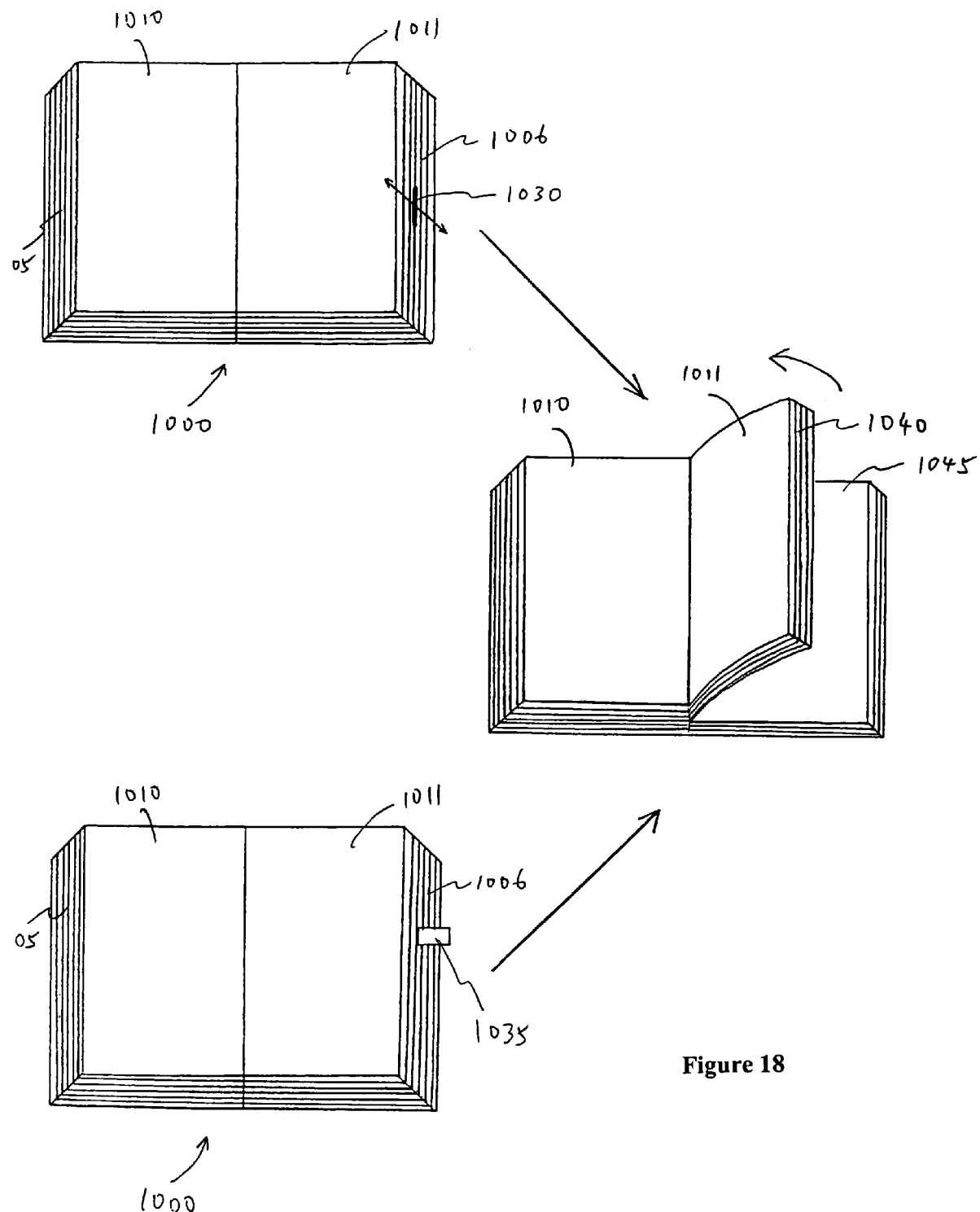
FIG. 18 is a top perspective views of a few computer books showing the process of jumping to a selected page.

FIG. 18 depicts the basic jumping mechanism as a result of either an activation of a jump cursor 1030 on the right side thickness 1006 or a bookmark 1035 on the right side thickness 1006. A collection of pages between the current right-hand page 1011 and the page 1045 to jump to is shown to flip across from the right side to the left side of the computer book 1000. A thickness 1040 proportional to the number of pages in between the right-hand page 1011 and the page 1045 to jump to is shown moving across the computer book 1000 accordingly.

The basic flipping mechanisms depicted in FIGS. 17 and 18 can be effected with the browsing controller actions described above in connection with FIGS. 12-16.

FIGS. 19-39 depict more complex flipping actions of the pages as a result of receiving browsing control commands to be described in detail later.

Figure 21:
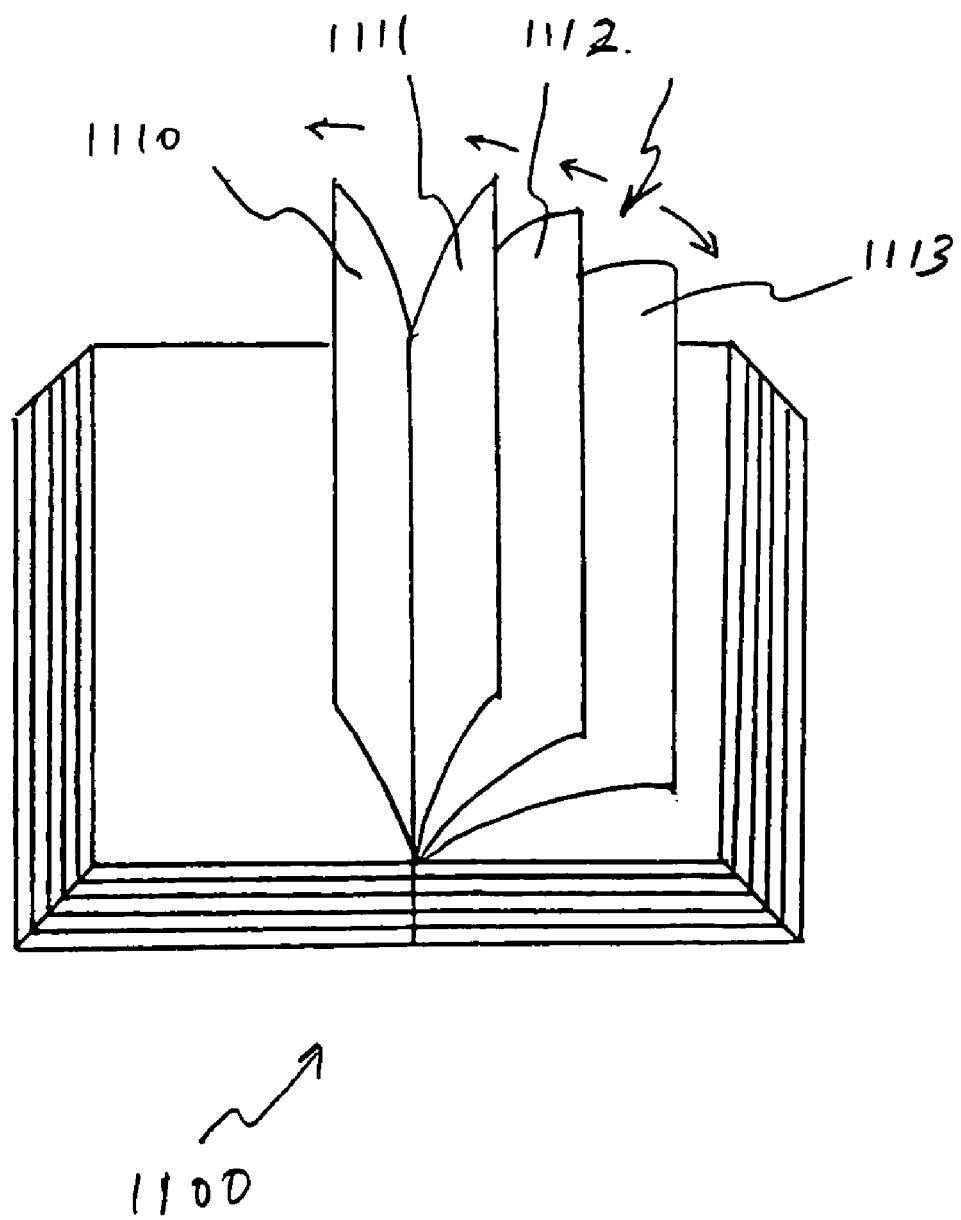
FIG. 21 is a top perspective view of a computer book showing the change of direction of a trailing page.

FIG. 19 shows a number of pages (1110-1113, etc.) being flipped from the right side of a computer book 1100 to the left side of the computer book 1100. (Pages 1114 and 1115 are still resting on the right side of the computer book 1100). Starting from this flipping state of all the pages (1110-1113, etc.) in FIG. 19, FIG. 20 shows the flipping direction of all the pages (1110-1113, etc.) being reversed and changed in the midst of flipping. Starting from the flipping state of all the pages (1110-1113, etc.) in FIG. 19, FIG. 21 shows the direction of the trailing page 1113 being reversed and changed in mid-flip while the other pages (11110-1112) continue to flip to the left side of the computer book 1100.

Figure 22:
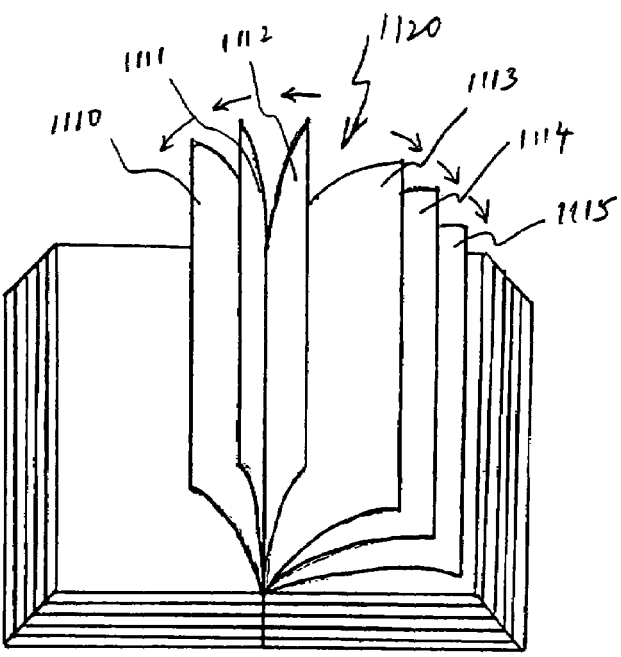
FIG. 22 is a top perspective view of a computer book showing the change of direction of a group of trailing pages.

Starting from the flipping state of all the four pages (1110-113) in the computer book 1100 in FIG. 19 and a few more pages (1114 and 1115) being launched in the same direction (from right to left) subsequently, FIG. 22 shows the direction of flipping of a group of trailing pages (1113, 1114, and 1115) being reversed and changed to going from left to right while the other pages (1110, 1111, and 1112) continue to flip from right to left. The region 1120 between the two sets of pages (1110-1112 on the one hand and 1113-1115 on the other) begin to "open up" and as the two sets of pages continue to flip further in opposite directions, in FIG. 23 it is shown that the region 1121 between them (pages 1110-1112 on the one hand and pages 1113-1115 on the other) opens up further.

Figure 23:
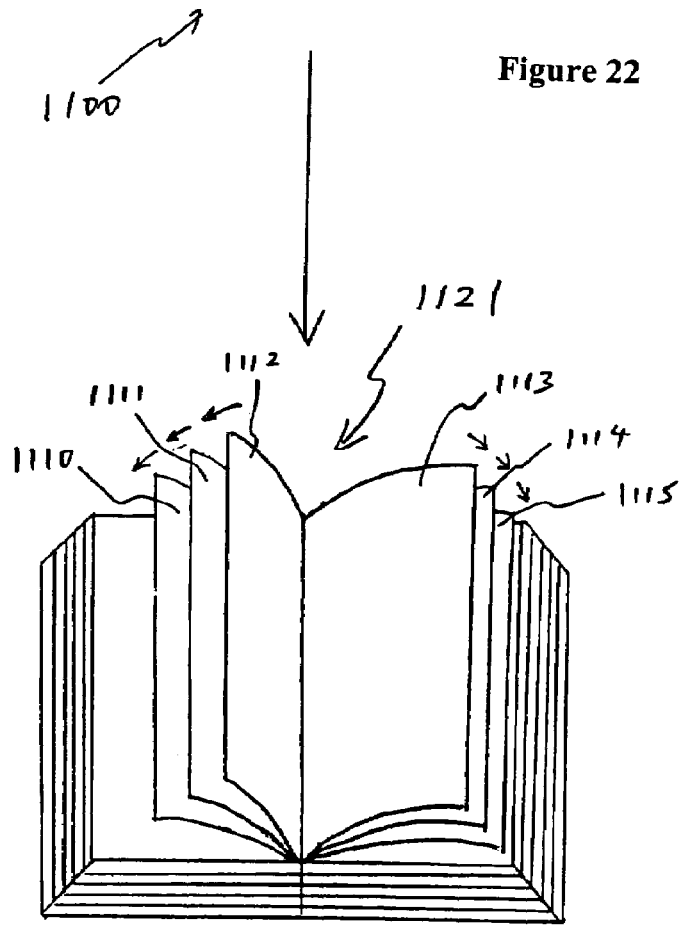
FIG. 23 is a top perspective view of a computer book showing the opening up of a region in the flipping pages.

Starting from the flipping state of all the pages (1110-1115) in the computer book 1100 in FIG. 23, in which some of the pages (1110-1112) are flipping from right to left and some of the pages (1113-1115) are flipping from left to right, when a certain browsing control command is given, as shown in FIG. 24, the direction of flipping of the trailing page of the group of pages (1113-1115) on the right side—page 1113—is reversed and changed to flipping from right to left while pages 1114 and 1115 continue to flip from left to right and the region 1123 between the page 1113 and the page 1114 begins to open up.

Figure 25:
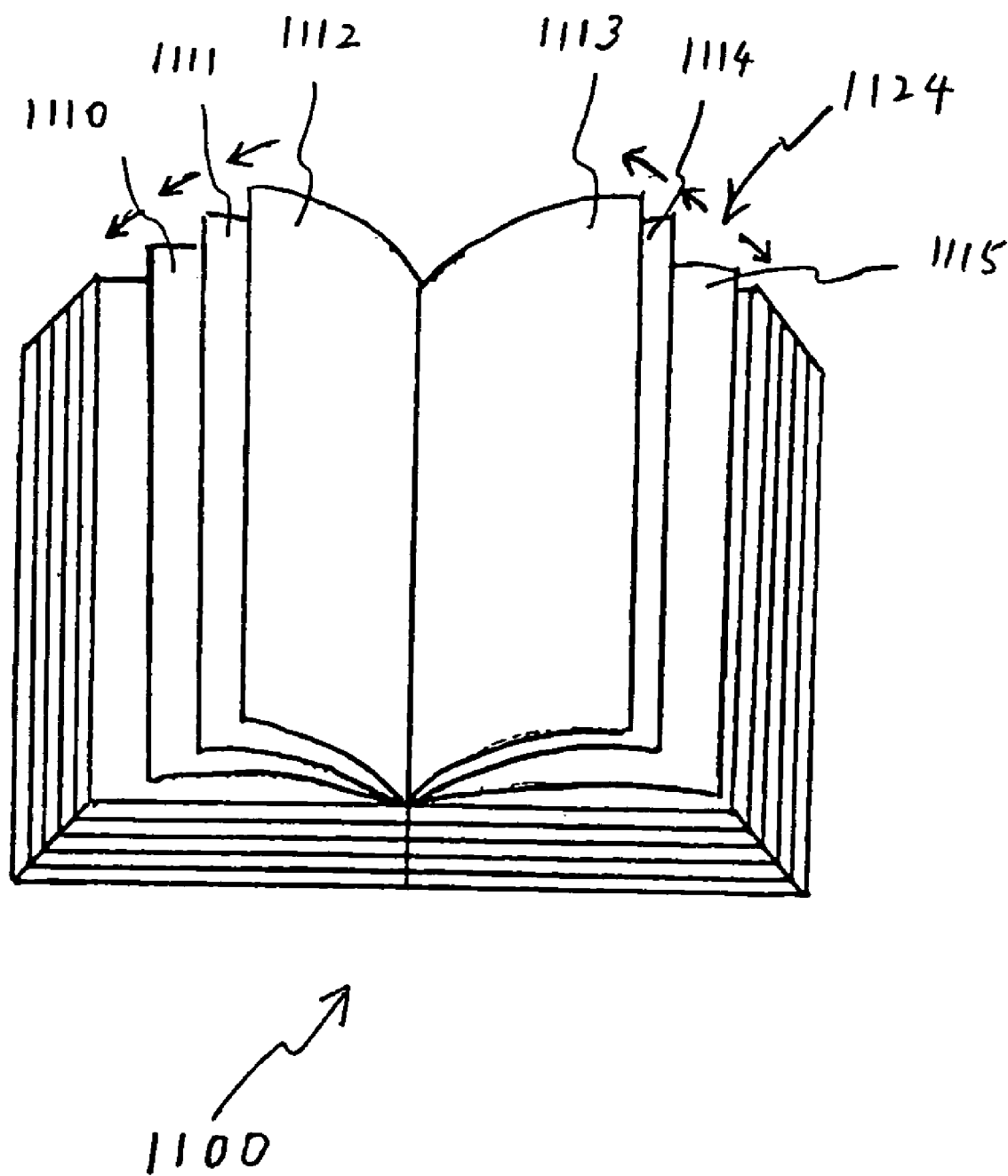
FIG. 25 is a top perspective view of a computer book showing the change of direction of a number of trailing pages in a right subgroup of flipping pages.

Starting from the flipping state of all the pages (1110-1115) in the computer book 1100 in FIG. 23, in which some of the pages (1110-1112) are flipping from right to left and some of the pages (1113-1115) are flipping from left to right, when a certain browsing control command is given, as shown in FIG. 25, the direction of flipping of a group of trailing pages (1113 and 1114) of the group of pages (1113-1115) on the right side are reversed and changed to flipping from right to left, thus creating a region 1124 that opens up gradually.

Figure 26:
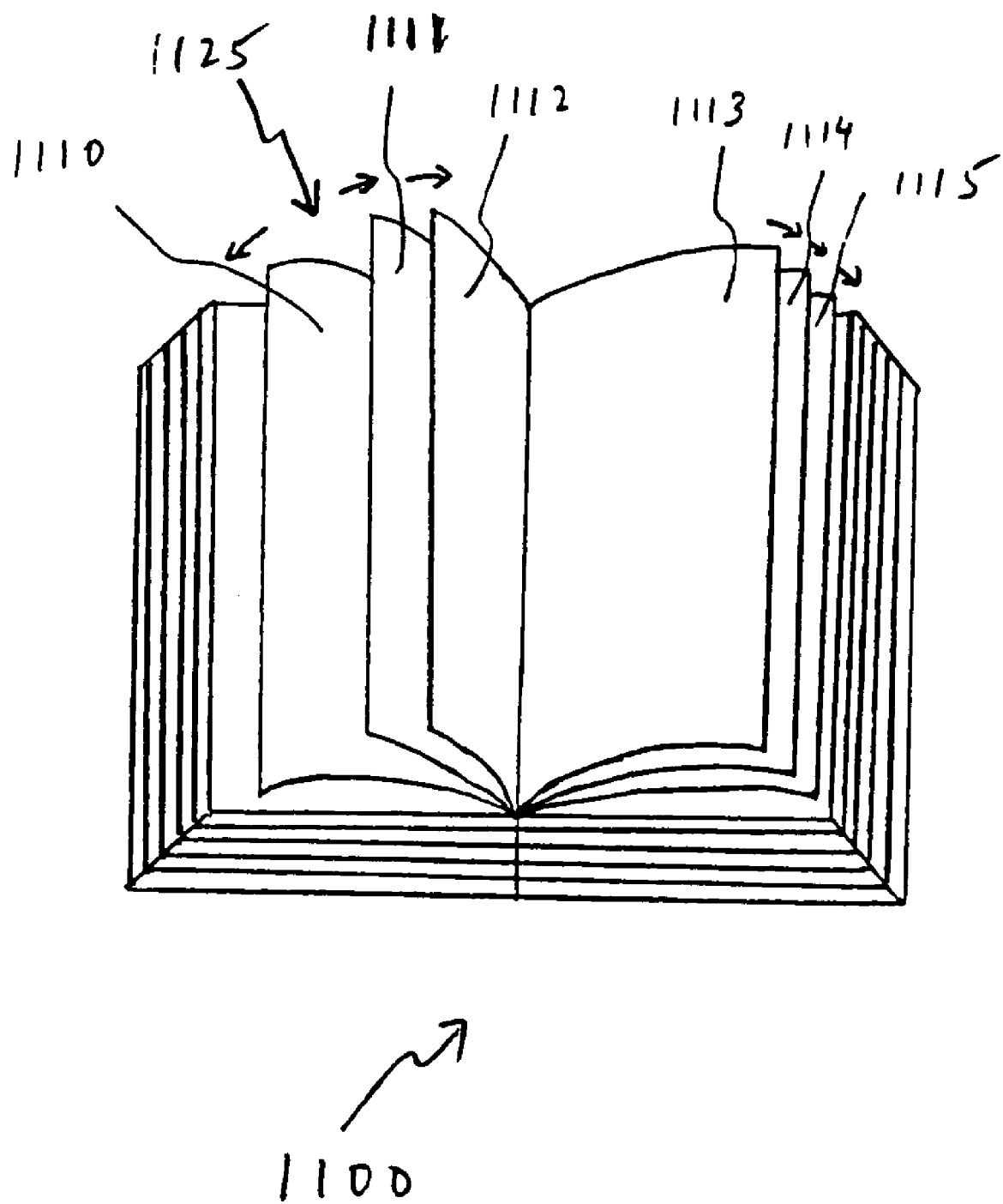
FIG. 26 is a top perspective view of a computer book showing the change of direction of a number of trailing pages in a left subgroup of flipping pages.

Starting from the flipping state of all the pages (1110-1115) in the computer book 1100 in FIG. 23, in which some of the pages (1110-1112) are flipping from right to left and some of the pages (1113-1115) are flipping from left to right, when a certain browsing control command is given, as shown in FIG. 26, the direction of flipping of a group of trailing pages (1111 and 1112) of the group of pages (1110-1112) on the left side are reversed and changed to flipping from left to right, thus creating a region 1125 that opens up gradually.

Figure 27:
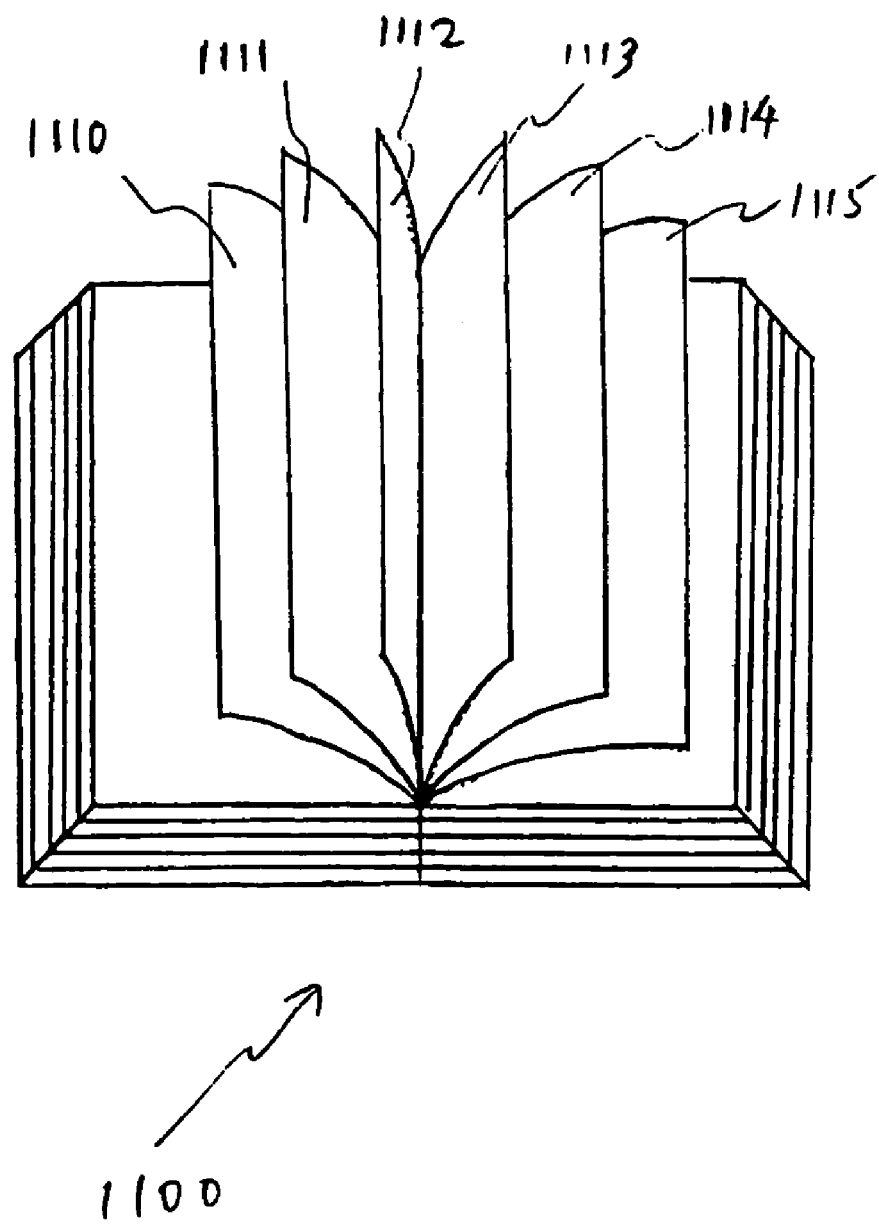
FIG. 27 is a top perspective view of a computer book showing the freezing of flipping actions of the pages in the midst of flipping across the computer book.

FIG. 27 shows that starting from the flipping configuration of the computer book 1100 in FIG. 19, say, or any of the flipping configuration of the computer book 1100 in FIGS. 20-26, all the pages are made to stop flipping and "freeze" in mid-flip.

After the pages enter this frozen state, they can be "unfrozen". There are 4 situations after "unfreezing": 1. pages are unfrozen and then individual pages continue to flip in the directions prior to freezing; 2. pages and unfrozen and all pages flip in the same direction; 3. pages are unfrozen and some pages flip in the direction right to left to rest on the left side and some flip in the direction left to right to rest on the right side of the book; 4. pages are unfrozen and subgroups of pages flip in different directions.

Figure 28:
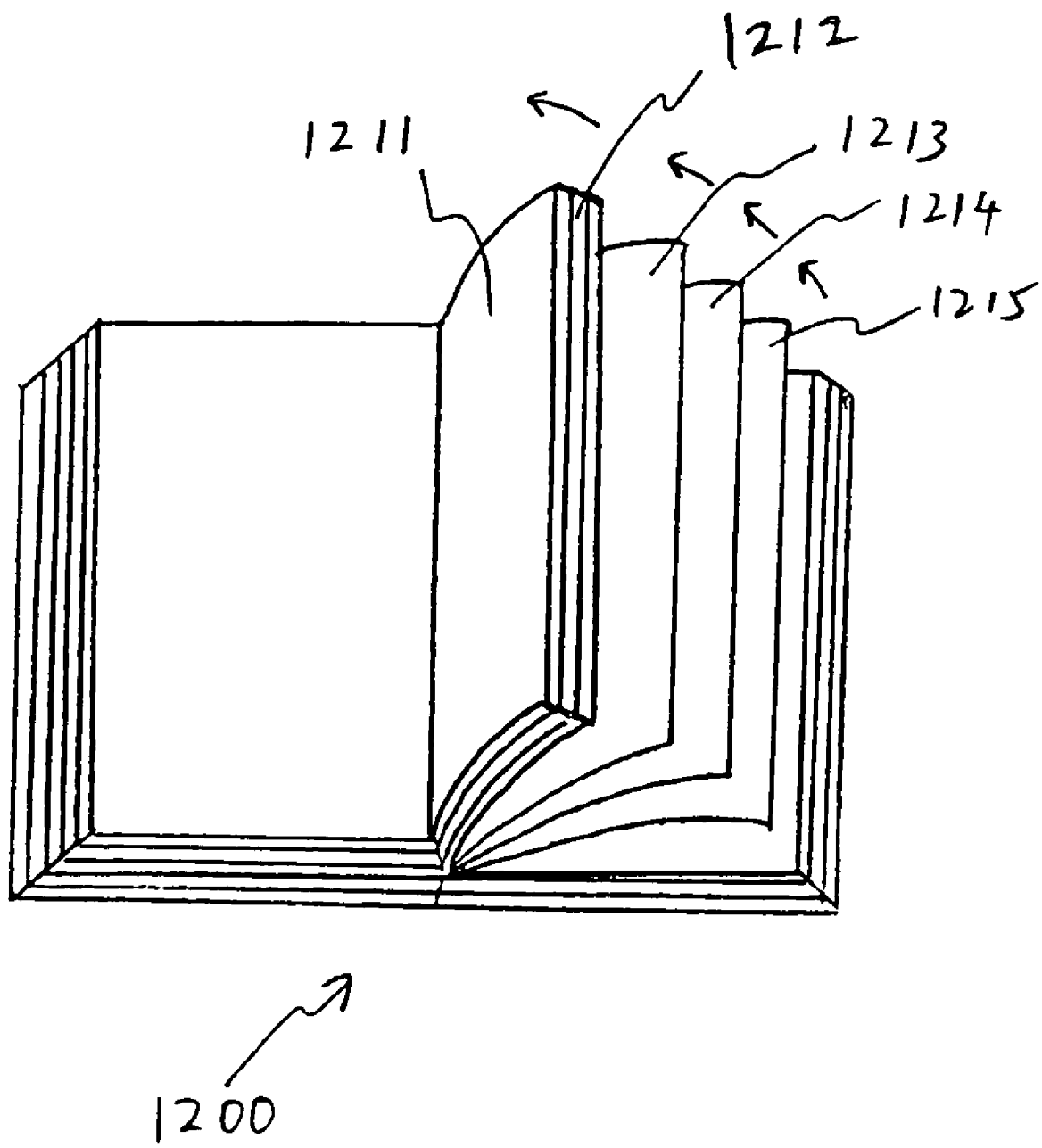
FIG. 28 is a top perspective view of a computer book showing a collection of flipping pages followed by a series of single flipping pages.

FIG. 28 shows firstly that a collection of pages 1212 is being flipped from right to left as a result of, say, a jump operation due to either a bookmark or a jump cursor activation such as that depicted in FIG. 18, and then that it is followed by a number of trailing single flipping pages 1213-1215 that are launched subsequently.

Figure 29:
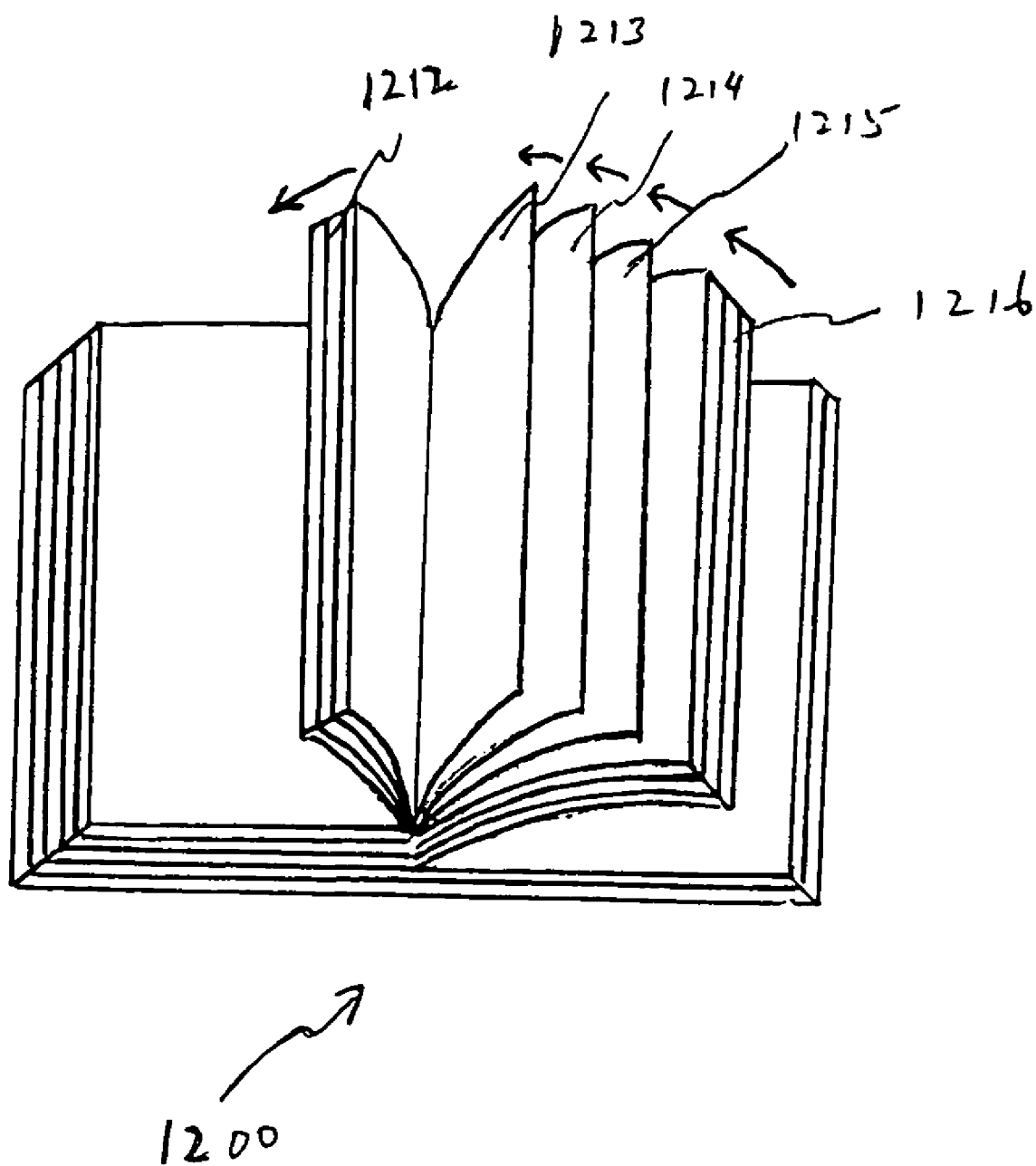
FIG. 29 is a top perspective view of a computer book showing more than one collection of flipping pages together with a number of single flipping pages.

Starting from the flipping configuration of FIG. 28, say, in which a collection of pages 1212 being flipped is followed by a number of flipping single pages (1213-1215), a further launching of a collection of pages 1216 is activated as depicted in FIG. 29 as a result of a jump operation due to either a bookmark or a jump cursor activation such as that depicted in FIG. 18. Subsequent to this, the further launching of any combination of single and/or collection of flipping pages is possible. Subsequent changes of direction of flipping and other movement effects including the freezing in mid-flip of all or some subgroups of this combination of single and/or collection of flipping pages in ways similar to those described for single flipping pages in FIGS. 20-27 are possible. That is, the collections of pages such as 1212 and 1216 would behave like the single pages in FIGS. 20-27.

Figure 30:
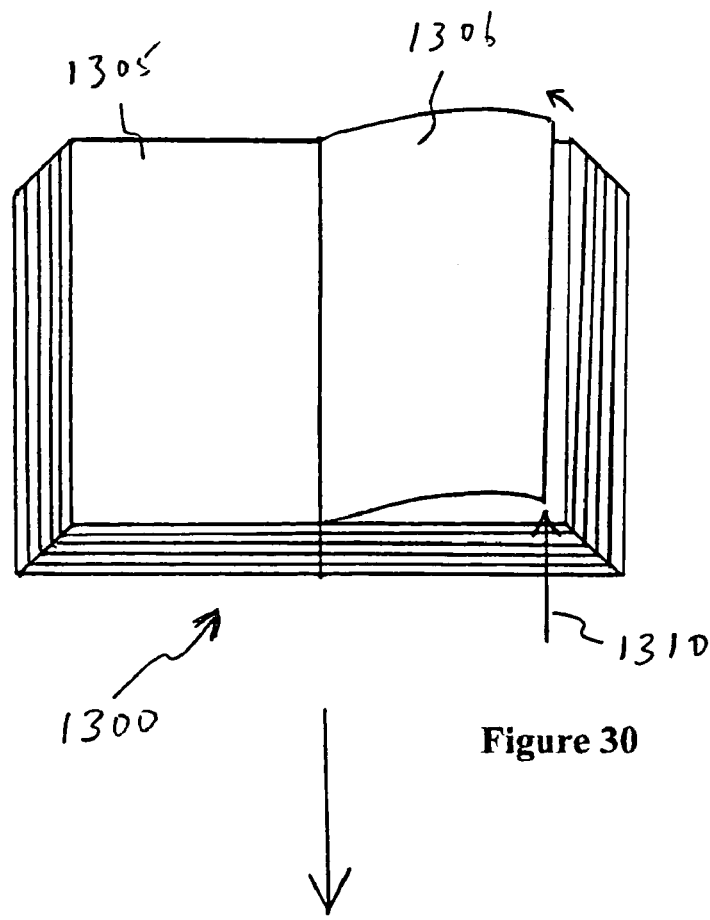
FIG. 30 is a top perspective view of a computer book showing a right-hand page being picked up.
Figure 31:
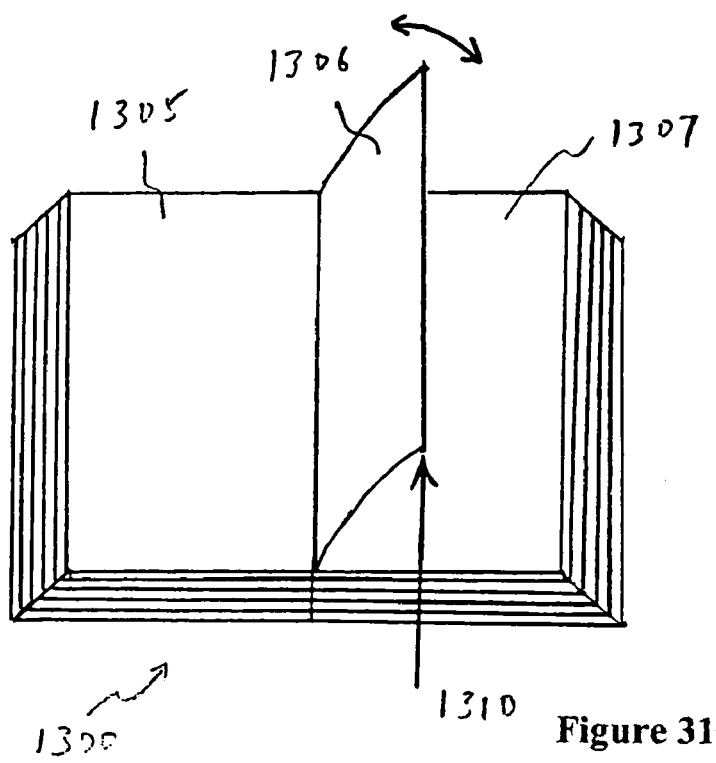
FIG. 31 is a top perspective view of a computer book showing a picked-up page being held and flipped about.

FIGS. 30 and 31 depict a hold-and-flip method of manipulating a flipping page. Starting from a configuration in which a page is initially at rest, say on the right-hand side of a computer book 1300, such as page 1306 shown in FIG. 30, a pointer 1310 picks up the page 1306 from its resting position on the right-hand side of the computer book 1300, and then the page is flipped by the pointer 1310 as depicted in FIG. 31 either in the direction right to left or left to right. This way, both sides of page 1306 can be inspected repeatedly as many times as it is desired.

Figure 32:
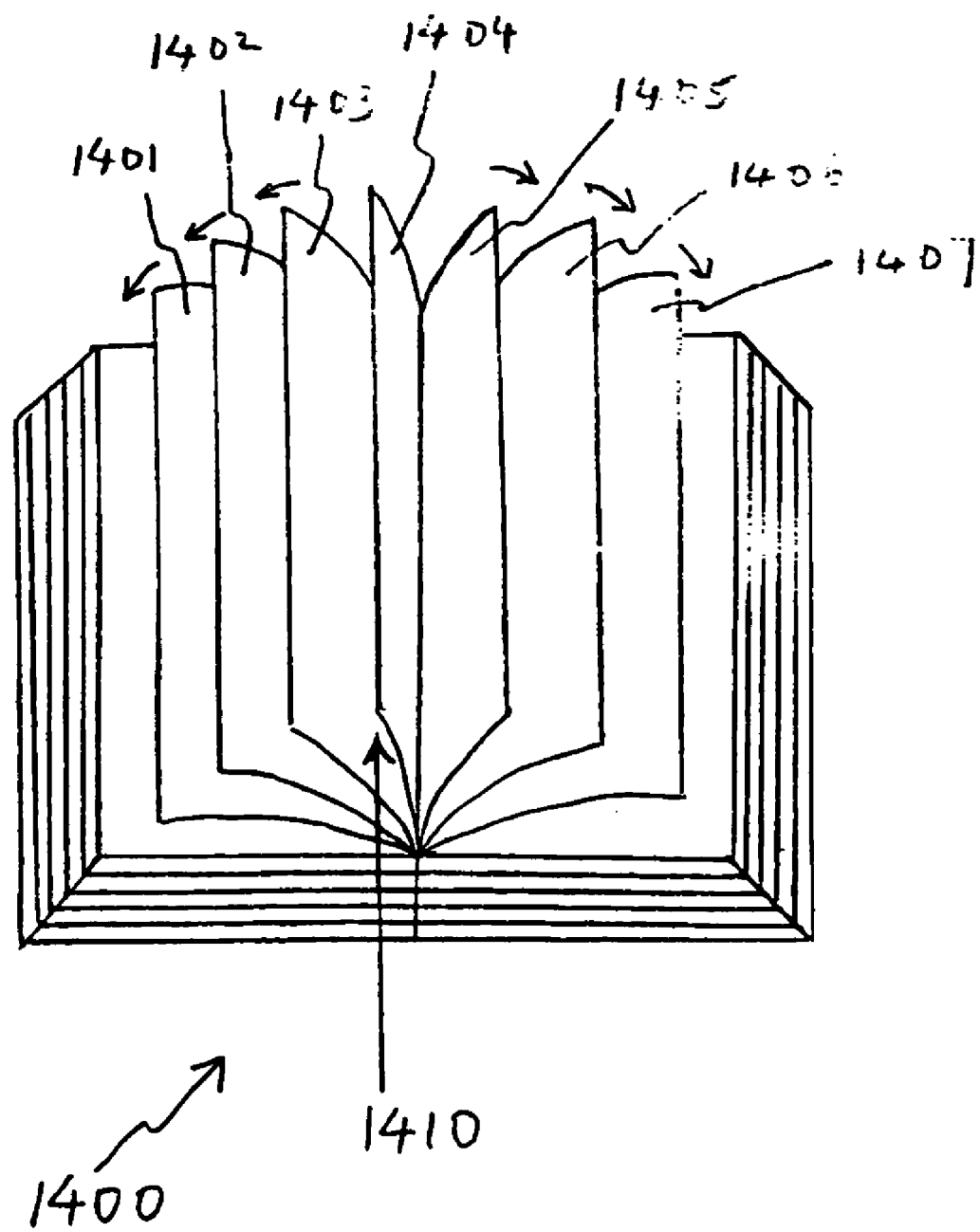
FIG. 32 is a top perspective view of a computer book showing a picked-up page being held while other pages return to their respective resting positions on the left and right sides of the computer book.

In another method of entering the "hold-and-flip" mode, FIG. 32 depicts a pointer 1410 picking up a flipping page 1404 in the midst of a flipping action, which might be a flipping page in one of those flipping configurations depicted in FIGS. 19 to 26 or a page in a frozen state such as depicted in FIG. 27. Thereafter, all the pages 1401-1403 to the left of it and all the pages 1405-1407 to the right of it fall away and end up resting on the left side and the right side of the computer book 1400 respectively. This picked-up page can then be flipped about and inspected in the hold-and-flip mode.

Figure 33:
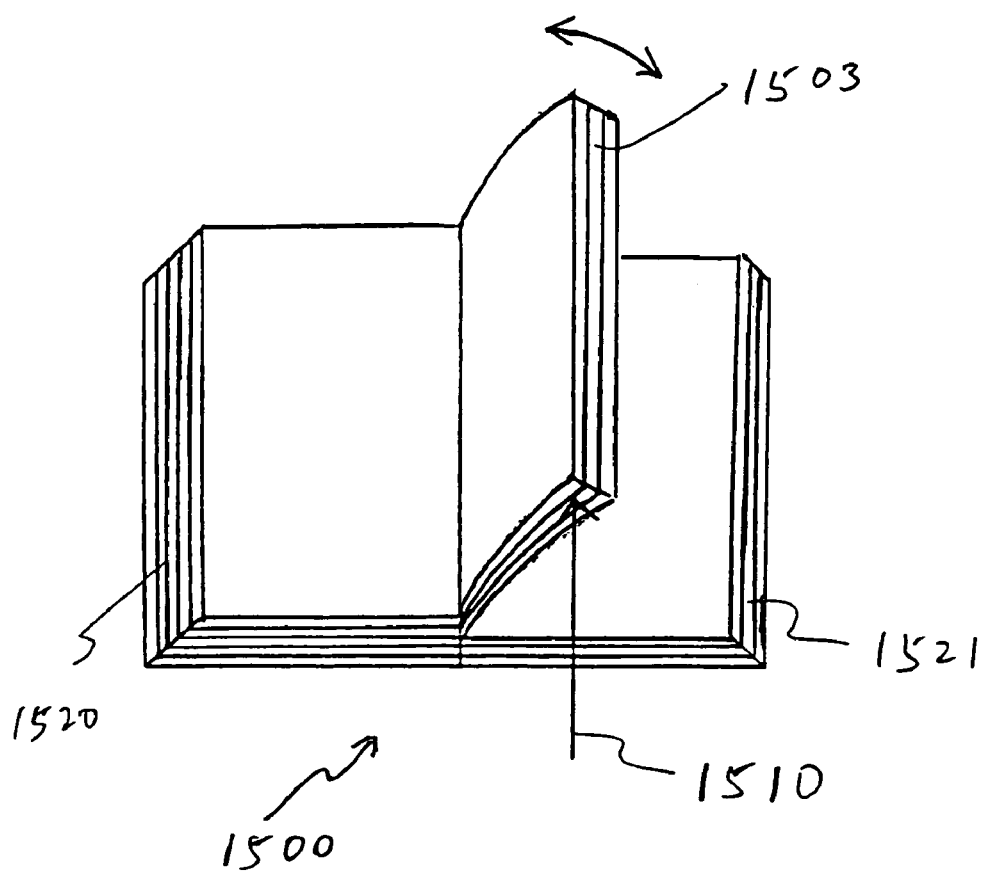
FIG. 33 is a top perspective view of a computer book showing a collection of pages being held and flipped about.

FIG. 33 depicts the picking up of a collection of pages 1503 in a computer book 1500 and the subsequent flipping-about action. This is the hold-and-flip method of manipulating a collection of flipping pages instead of just a single page. The collection of pages 1503 can be picked up from its resting state from, say, the right side of the computer book 1500 or from the midst of a flipping action, say, in a configuration such as that depicted in FIG. 29 in which a number of collections of flipping pages are shown to be in flipping action.

Figure 34:
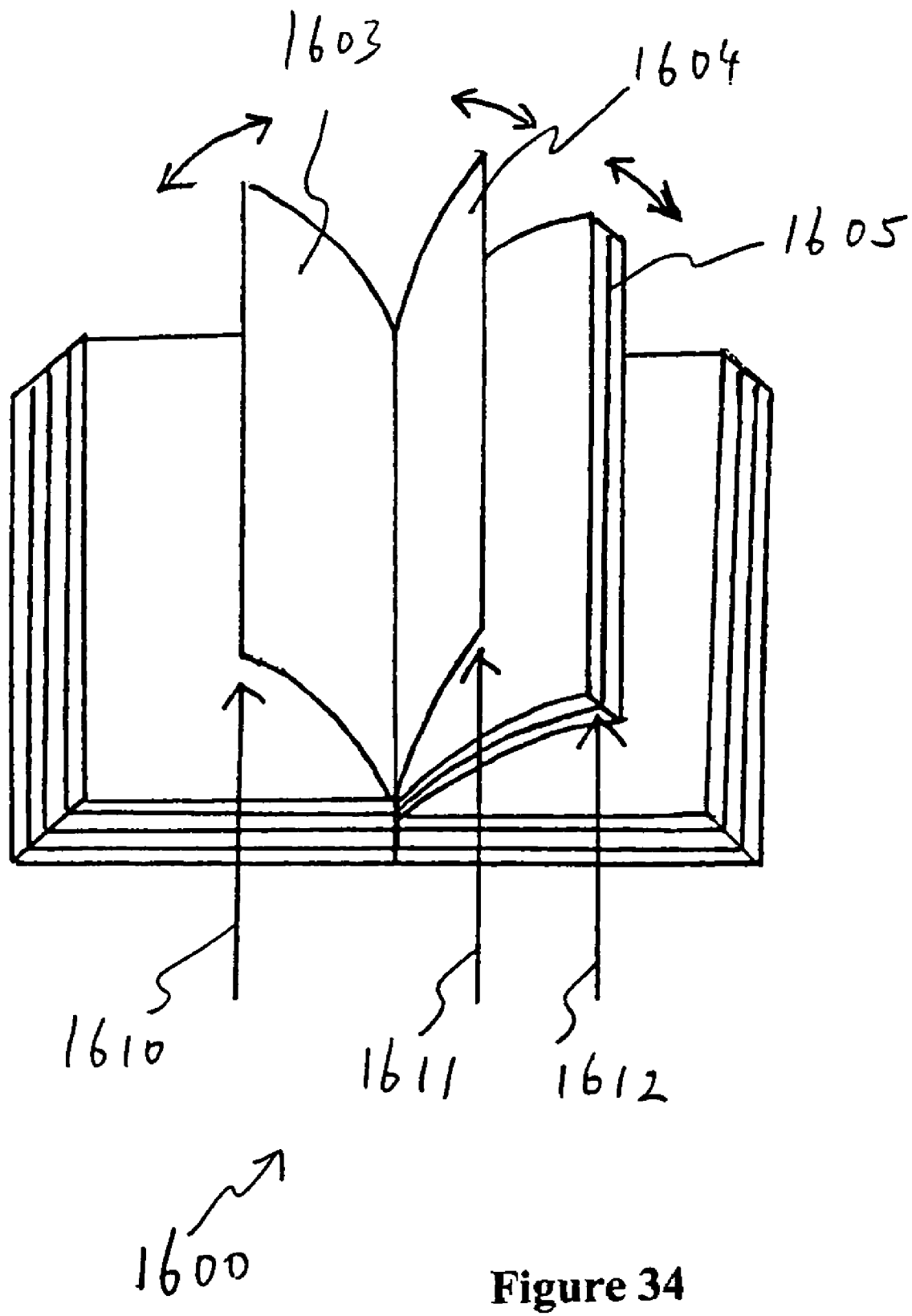
FIG. 34 is a top perspective view of a computer book showing a number of single pages and collections of pages being held and flipped about.

FIG. 34 depicts the simultaneous hold-and-flip action applying to more than one single page (e.g., 1603 and 1604) and/or collection of pages (e.g., 1605). A number of pointers (1610-1612) are involved in the holding and flipping action.

FIGS. 35 and 36A-C depict a hold-and-collect method of manipulating pages in a computer book 1700. A page 1705 in the computer book 1700 is first picked up by a pointer 1710 (either when the page 1705 is at rest on the right or left side of the computer book 1700 or when it is in the midst of some flipping action). And then, pages 1720-1725 to its left and/or right sides, whether they are initially in the midst of some flipping action or at rest on the left and/or right side of the computer book 1700, are all "collected" onto the page 1705, resulting in a collection of pages 1706 as shown in FIGS. 36A-C. This entire collection 1706 can then be flipped about as depicted in FIGS. 36A-C.

Figure 37:
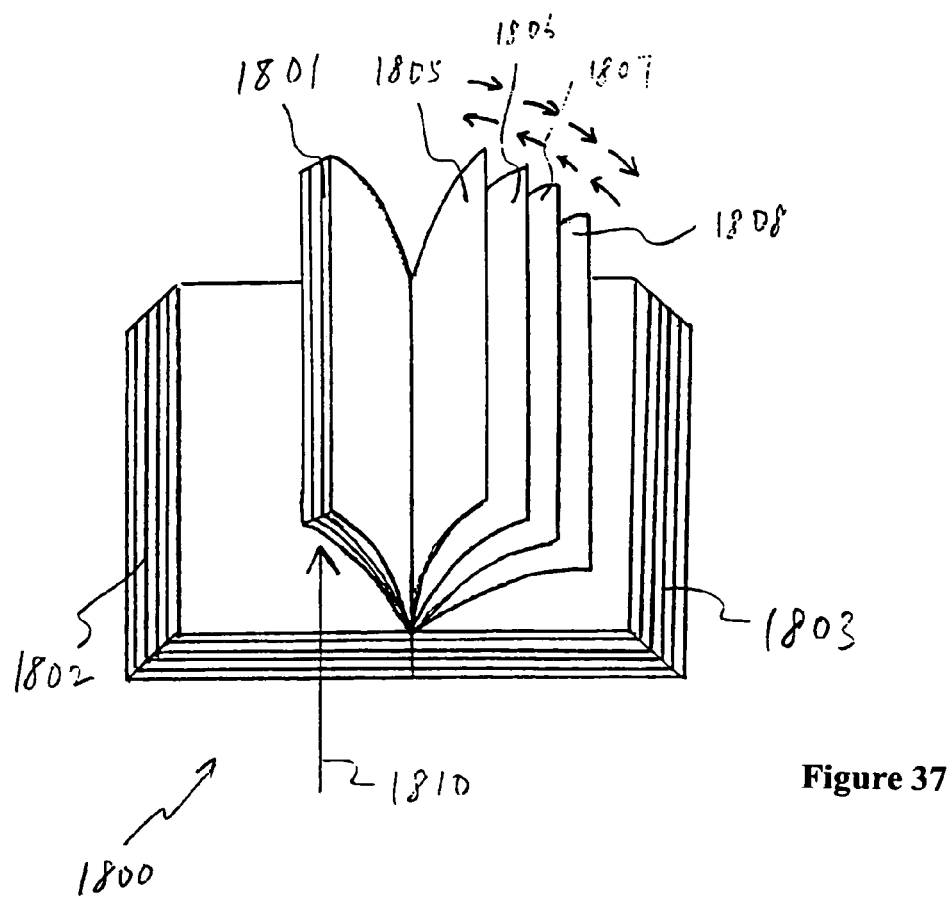
FIG. 37 is a top perspective view of a computer book showing a collection of pages being held and forming a sub-book together with the right side thickness of the computer book while flipping and browsing actions are carried out on a number of pages between them.

FIG. 37 depicts a hold-and-browse method of manipulating pages in a computer book 1800. A single page and/or a collection of pages 1801 is first picked up by a pointer 1810. And then, this collection of pages 1801 and the right side thickness 1803 become a new "sub book" between which all kinds of browsing and flipping actions can take place for a number of pages (such as pages 1805-1808).

Figure 38:
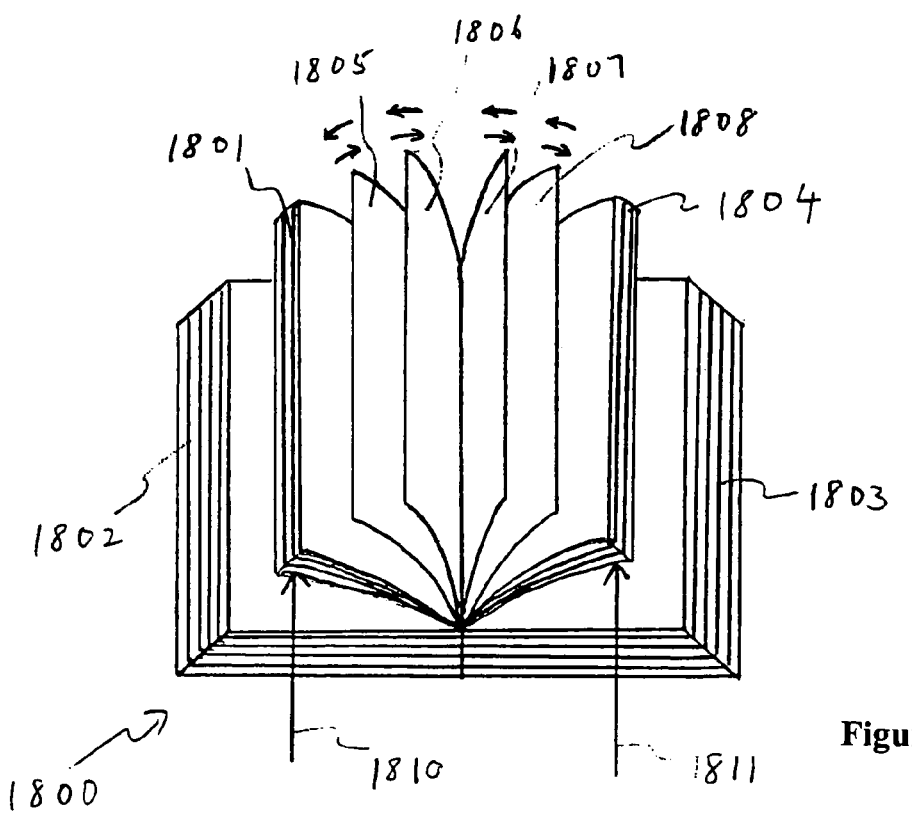
FIG. 38 is a top perspective view of a computer book showing two collections of pages being held forming a sub-book between them while flipping and browsing actions are carried out on a number of pages between them.

FIG. 38 depicts another hold-and-browse method of manipulating pages in a computer book 1800 involving two collections (1801 and 1804) of pages. The two collections of pages 1801 and 1804 are being picked up by two pointers 1810 and 1811 respectively. These two collections of pages 1810 and 1811 then become a "sub book" between which all kinds of browsing and flipping actions can take place for a number of pages (such as pages 1805-1808). In general, any two pages and/or collection of pages can be made into a "sub book" between which the usual browsing and flipping action of a number of pages can take place.

FIG. 39 summarizes different basic and complex flipping actions described above.

All the complex flipping actions depicted in FIGS. 19-39 can be controlled by either one of the browsing controllers depicted in FIGS. 12-16 or one of these browsing controllers in conjunction with a mouse and/or other pointing and control methods and mechanisms.

For example, starting from the flipping state of the pages 1110-1113 of the computer book 1100 depicted in FIG. 19, which was created, say, by a quick depressing and releasing (in the −z direction, say) of a browsing controller 164 mounted on the right side of a browsing device 160 depicted in FIG. 4, to change the direction of flipping of the all the pages 1110-1113 depicted in FIG. 20, one method is to effect a quick depressing and releasing of the browsing controller 163 mounted on the left side of the browsing device 160 depicted in FIG. 4. This is like sending an "opposing force" to change the direction of flipping. Subsequent depressing and releasing of the left browsing controller 163 may launch more pages from the left side of the computer book 1100 to flip in the direction from left to right.

Suppose it is desired that not the direction of all the pages 1110-1113 are to be reversed, instead, only the direction of the trailing page 1113 is to be reversed as depicted in FIG. 21, one method is to depress the left browsing controller 163 rapidly (say, within 100 milliseconds) all the way to its maximum depression limit. This is like sending a "penetrating opposing force" all the way to the trailing page 1113, bypassing all the intervening pages 1110-1112.

Another method of achieving the action of FIG. 4, that is to generate a "penetrating opposing force", is to use the y-direction movement of the browsing controller 163. A sliding of the browsing controller's 163 sensor surface in the −y direction, say, combined with a quick depression and releasing of the browsing controller in the −z direction, say, will reverse the direction of the trailing page 1113 as depicted in FIG. 4.

In some mode of operation, all the four bookmarking buttons on one side, say buttons 174-177, of the browsing device 160 depicted in FIG. 4 are used to generate bookmarks, say bookmarks 230-233 on the right side thickness 212 of a computer book 200 depicted in FIG. 6. In other modes of operations, perhaps only two of the buttons, say, buttons 174 and 175, are used for bookmarking and the other two buttons, say, buttons 176 and 177, can be used for other operations. To achieve the operation of reversing the flipping direction of the trailing page depicted in FIG. 21, one method is to use the pressing and holding of one of these buttons that is not used for bookmarking, say button 172, on the left side of the browsing device 160 combined with the quick depressing and releasing of the browsing controller 163 on the left side of the browsing device 160. This is yet another method of generating a "penetrating opposing force".

To effect the reversal of flipping direction of a group of trailing pages, such as trailing pages 1113-1115 as depicted in FIG. 22, one method is to generate a "penetrating opposing force" as many times in succession as there are pages whose directions are to be reversed. For example, if there are three pages 1113-1115 whose directions are to be reversed as depicted in FIG. 22, then three successive rapid depressing and releasing of the left browsing controller 163 of the browsing device 160 of FIG. 4 all the way to its maximum allowable limit of depression will send three successive "penetrating opposing forces" to the pages 1113-1115 and reverse their direction of flipping, thereby opening up the region 1120 between the pages 1112 and 1113.

If a pointing device, say a track point (for example, the track point installed in IBM Notebook Model 765D) or a mouse, together with its associated buttons, is available, and say, preferably mounted on the browsing device 160 so that the fingers can control the pointing device as well as the browsing controllers (163 and 164) and buttons (170-177, 180-187) on the browsing device 160 at the same time, then one method to effect the operation depicted in FIG. 22 is by using the pointing device to move a pointer ("mouse cursor") over the region to be "opened up"—the region 1120 depicted in FIG. 22—and effecting an action using the usual method of clicking on a button associated with the pointing device (i.e., a "mouse button").

Further changes in directions of one or more flipping pages as depicted in FIGS. 24-26 can be effected by one of the above methods of generating a "penetrating opposing force" or by using a pointing device to point to the exact region to be "opened up".

One method of freezing the flipping pages 1110-1115 in mid-flip as depicted in FIG. 27 is to effect a "equal and opposite" force in both directions of flipping (i.e., from right to left and from left to right). One method of achieving this to activate both browsing controllers 163 and 164 on the browsing device 160 depicted in FIG. 4 at the same time by depressing and holding or depressing and releasing them.

To achieve the operation depicted in FIG. 28, where a number of pages 1213-1215 follow the flipping collection of pages 1212, one method is, after having effected the flipping of the collection of pages 1212 through a jump operation using a method described above and while the collection of pages 1212 is still in the midst of flipping across the computer book 1200, to launch subsequent successive flipping pages by using one of the methods of launching successive flipping pages described above, such as by successively quickly depressing and releasing, say, the browsing controller 164 on the right side of the browsing device 160.

To achieve the operation depicted in FIG. 29, where a second collection of flipping pages 1216 is launched while a first collection of flipping pages 1212 and some trailing single flipping pages 1213-1215 are still in the midst of flipping across the computer book 1200, a jump operation involving the use of the jump cursor or a bookmark to launched the second collection of flipping pages 1216 from the right side of the computer book 1200 can be effected using one of the methods described above.

To achieve the hold-and-flip action described in FIGS. 30 and 31, one method is, starting from when both left and right pages 1305 and 1306 of the computer book 1300 in FIG. 30 are at rest in their respective positions on the left and right side of the computer book 1300, to use a y-direction movement of the browsing controller 164, say, on the right side of the browsing device 160 depicted in FIG. 4 to effect a "picking-up" of the page 1306. Thereafter, the mode of "holding a page" is entered and to move the held page 1306 back and forth instead of allowing it to flip automatically all the way to the other side of the computer book 1300, a "balancing opposing force" mode can be created by depressing simultaneously (within 50 milliseconds) both the left and right browsing controllers (163 and 164) on the browsing device 160, and then depending on which browsing controller (163 or 164) has a stronger force (e.g., is depressed further down), the held page 1310 will flip slowly (i.e., not completing the flipping action across the entire computer book 1300) in the direction opposite to the position of that browsing controller (i.e., if the left browsing controller 163 has a stronger "force", the held page 1306 will flip slowly from left to right).

Another method of picking up a page 1306 is to use a bookmarking button on the corresponding side (e.g., one of buttons 174-177 or 184-187) that is not in use for bookmarking operation. Yet another method of picking up a page 1306 is to use a pointing device to point at, say, the right bottom corner of the page 1306 and effect a button click associated with the pointing device. Thereafter, the page can be moved back and forth using the "balancing opposing force" method described above using the browsing controllers 163 and 164 on the browsing device 160 or by using the movement of the cursor associated with the pointing device (i.e., the cursor can move left or right on the computer screen to indicate, say, where the right edge of the held page 1306 should be positioned).

To select and hold a flipping page 1404 in the midst of flipping among all the other flipping pages (1401-1403, 1405-1407) and then letting the other pages then fall to their respective sides as depicted in FIG. 32, one method is to use a number of y-direction movements (say, -y direction movements) of a browsing controller (say browsing controller 164 on the right side of the browsing device 160 depicted in FIG. 4) to indicate the number of intervening pages between the desired page 1404 and the right side thickness of the computer book 1400 to skip pass to pick up the desired page 1404. Another method is to use a pointing device's cursor to point at and select the desired page 1404.

One method of entering the hold-and-flip mode for a collection of pages 1503 depicted in FIG. 33 is to first use a -y direction, say, movement of the browsing controller 164 on the right side of the browsing device 160 as depicted in FIG. 4 to indicate that the "hold-and-flip" mode is entered, and then using one of the methods described above for selecting a page to jump to on the right side thickness 1521 of the computer book 1500, i.e., using the jump cursor or a bookmark, the collection of pages 1503 can then be "picked-up" and moved back and forth using one of the methods described above for moving a single "picked up" and held page. Another method is to use a pointing device to activate a special "hold-and-flip" jump cursor situated at the bottom right corner of the right side thickness 1521 of the computer book 1500. Using this jump cursor, any position on the right thickness 1521 can be selected and when the jump is activated, the collection of pages 1503 between the then right-hand page and the "jump-to" page is not flipped automatically to the other side of the computer book 1500 as in the situation of a typical jump operation, instead it is "held" by the pointing device and can be moved back and forth across the computer book 1500 as desired.

After a single page or a collection of pages is picked up and held in a "hold-and-flip" mode, to exit the mode the held page or collection of pages can be flipped to the extreme left or right, signaling the desire to return the page or collection of pages to the respective side of the book.

The methods of "holding-and-flipping" of single or collection of pages described above can be applied repeatedly while one or more single or collection of pages are still in the hold-and-flip mode to create the configuration depicted in FIG. 34 in which more than one single or collection of pages are in the hold-and-flip mode.

Figure 35:
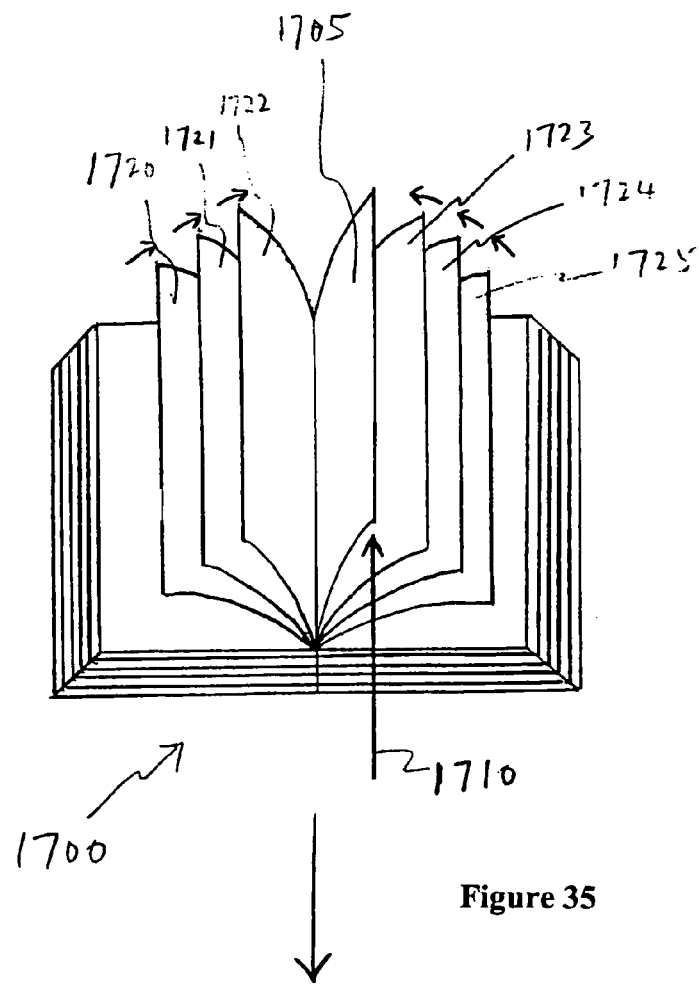
FIG. 35 is a top perspective view of a computer book showing a single page being held while a number of other flipping pages are collected onto it.
Figure 36:
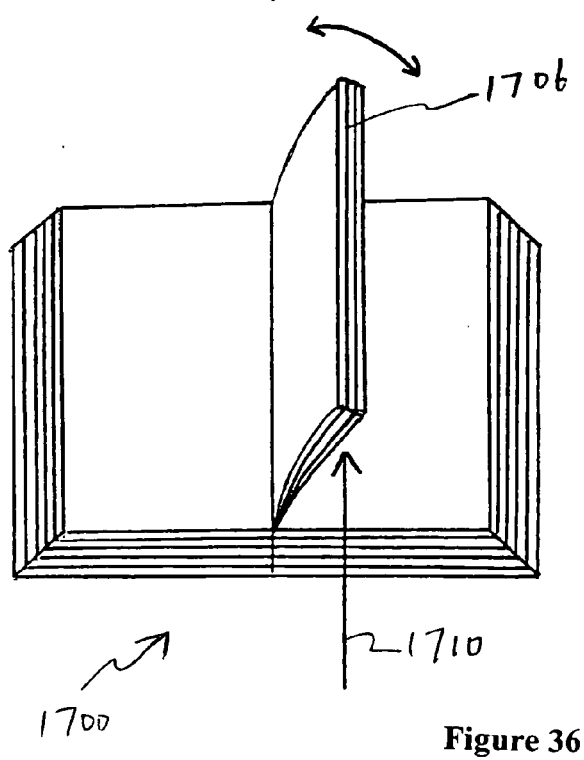
FIGS. 36A-C are top perspective views of a computer book showing the effect of holding a single page and collecting a number of flipping pages onto it, as well as pages being released and split.
Figure 36:
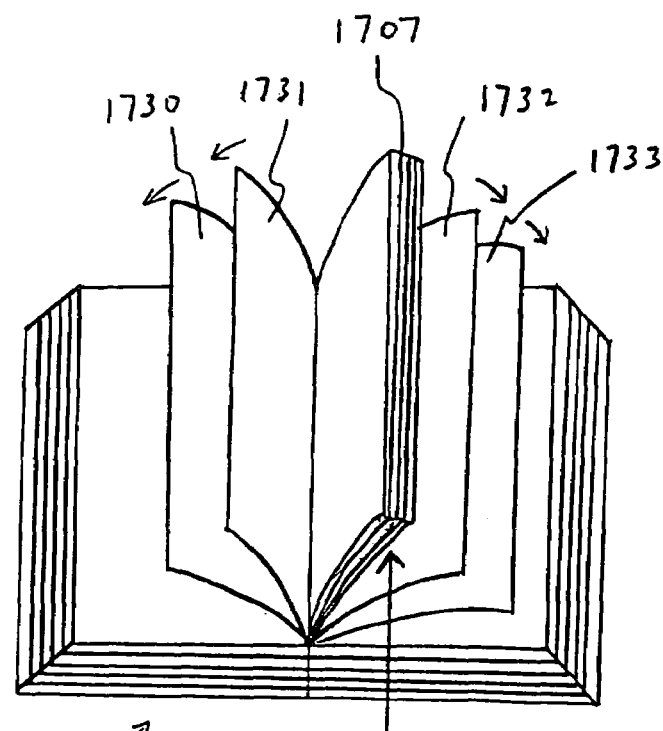
Figure 36:
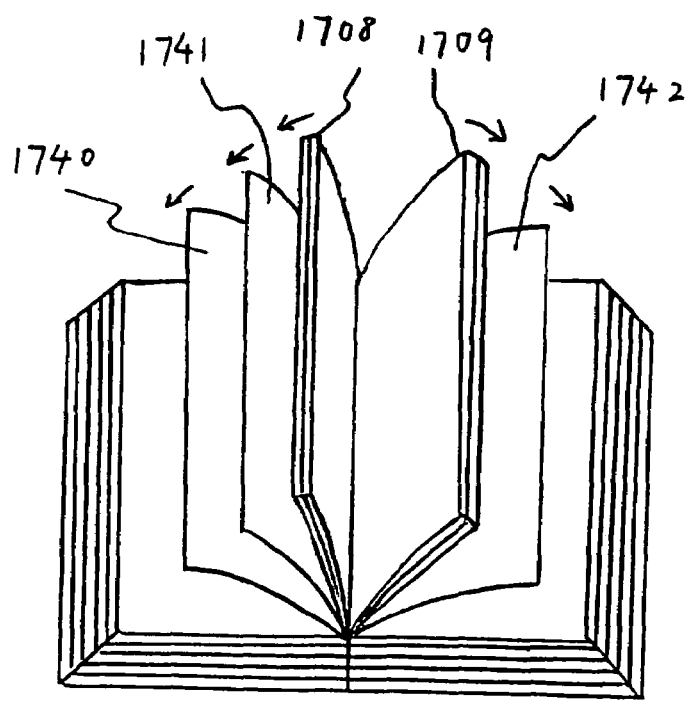

To enter the hold-and-collect mode depicted on FIGS. 35 and 36A, after having entered the hold-and-flip mode using one of the methods described above, flipping actions that will flip pages from the left side of the computer book 1700 to the right side or vice versa are activated using one of the page flipping methods described above. These flipping pages, instead of flipping across the entire computer book 1700 will instead collect at the page 1705 that is being "held". Subsequently, back and forth movement of the collection of pages 1706 as depicted in FIG. 36A can be effected by one of the methods described above.

After entering the hold-and-collect mode and after having collected a number of pages as depicted in FIG. 36A, pages can be released from the collection of pages. As depicted in FIG. 36B, pages 1730-1733 are being released from the collection 1707 in back to the respective sides of the computer book 1700. The held collection of pages 1707 depicted in FIG. 36B can also be "split" using something similar to a jump cursor to select a point on the collected thickness to effect the split. FIG. 36C depicts the action of splitting a held collection of pages into two collections of pages 1708 and 1709. FIG. 36C also depicts other pages 1740-1742 that have been released from the held collection of pages earlier.

After having a single or collection of pages 1801 entered the "hold-and-flip" mode, a "hold-and-browse" mode can be entered in which the held single or collection of pages 1801 acts like one side 1802 of the computer book 1800 and all actions that can normally be effected between the left thickness 1802 and the right thickness 1803 can now be effected between the held collection of pages 1801 and the right side thickness 1803 as depicted in FIG. 37. To enter the hold-and-browse mode after the hold-and-flip mode is entered, one method is to use the pointing device with its associated cursor on the computer screen to click on the held collection of pages 1801 and the right side thickness 1803. This signifies that the hold-and-browse mode is entered and a "sub book" is created between the collection of pages 1801 and the right side thickness 1803 between which all of the normal operations associated with flipping pages can be effected. To exit the hold-and-browse mode, the collection of pages 1801 and the right side thickness 1803 can be clicked on again.

Repeated application of the hold-and-browse method while one or more collections of pages are in the hold-and-browse mode can create recursive "sub books" as depicted in FIG. 38.

To effect all the complex flipping actions depicted in FIGS. 19-39, all the basic input directions (the x-, y-, z-directions, or the r-direction for rotational or rocking input) of one or more browsing controllers (such as the browsing controllers depicted in FIGS. 12-16 and mounted on the browsing device 160 depicted in FIG. 4) and the bookmarking buttons of a browsing device (such as bookmarking buttons 170-177 and 180-187 on the browsing device 160 depicted in FIG. 4), together with a pointing device and its associated screen cursor can be used in combinations in the methods described above or in other combinations in other methods.

Figure 40:
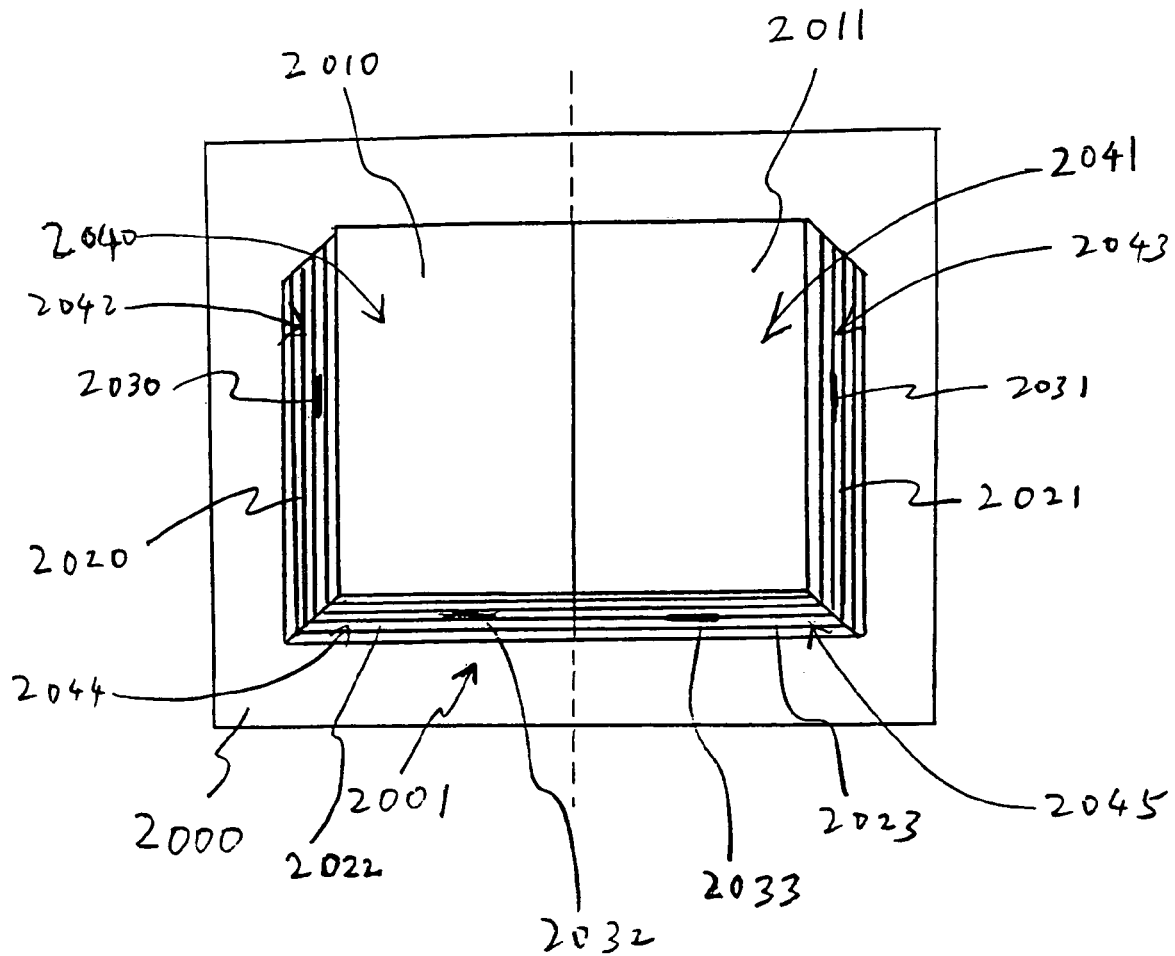
FIG. 40 is a top perspective view of a computer book showing the use of specific regions on the computer book through a touch screen to effect some basic flipping actions.
Figure 41:
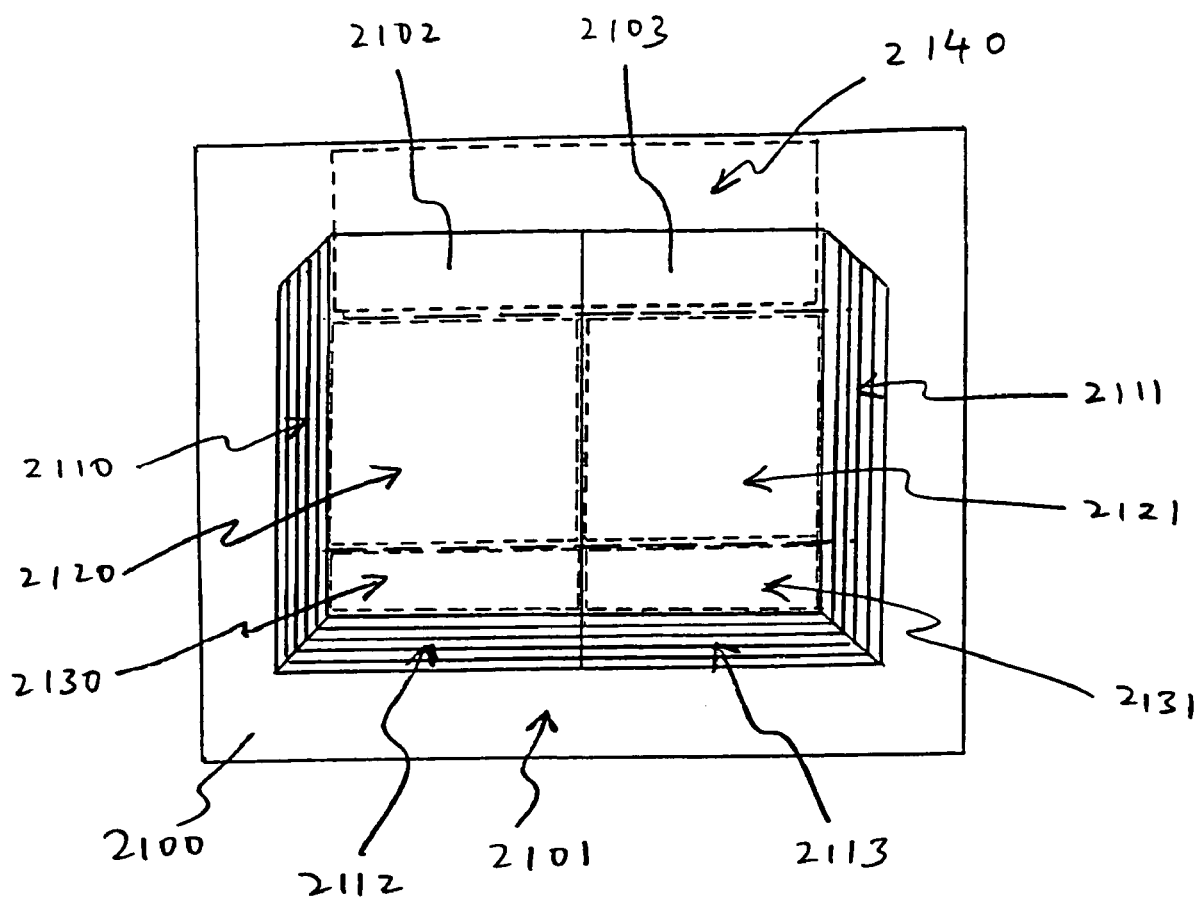
FIG. 41 is a top perspective view of a computer book showing the use of specific regions on the computer book through a touch screen to effect some complex flipping actions.
Figure 42:
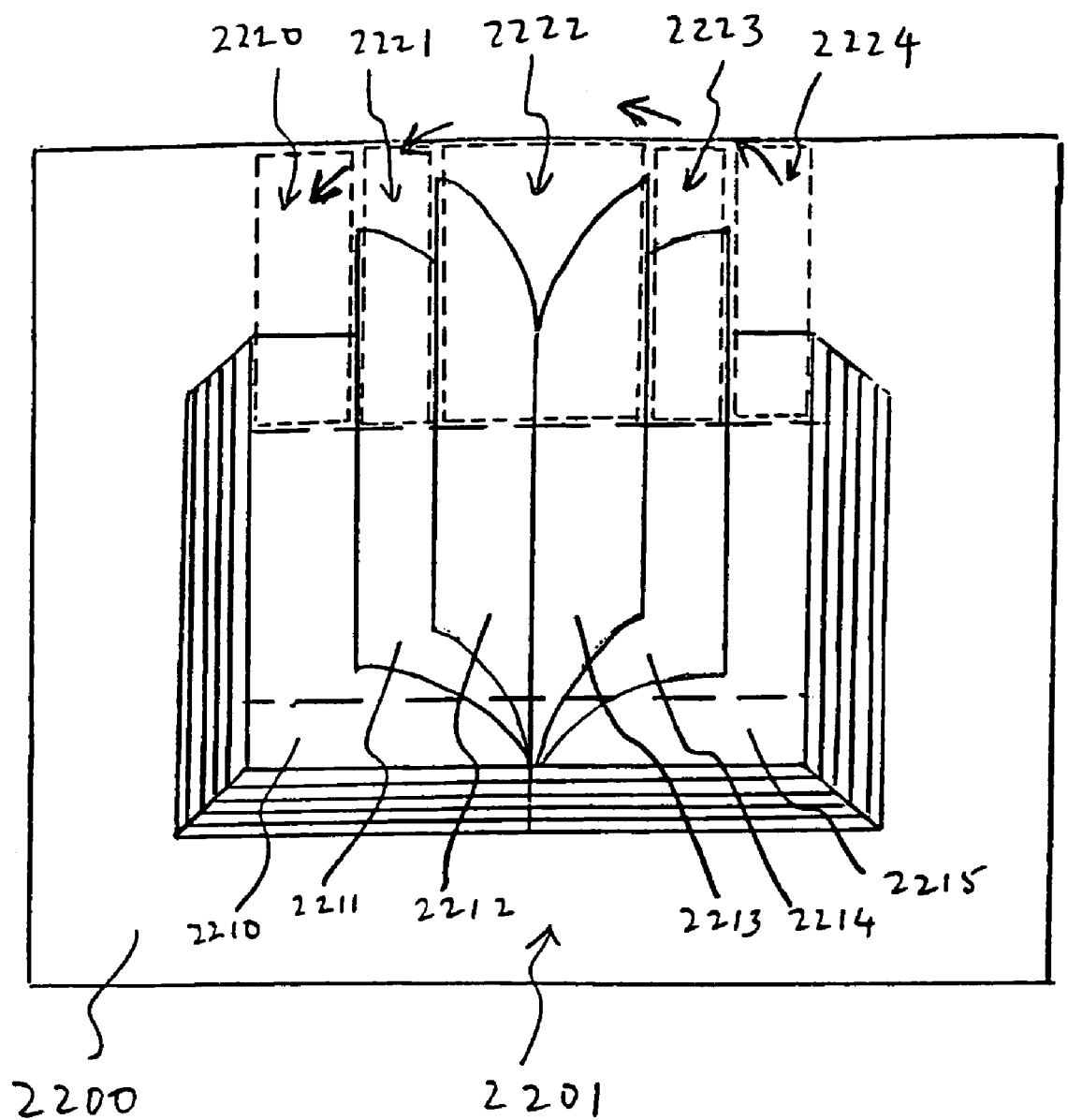
FIG. 42 is a top perspective view of a computer book showing the use of specific regions on the computer book through a touch screen to effect the opening-up actions of some regions on the flipping pages.

FIGS. 40-42 depict a screen-control method of effecting the various basic and complex flipping actions depicted in FIGS. 10-19.

FIG. 40 depicts one screen control method for effecting the basic actions of launching pages and jumping to selected pages. Basically the screen 2000 in which a book-like interface 2001 resides is divided into various areas for the activation and control of the various basic flipping actions. The computer book 2001 has a left-hand resting page 2010 and a right hand resting page 2011, a left side thickness 2020 and a right side thickness 2021, a left bottom thickness 2022 and a right bottom thickness 2023, a left side jump cursor 2030 and a right side jump cursor 2031, a left bottom jump cursor 2032 and a right bottom jump cursor 2033. The area defined by the outline of the left resting page 2010 is the left side page-launching area 2040 and the area defined by the outline of the right resting page 2011 is the right side page-launching area 2041. The area defined by the outline of the left side thickness 2020 is the left side jump-control area 2042 and the area defined by the outline of the right side thickness 2021 is the right side jump-control area 2043. The area defined by the outline of the left bottom thickness 2022 is the left bottom jump-control area 2044 and the area defined by the outline of the right bottom thickness 2023 is the right bottom jump-control area 2045.

These screen control areas 2040-2045 can be selected and activated through a cursor on the screen 2000 controlled by a pointing device (e.g., a computer mouse) or a touch screen superimposed on the screen 2000 and selected and activated by a finger or other instrument(s).

One method of using the left and right side page-launching areas 2040 and 2041 is to launch one page from the corresponding side in the respective direction (i.e., a page launched from the left side area 2040 will flip from left to right and vice versa) on each activation of the area involved. If more activations are effected within a given time, more pages will be launched and sent across the computer book 2001 within the given time. If a pointing device is used, this activation may be effected by placing a cursor in the corresponding area (2040 or 2041) and clicking the associated pointing device's button (e.g., the left button of a PC-type computer mouse such as Microsoft's IntelliMouse®). If a touch screen is used, this activation may be effected by a pressure applied on the screen either by a finger or an instrument within the corresponding area 2040 or 2041.

One method of using the left and right side jump-control areas 2042 and 2043 is by using either a pointing device to point at, select, move, and activate the respective jump cursors 2030 and 2031, or, if a touch screen is available, by using a pressure applied either by a finger or an instrument on the screen within the areas occupied by the respective cursors 2030 and 2031 to select, move and activate them. The left and right bottom jump-control areas 2044 and 2045 can be activated likewise.

All the jump-control areas 2042-2045 can also be activated by bookmarks, often residing with these areas and indicating points in the computer book 2001 that they bookmark, similar to the bookmarks (220-223, 230-233) shown in FIG. 6. One method is to use a pointing device to point at, select, and activate these bookmarks and hence activate a jump to the pages bookmarked. Another method, if a touch screen is available, is to use a finger or an instrument to apply pressure on the respective areas occupied by the bookmarks to select and activate them.

FIGS. 41 and 42 depict another screen control method for generating commands to achieve some or all of the basic and complex flipping actions depicted in FIGS. 17-39.

The control areas on the thicknesses, namely the left side jump-control area 2110, the right side jump-control area 2111, the left bottom jump-control area 2112, and the right bottom jump-control area 2113 are used in the same manner as those corresponding jump control areas 2042-2045 depicted in FIG. 40 and described above.

The left side page-launching area 2120 and the right side page-launching area 2121 are activated by either a pointing device that is positioned with the respective area followed by a click of the button associated with the pointing device, or if a touch screen is available, the positioning and pressure application of a finger or an instrument within the respective area. These page-launching areas 2120 and 2121 are smaller than the area occupied by the respective left and right opened pages (2102 and 2103) of the computer book 2101 because parts of the these areas are reserved for other controls to be described below.

These page-launching areas 2120 and 2121 can be used to control the pages much in the same way the left and right browsing controllers (163 and 164) on the browsing device 160 depicted in FIG. 4 are used to control the various complex flipping actions of the pages depicted in FIGS. 11-19 and described above. For example, each activation of the control area 2120 and 2121 is similar to each depressing and releasing of the browsing controllers 163 and 164. Therefore, pages can likewise be launched in a certain direction, in a certain frequency, and their directions can be changed by the activation of the appropriate page-launching areas 2120 and 2121.

In the upper parts of the pages 2102 and 2103 is the page-region opening-control area 2140. FIG. 42 depicts the operation of this area in detail.

The page-region opening action is like the flipping actions depicted in, say, FIGS. 21, 22, 23 in which a certain page or a group of pages are selected to have their flipping directions reversed in the midst of flipping across the computer screen. This results in, say, the "opening up" of a region 1121 as shown in FIG. 23.

FIG. 42 depicts a computer book 2201 on a computer screen 2200 with four pages 2211-2214 flipping from right to left and two resting pages 2210 and 2215 on the left and right sides of the computer book 2201 respectively. The page-region opening-control area 2140 at the upper part of the computer book 2101 depicted in FIG. 41 in which no page is shown to be flipping is now fragmented into 5 areas—areas 2220-2224 in the computer book 2201 as depicted in FIG. 42. Each of these control areas 2220-2224 controls a region between two successive flipping pages or one flipping page and one of the resting pages 2210 and 2215. For example, area 2223 controls a region between flipping pages 2213 and 2214 and area 2220 controls a region between one resting page 2210 and one flipping page 2211. Thus, associated with each control area is a left bounding page and a right bounding page. For example, the control area 2221 has a left bounding page 2211 and a right bounding page 2212.

The operation of these page-region opening-control areas 2220-2224 is as follows. If an activation is effected (for example, using a pointing device for selection and activation or using a touch screen) within an area, the left bounding page will change its direction of flipping to the direction of right to left, if its original direction of flipping is in the direction of left to right, and continue the same direction of flipping if its original direction of flipping is in the direction right to left. Similarly, the right bounding page (e.g., page will change its direction of flipping to the direction of left to right, if its original direction of flipping is in the direction of right to left, and continue the same direction of flipping if its original direction of flipping is in the direction left to right. The result of these operations is that the corresponding region between the left bounding page and right bounding page will "open up" much like that depicted in FIG. 23. For example, if the area selected is area 2221, its left bounding page 2211 will continue to flip from right to left but its right bounding page 2212 will change its direction of flipping to from left to right, thus opening up the region 2221.

The screen control method can be used to implement a novel method for controlling the speed of a single flipping page. Earlier we mentioned that there are two methods to characterize the speed of movement through a computer book, say the computer book 1000 in FIG. 10A. The speed of movement can be characterized by the number of pages (e.g., pages 1020-1022) that are flipped simultaneously across the computer book 1000 or the speed of movement of each flipping page (e.g., any one of the pages 1020-1022) as it flips from one side to the other side of the computer book 1000, or a combination of both of these. As we have described above, one method to change the number of pages launched in any given time interval, and hence the speed of movement through the computer book 1000 is to use one of the movements of the flipping browsing controller (say, one of those depicted in FIGS. 5-9). Another method is to use the screen control method by using, say, the area 2120 or 2121 depicted in FIG. 21. That is, if a touch screen is available over the displayed computer book 2101, more frequent tapping, using a finger or an instrument, on the corresponding area (2120 or 2121, depending on the intended direction of flipping) in a given time interval will correspond to more pages launched in that interval and hence a higher speed of movement through the computer book 2101 and vice versa. If a touch screen is not available, a pointing device and a cursor on the screen 2100 can also be used and a "clicking" action within the area 2120 or 2121 achieves similar effects. Now, there is a large space within the area 2120 or 2121 that can be tapped or clicked on. Another method to control the speed of movement of individual pages flipping across the computer book 2101 is to make the speed of flipping movement dependent on which part of the area 2120 or 2121 is clicked or tapped. That is, clicking once or tapping once in the area 2120 or 2121 launches a page, but the location within area 2120 or 2121 where the clicking or tapping takes place determines the speed of flipping movement of the launched page across the computer book 2101. This way, a very rapid change of the speed of movement through the computer book 2101 can be effected through the rapid change of the speed of flipping of each page as well as the rapid change of the number of pages launched in a given interval.

The screen control method can be used in conjunction with the methods described above using the browsing controllers (e.g., browsing controllers 163 and 164 in the browsing device 160 depicted in FIG. 4) to achieve some or all of the complex flipping actions depicted in FIGS. 19-39.

In other embodiments of the screen control method, the various areas on the screen can be used interchangeably and mapped differently to control the various basic and complex actions.

Figure 43:
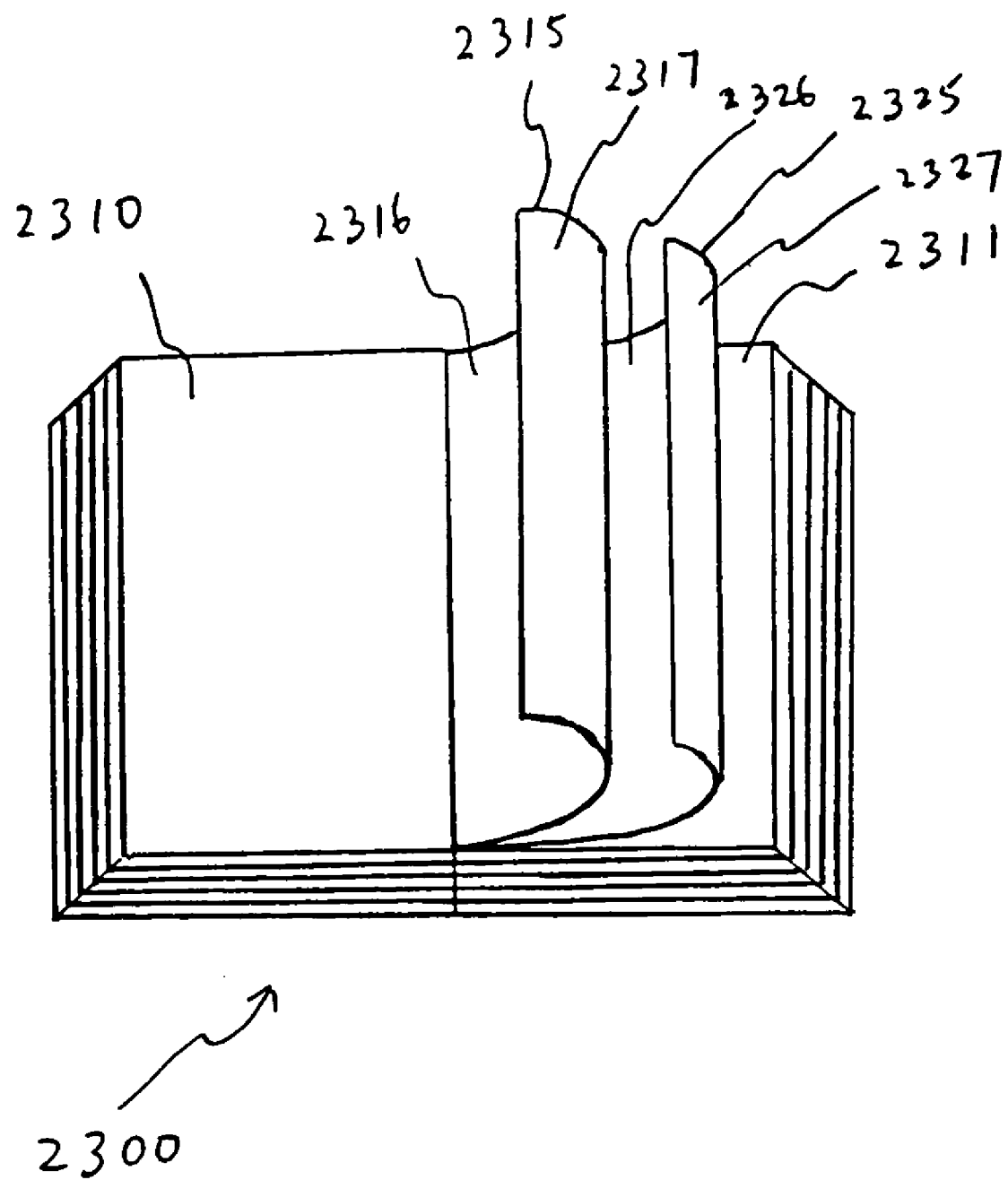
FIG. 43 is a top perspective view of a computer book showing a method of displaying the flipping pages that involved curling the pages until both sides of them can be seen.

FIG. 43 depicts a kind of curled flipping page (e.g., pages 2315 and 2325) in a computer book 2300 in which both sides of the page (sides 2316 and 2317 for the page 2315 and sides 2326 and 2327 for the page 2325) are visible. This can increase the amount of information seen at any given time and also provide better visual continuity of information from page to page.

Figure 44:
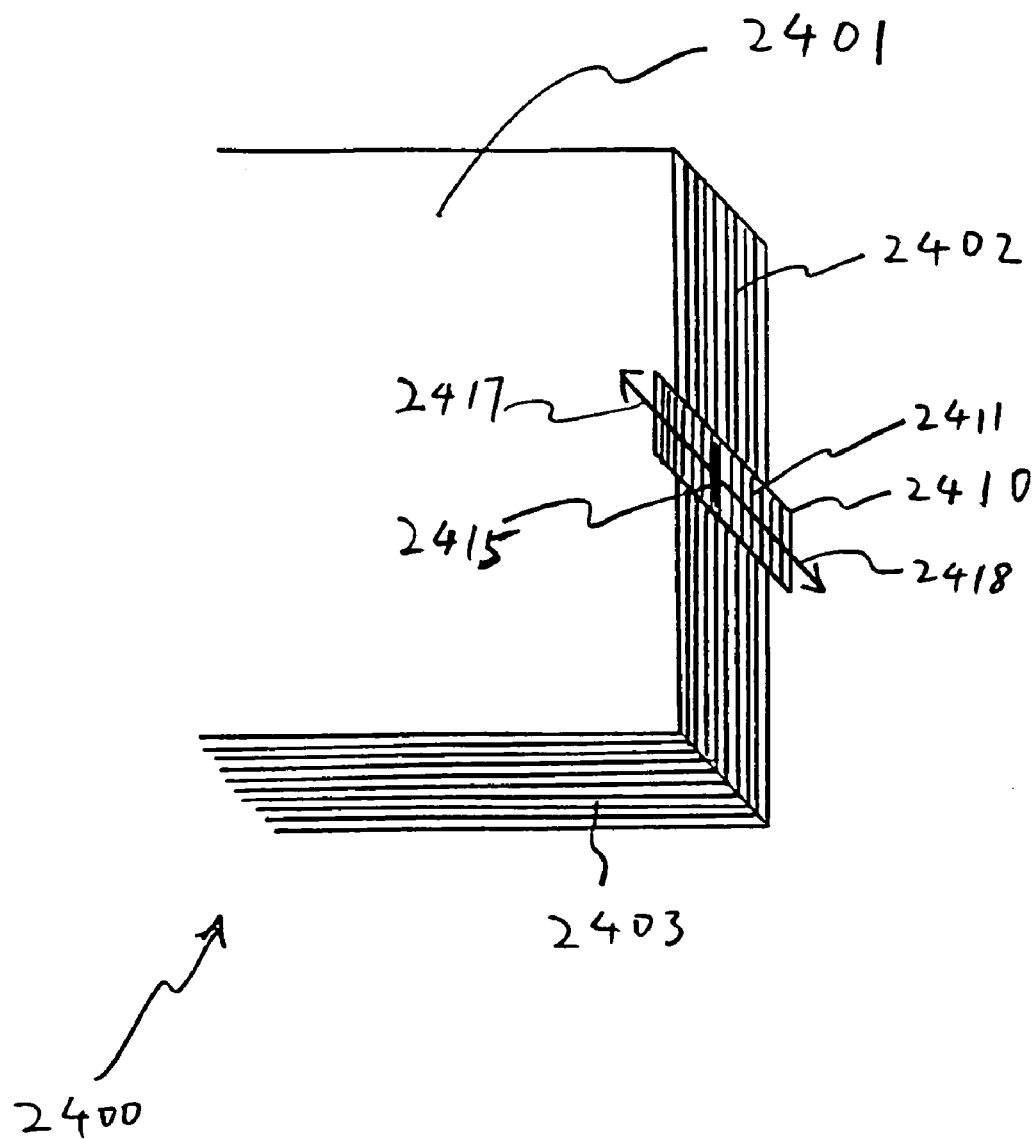
FIG. 44 is a top perspective view of part of a computer book showing the mechanisms for fine jump control.

FIG. 44 depicts a mechanism for fine jump cursor control. Because of the limited resolution of the computer screen, the thickness, say the right side thickness 2402, of the computer book 2400 may not have enough discrete points for the jump cursor 2415 to select any desired page on the right side of the computer book 2400, if there are more pages on the right side of the computer book 2400 than there are discrete steps on the thickness 2402 for the jump cursor 2415 to move through. One method to overcome this is to create an area 2410 within the thickness 2402 that allows the jump cursor 2415 to step through a number of discrete steps 2411 in both directions 2417 and 2418. The fine jump cursor control mechanism begins when the jump cursor 2415 is, say, at a certain point on the thickness 2402. Suppose that corresponds to a certain page X in the computer book 2400. The next discrete step that the jump cursor 2415 can take on the thickness 2402 corresponds to a certain page Y in the computer book 2400. Now, suppose X and Y are not contiguous pages and there are many pages in between them that the jump cursor 2415 cannot access directly on the thickness 2402 initially. The fine jump cursor control mechanism can now be initiated. A fine jump cursor control area 2410 is now created that surrounds the jump cursor 2415 in which the movement of the jump cursor 2415 in the area 2410 in the directions 2417 and 2418 will step through the intervening pages between pages X and Y, and thus allowing the selection of a desired page to jump to.

To signify that a fine jump cursor control mode is to be entered—i.e., a fine jump cursor control area 2410 is to be created—one method is to use a computer mouse button click. Alternatively, the speed of the movement of the jump cursor on the thickness 2402 can be used. A certain speed of movement of the jump cursor 2415 is normally present when the jump cursor 2415 is moving up and down the thickness 2402 to select a desired page to jump to. When this speed is reduced to below a certain value or when the speed is reduced to zero—i.e., then the jump cursor 2415 stops moving on the thickness 2402—the fine jump cursor control mode can be entered and the fine jump cursor control area 2410 can be created around the jump cursor 2415 for the purpose of fine jump cursor control. To exit the fine jump cursor control mode—i.e., to remove the fine jump cursor control area 2410 and return the jump cursor to the usual thickness area 2402—one method is to use a computer mouse button click. Alternatively, the speed of the movement of the jump cursor 2415 on the fine jump cursor control area 2410 can be used. If the speed of movement in the directions 2417 or 2418 of the jump cursor 2415 on the fine jump cursor control area 2410 exceeds a certain speed; the fine jump cursor control area 2410 will disappear and the jump cursor 2415 will return to the thickness 2402 at an appropriate point.

Figure 45:
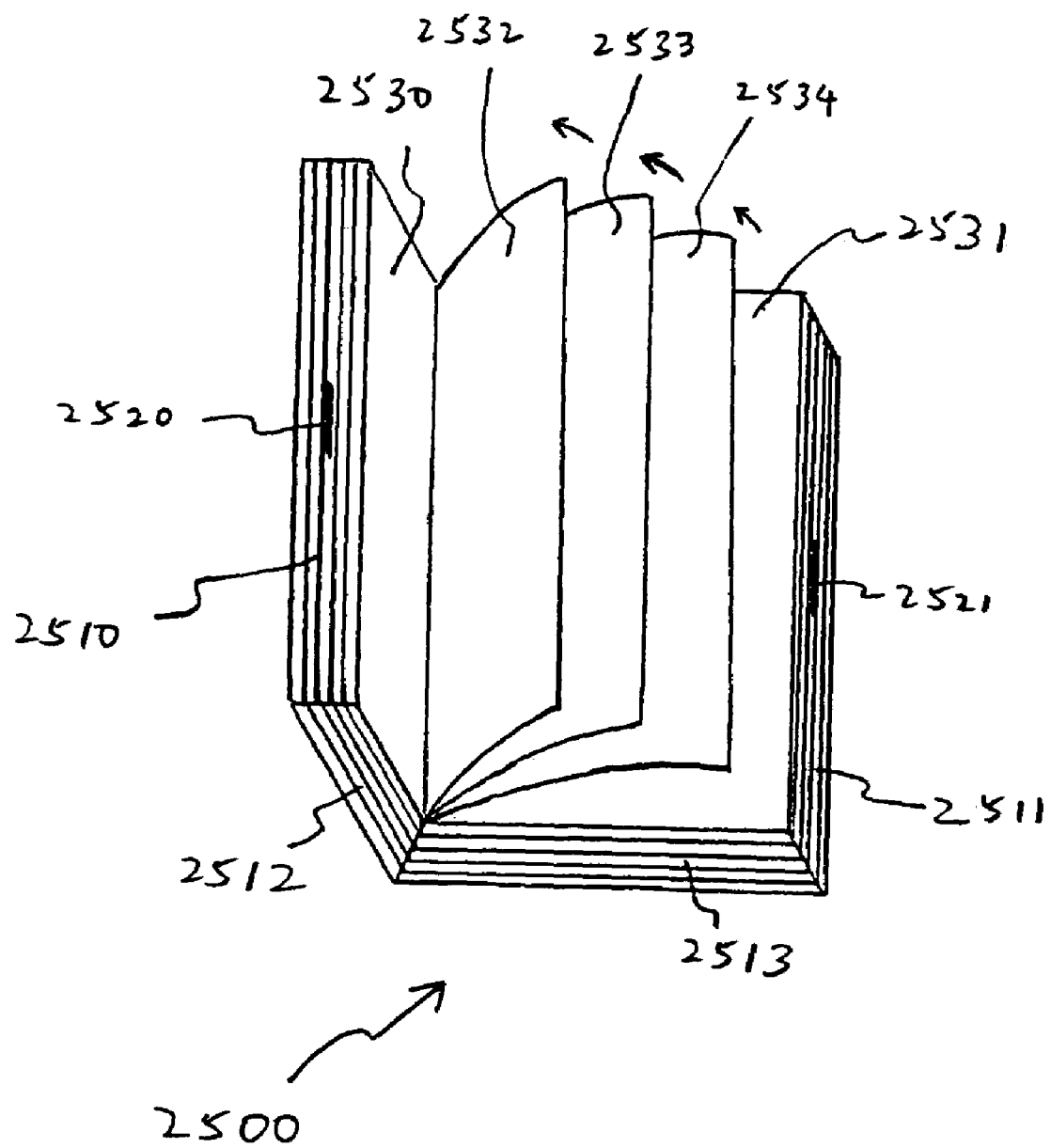
FIG. 45 is a top perspective view of a computer book showing one side of the computer book being bent inward for the purpose of reducing screen space needed.

FIG. 45 depicts a one-sided book-interface display 2500. Instead of displaying a fully visible, say left side, of a book, such as in the case of the computer book 200 depicted in FIG. 6, the computer book 2500 has a slanted, almost vertical left side. On that side, the usual resting page 2530 may be displayed. The left side thickness 2510 and its corresponding jump cursor 2520 and the left bottom thickness 2512 likewise may be displayed. The right side of the computer book 2500 has the usual resting page 2531, the right side thickness 2511 and its corresponding jump cursor 2521, and the right bottom thickness 2513. A number of flipping pages 2532-2534 are shown to be flipping from the right to the left, subsequently merging into the left side of the computer book 2500. All the basic and complex flipping actions described above can likewise be applied to this one-sided computer book 2500. The one-sided computer book display 2500 is useful if the computer screen space is limited.

Figure 46:
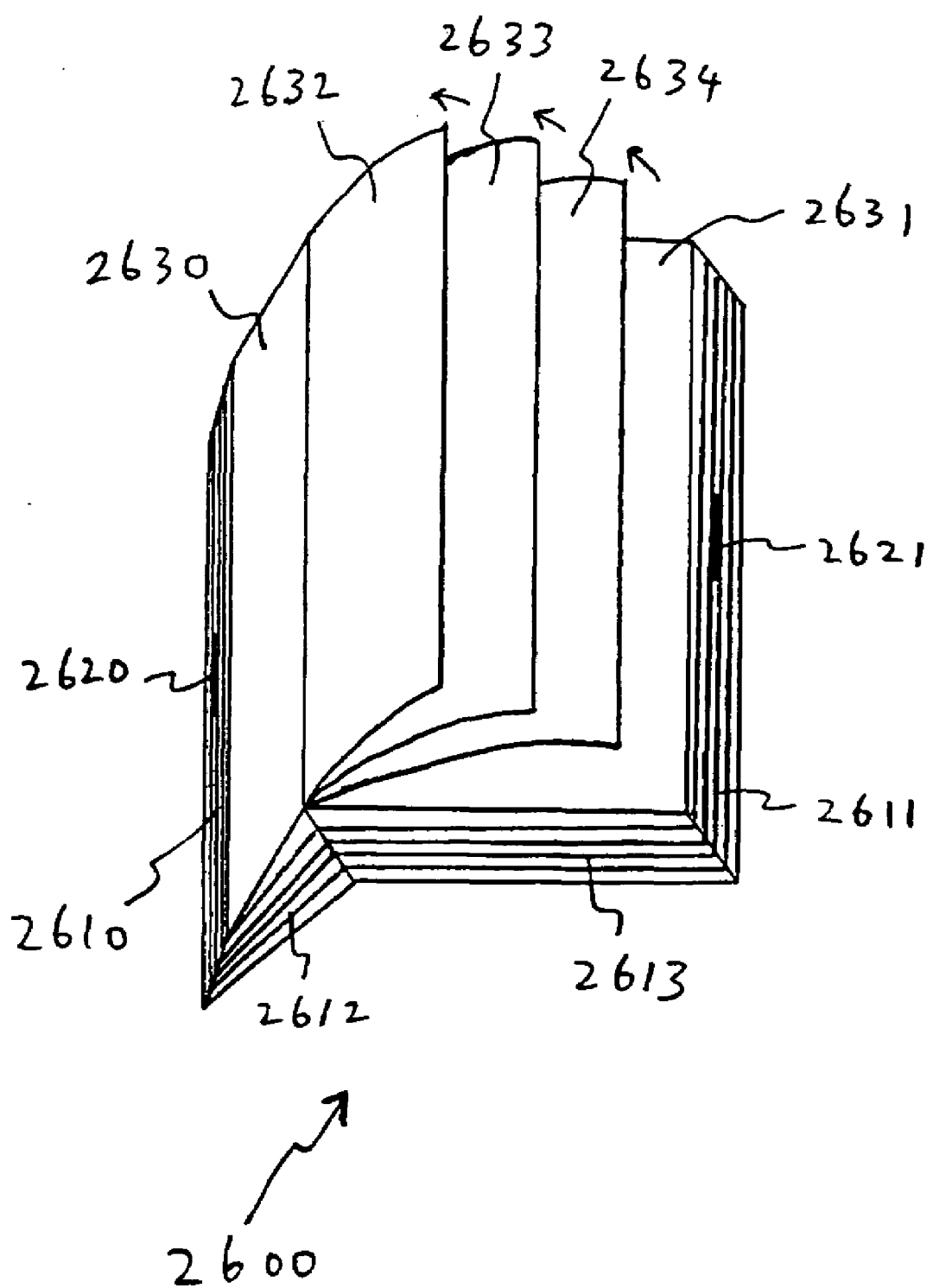
FIG. 46 is a top perspective view of a computer book showing one side of the computer book being bent outward for the purpose of reducing screen space needed.

FIG. 46 depicts yet another one-sided book-interface display 2600. The left side of the book, instead of slanting inward toward the midline of the computer book 2600 like in the case of the computer book 2500 depicted in FIG. 45, slants outward. The usual left and right side thicknesses 2610 and 2611, the corresponding left and right side jump cursors 2620 and 2621, the usual left and right bottom thicknesses 2612 and 2613, the left and right resting pages 2630 and 2631, and the flipping pages 2632-2634 can all be present on the computer book 2600.

Using commercially available computer hardware and software, one method of generating flipping pages from a document stored in semiconductor, magnetic, optical, or other media on a personal (e.g. laptop) computer in the form of a text file, such as a text file in the Windows 95 operating system involves several steps. First, the contents of the text file is displayed on the computer screen (such as an IBM Color Monitor G50, part Number 96G1593) using, say a word processing software such as Microsoft® Word Version 7.0 from Microsoft Corporation, Part Number 62306 running on the computer. The image on the computer screen which is stored in the screen dump can then be put into the clipboard using the "Print Screen" key on the keyboard (such as an IBM Keyboard, Part Number 06H9742). The clipboard can be imported as an image file into a graphics software such as Visioneer PaperPort™ from Visioneer Communications, Inc. of Palo Alto, Calif., Part Number C1132-90000 running on the computer using the "Paste" command provided by the software, and then exported and stored as an image file in, say, the TIFF format. Each page in the document can be captured in this way in one TIFF file. Then, using a video editing/movie making software such as Adobe Premier™ 4.0 from Adobe Systems Incorporated of Mountain View, Calif., part. Number 02970103 running on the computer, the TIFF files, each containing one page of the document, can be imported into the software and using the Motion command and superimposition facilities provided by the software a "movie" of flipping pages can be generated and if necessary, exported and stored in a motion picture format such as a .AVI file.

For the purpose of the present invention, the various components/operations described above for generating flipping pages from an existing document file using currently available software are preferably integrated into a single software process that may be conveniently ported from one computer to the next and which requires minimal human intervention. An alternative method reads from the existing document file directly, generates the necessary images for all the pages, and then creates a "motion picture" of flipping pages from these images. To move through the document forward or backward at any selected speed, mechanisms similar to forwarding or reversing at any selected speed when viewing a motion picture file (such as one in the .AVI format) using a software video player (such as Video for Windows from Microsoft Corporation) are used. The other features such as the thicknesses 210 and 212 (FIG. 6), the bookmarks 220-223 and 230-233 (FIG. 6) and the operations of bookmarking etc. are also incorporated.

While it is preferred to use off-the-shelf hardware and software to effect the flipping/flashing/scrolling/etc. effect, customized hardware and software can be used to perform an equivalent function.

The computer discussed above may also be the computer to which the controller connects, and may host the configuration software for providing user-customizable settings on the controller. For example, one user may wish to depress the controller platform by only 25% of the full range of motion to actuate a first function (such as launching a predetermined number of flipping pages), while a second user would prefer to have the setting at 50% to accomplish the same thing. These settings can initially be set via a computer-implemented calibration and preference setting program that is executed when the controller is used for the first time (or is later requested the user). The program saves in memory a list of user-defined parameters (such as 25% or 50% discussed above), which are then used when actually implementing the browsing operations for that user. Different user profiles may be saved in memory for different users, such that each user may enable his or her profile when using the controller.

Figure 47:
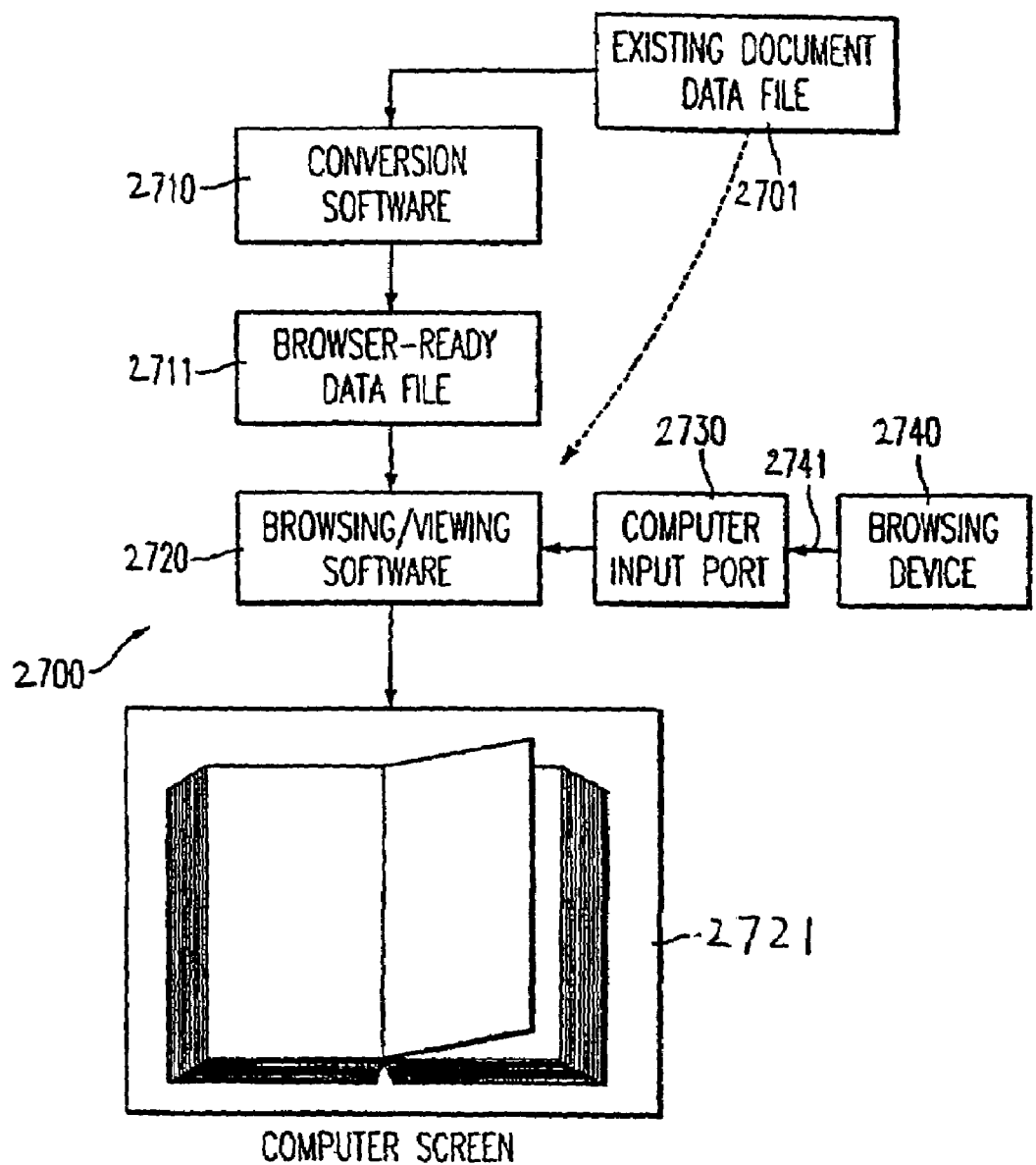
FIG. 47 is a schematic block diagram of the browsing system that incorporates the inventive browsing device of FIGS. 2-3.

FIG. 47 depicts an embodiment of a complete browsing system 2700, the software components for which are hosted on a computer. In this system 2700, a conversion software 2710 (a computer program coded in a "C programming language," for example) is provided to pre-convert the document 2701 to be viewed that is stored in the computer in whatever existing form (e.g., such as in the form of a text file, stored on the hard disk in the Windows 95 operating environment) to a form 2711 that allows one of the methods depicted in FIGS. 17-39 of moving through the document as described above or other methods to be implemented and to be used in conjunction with the browsing device 2740 (using one of the browsing controllers depicted in FIGS. 12-17 described above or other kind of browsing controllers). The document 2701 in its existing form on the computer can also be converted on the fly which may require specialized hardware to achieve the required speed of operation. During operation, a browsing/viewing software 2720 is also needed to convert the signals from the browsing device to effect all the operations on the document as described above. The browsing/viewing software 2720 (a computer program preferably coded in a "C programming language") takes as its data input either the pre-converted data file 2711 or the document in its existing form 2701 (to be converted on the fly during the browsing process). The browsing device 2740 sends the necessary signals through a bus 2741 (e.g., a 25 pin parallel port ribbon cable, although a serial bus, USB, or mouse line are example alternatives which require appropriate cooperating multiplexing circuitry) and to a computer input port 2730 (preferably a 25 pin parallel port, or alternatively a mouse port, USB port or a RS-232 port) to the browsing/viewing software 2720 to effect the necessary operations on the screen 2721 of the computer.

The above browsing system 2700 (FIG. 47) is adapted to be used in conjunction with any software method that allows the reorganization of the material in the document involved to facilitate browsing/viewing. For example, under software control, in conjunction with the use of a mouse-cum-cursor method, say, two or more pages in the document to be compared or parts of the document to be compared can all be brought together and displayed in the currently viewed page(s). This may be achieved by, say, using the mouse-cum-cursor to first select parts of the current viewed pages by clicking the mouse button and dragging the mouse like what is normally done or to select one of the currently viewed pages by double clicking on that page where the cursor is now positioned. And then, after moving to another part of the document, the cursor can now be positioned over a point on one of the currently viewed pages and the selected material can be brought into view by one click of the mouse button. The selected material, if it is one page full, will simply cover the page on which the cursor was placed before the one click of the mouse button to bring it into view. If the selected material is not one page full, it will be positioned, say, to the right and bottom of the cursor, and cover part of the page on which the cursor was placed before the one click of the mouse button to bring it into view. Another click of the mouse button will remove this temporarily placed material to allow one to see what was on the page originally. This temporarily placed material will also automatically disappear from the page on which it was placed after that page disappears from view after the user activates movement to other parts of the document.

The above browsing system 2700 can also be used in conjunction with any software method that allows the highlighting of selected portions of the material or annotations of the pages in the document involved to facilitate browsing/viewing/reading.

The above browsing system 2700 is suitable for use not just for browsing through or viewing documents that do not require any processing of their contents while they are being viewed, but also in conjunction with a word-processing system. Instead of creating a document and processing it on a computer screen like what is normally done, and then scroll up and down to view and browse through it using the usual mouse cum scroll bar method, the method of viewing and browsing through the document as described in the above browsing system 2700 can be used. When the word processing is used in conjunction with, say, the flipping method depicted in FIG. 18 of moving through the document, as one finishes entering material for the right-hand page, the page will flip over to reveal a new, empty page for the entering of material. As one deletes material until nothing is left on the currently viewed pages, continued deletion will effect a flipping back to the previous page.

The above browsing system 2700 is adapted for use in conjunction with any software in which there is information/icons of control "buttons" to be displayed, either for viewing or manipulating, that cannot be fitted within one computer screen. In this case, scrolling in conjunction with the use of a mouse is often done, or sub-menus and sub-operations can be selected by pressing icons of "buttons" on the screen. In the case of selection of sub-menus and sub-operations, the sub-menus or displays containing buttons for sub-operations are flashed on the screen once they are selected. When there is a large amount of this kind of information/operations present in the software, it will benefit from the use of the browsing system—the system can provide a good idea of what kinds of information/operations are available, where they can be found and how they are related to each other, as well as fast access to them. To be used in conjunction with the current browsing system 2700, these menus/sub-menus and buttons for operations/sub-operations can all be organized into a "book" and access to them can be effected by the browsing system 2700 described above.

Currently, the most popular and convenient form of human-computer interface is the "windows" interface. This interface grows out of the "desktop metaphor" in which manipulating items on a computer screen is likened to manipulating items on a desktop. This kind of interface, though it is a vast improvement over previous kinds of interface and is very friendly to use, still suffers from one of the problems of manipulating items on a desktop—a persons desktop tends to get very messy and things are hard to find when there are too many of them present. In the windows interface, when there are a lot of sub-directories/files within a directory that cannot be fitted within one window or one screen, they are to be located by scrolling through the use of a mouse, with all the attendant problems as described above for the browsing of information using this method. Also, when many windows are opened, they tend to obscure each other and those that are currently not in view are hard to find because their locations (in the "third dimension"—the "direction perpendicular to the screen") are not fixed, much like a scattered collection of papers on a desktop.

Figure 48:
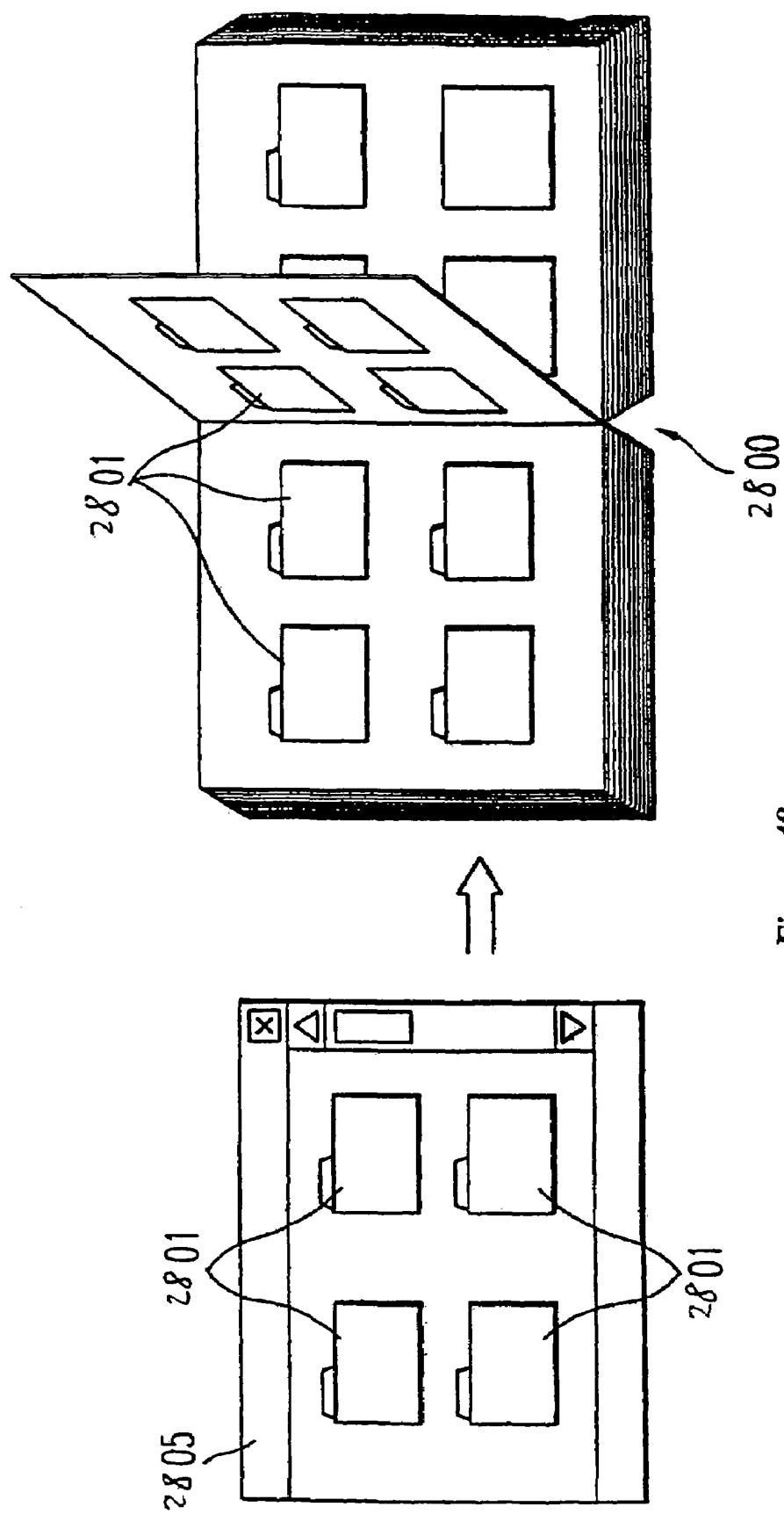
FIG. 48 is a comparative schematic diagram of directories/sub-directories in a "window" compared with pages of a computer book that uses the flipping method of FIG. 17 in order to move through the book.
Figure 49:
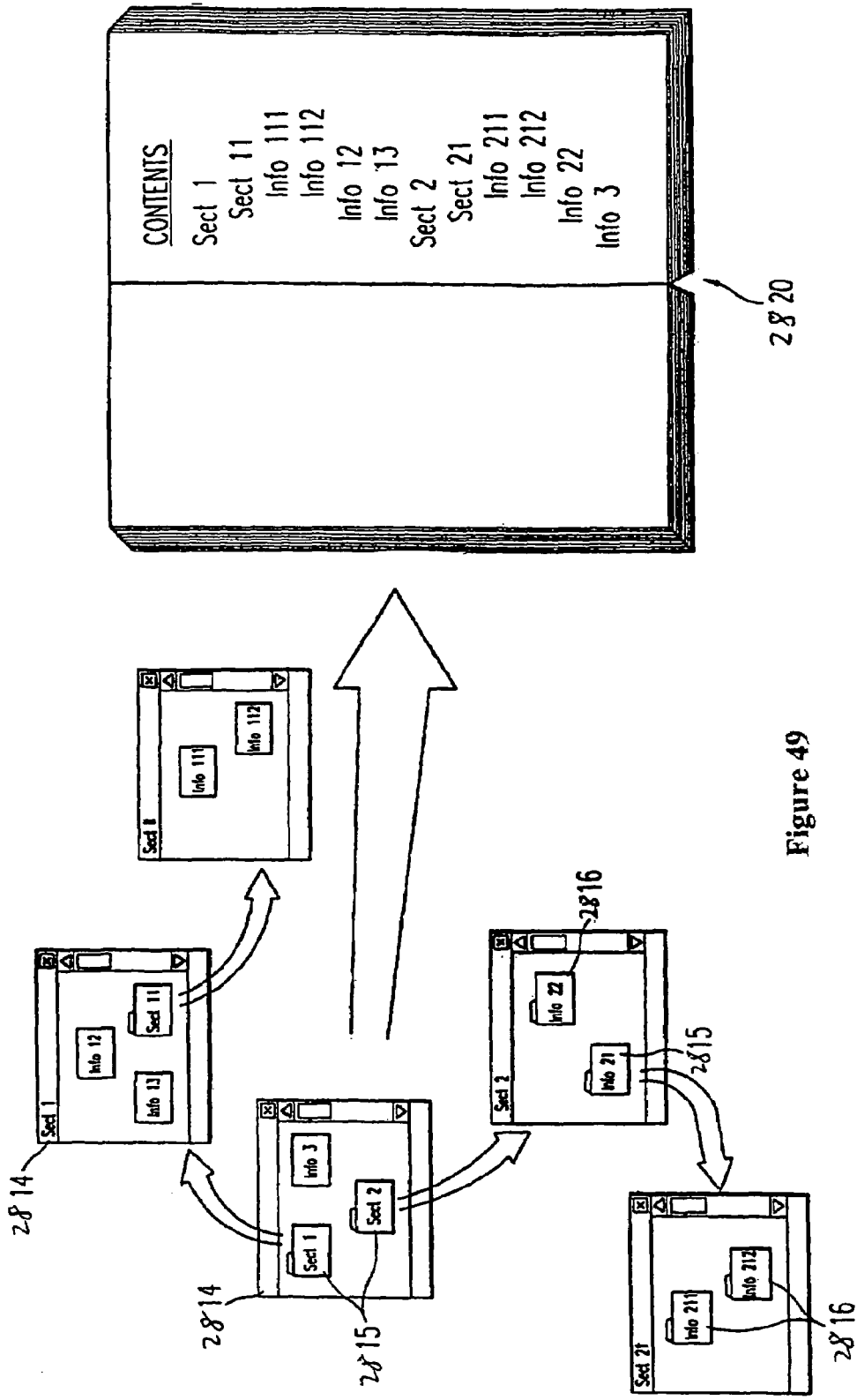
FIG. 49 is a comparative schematic diagram of directories/sub-directories and the files in a "windows" system compared with chapters and sections in a computer book that uses the flipping method of FIG. 17 to move through the book.
Figure 50:
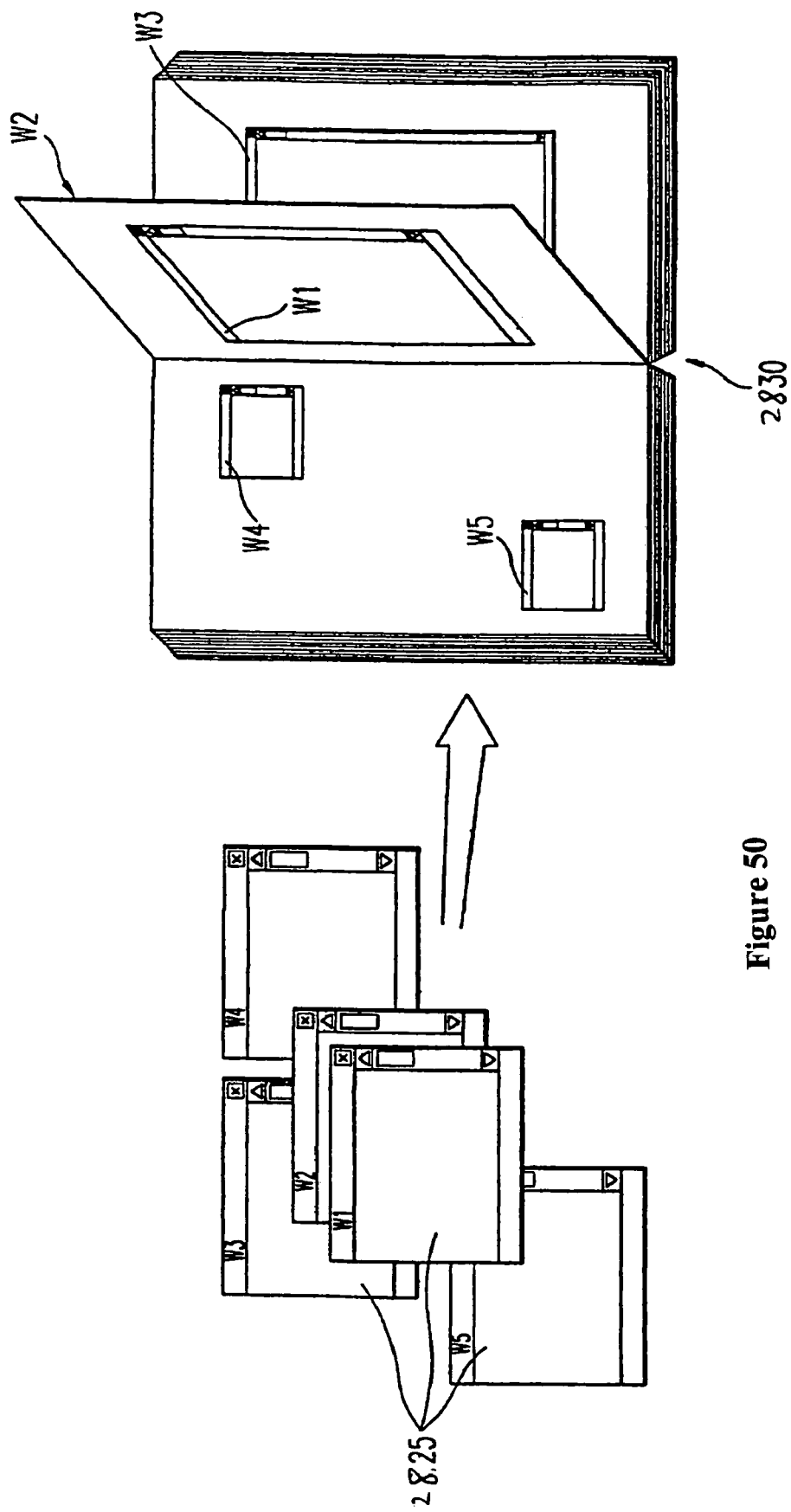
FIG. 50 is a comparative schematic diagram of working windows in a "windows" system compared with pages of a computer book that uses the flipping method of FIG. 17 to move through the book.

The human-computer interface can be improved by organizing these directories/sub-directories or temporary working windows into "books" to be manipulated by the browsing system 2700 described above. All information on the computer can be organized into one big book or more than one book at any given moment, hence the "library metaphor". There are at least three possible improvements: (a)

sub-directory and file icons that cannot be fitted onto one window/screen can be browsed through and better accessed if they are organized/implemented in a form to be used in conjunction with the browsing device/system 2700 described above FIG. 48 depicts one embodiment of this in conjunction with the flipping method depicted in FIG. 17 of moving through the document: items 2801—directories/sub-directories or files—in a window 2805 are placed in the pages of the computer book 2800 which is an instance of the computer book 1000 depicted in FIG. 17; (b) sub-directories 2815 (FIG. 49) and files 2816 that are normally found in windows 2814 in the current window-based systems can be organized into chapters, sections, etc. in a computer book 2820 (an instance of the computer book 1000 depicted in FIG. 17) instead and used in conjunction with the browsing system 2700, an embodiment of which is depicted in FIG. 49; and FIG. 50 items that are being worked on, either collections of files and sub-directories or the current working areas in a software (such as a word-processor) which current systems present in "windows", can be organized into pages in a "scrap book" to be used in conjunction with the browsing system 2700 with its attendant advantages. FIG. 50 depicts one embodiment of this in conjunction with the flipping method depicted in FIG. 17 of moving through the document. Either each window 2825 maps onto one page or many windows 2825 can map onto one page in a computer book 2830 (an instance of the computer book 1000 depicted in FIG. 17).

Figure 51:
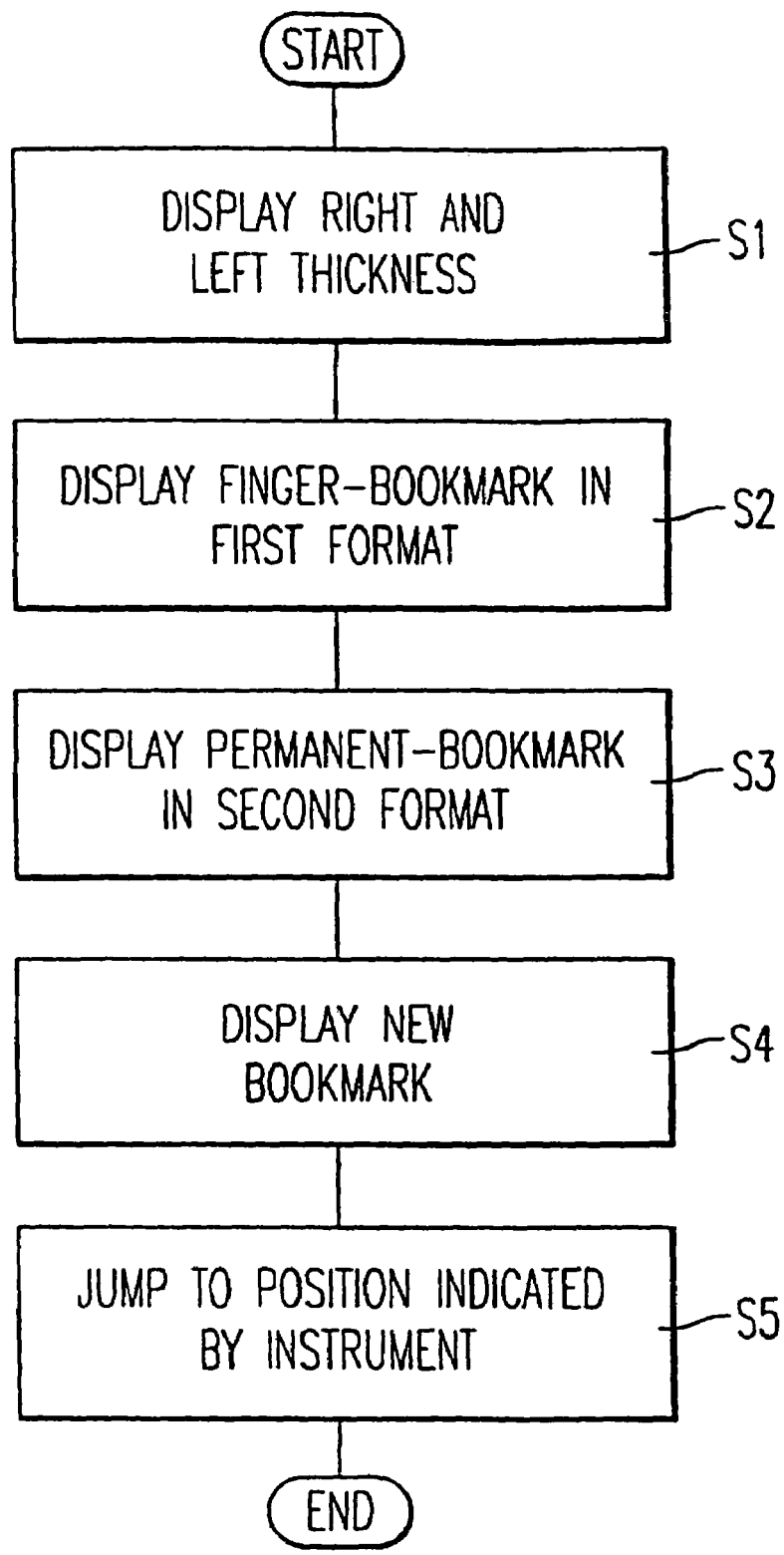
FIG. 51 is a flowchart of a method for displaying a set of information on a display screen as controlled by a browsing device.

FIG. 51 describes a method for displaying a computer-based set of information on a display screen controlled by the inventive browsing device. Step S1 displays a thickness image of a set of information corresponding to the size of a data file which holds the set of information. The thickness image includes a left side portion and a right side portion which are displayed on the display screen. The left side portion of the thickness image is displayed on the left side of the screen and is proportional to an amount of the information that precedes a given point in the set of information that is currently being displayed on the display screen. The right-hand portion of the thickness image is displayed on the right-hand side of the display and is proportional to an amount of the information that comes after the point as currently displayed on the display screen. For example, if the currently displayed point is near the end of the document, the left-hand side of the display will have a thickness image that appears thicker than that on the right-hand side.

After step S1, the process flows to step S2 where all existing finger-bookmarks are displayed in a first image format. Then, in step S3, all existing permanent-bookmarks, are displayed in a second format. Both the finger-bookmarks and the permanent-bookmarks are displayed in the location in the thickness display corresponding to the locations of the material they bookmark. Then the process flows to step S4 where the user elects to bookmark the currently viewed material and a new bookmark (finger-bookmark or permanent bookmark) is added to the display. After S4, the process flows to step S5 where a position within the set of information is jumped to in response to a jump position indicated by the instrument (e.g., the user's finger). Once the position is jumped to, the process ends.

Figure 52:
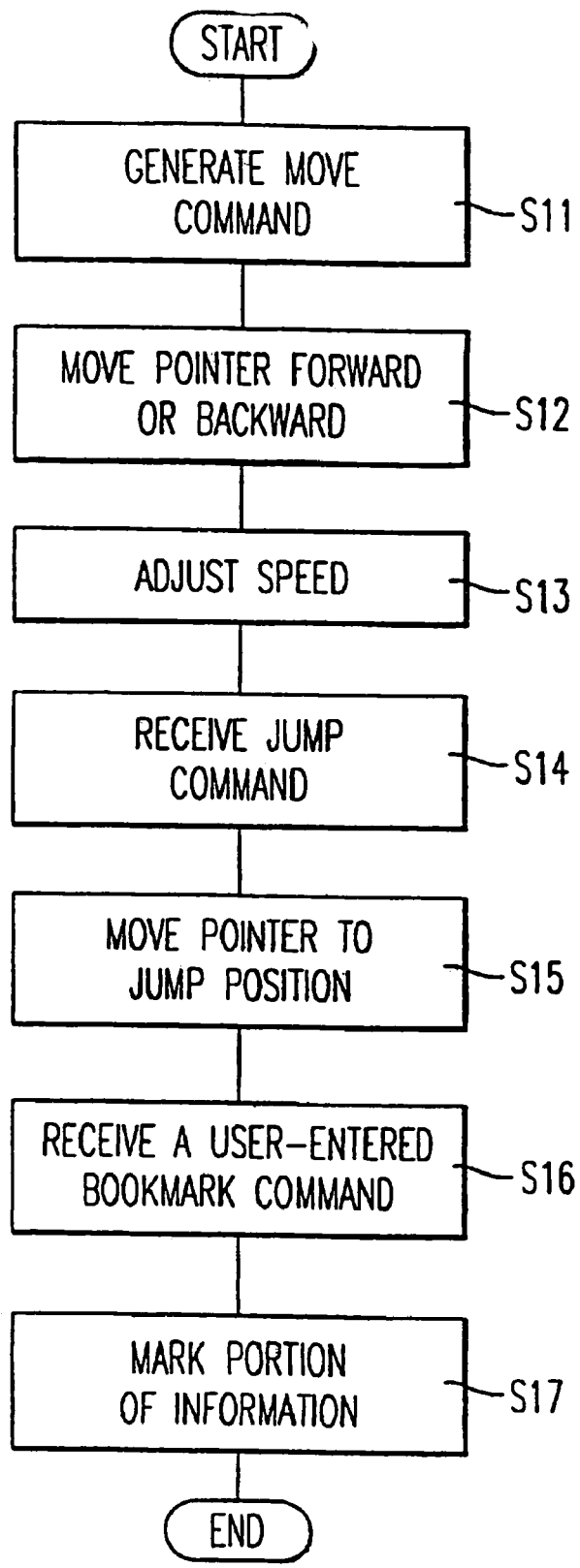
FIG. 52 is a flowchart of a method for browsing a set of information on a display screen.

FIG. 52 describes a method for browsing a computer-based set of information. The process starts in step S11 where a move command is generated to move a pointer through a set of information hosted on the computer either in a forward direction or a backward direction. The process then flows to step S12 where the pointer is moved in response to the command that was generated in step S11. The process then flows to step S13 where the speed of movement of the pointer through the information is adjusted. The process then flows to step S14 where a jump command is received. The process then flows to step S15 where a pointer is moved to a jump position in response to the received jump command. The process then moves to step S16 where a bookmark command is received to mark a desired portion of text or graphics information from the set of information. A user enters the bookmark command based on the desired portion of textual graphics. The process then moves to step S17 where the desired portion is marked in the set of information corresponding to the received bookmark command, after which the process ends.

Figure 53:
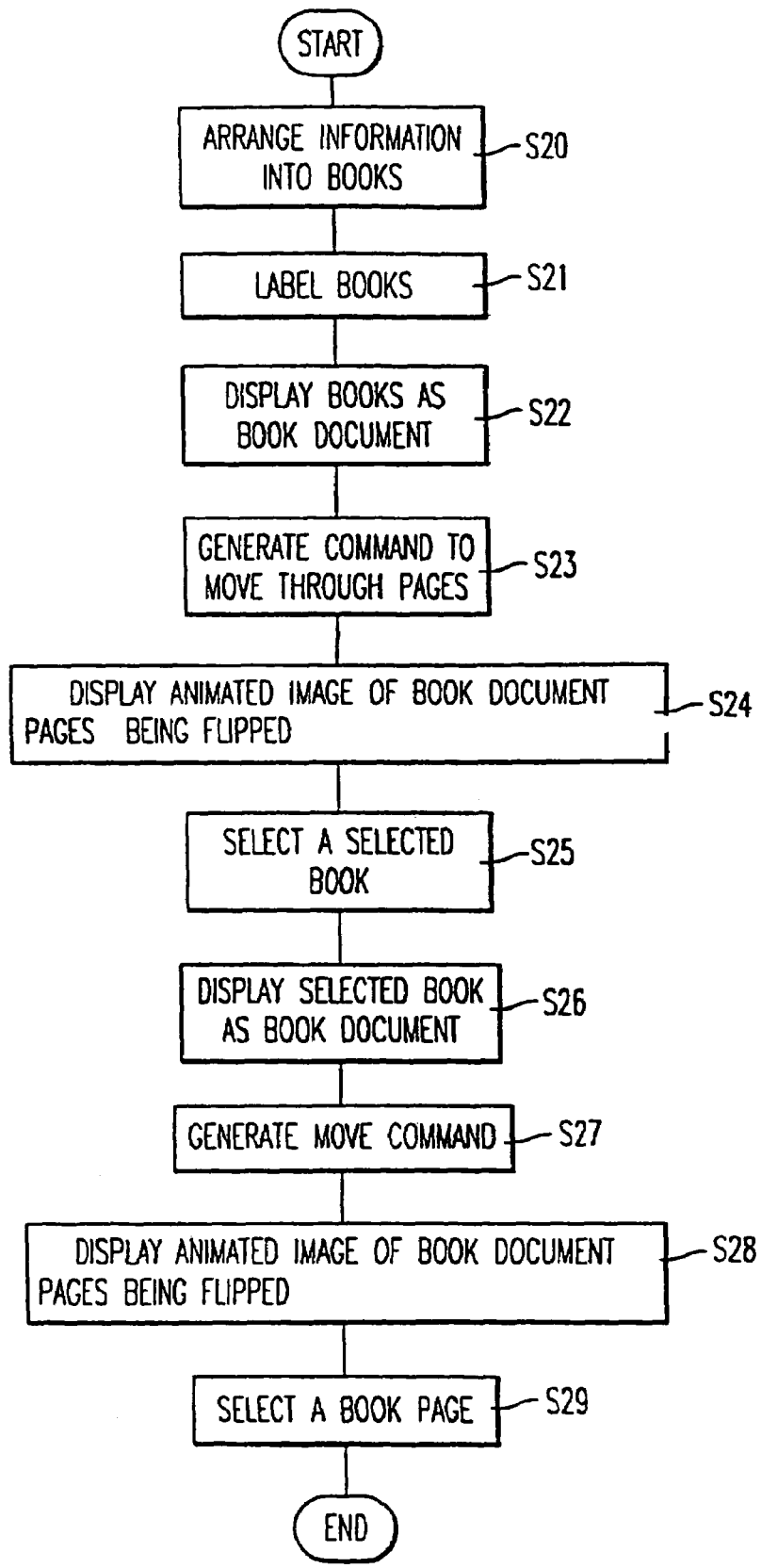
FIG. 53 is a flowchart of a user-interface method according to the library metaphor aspect of the present invention.

FIG. 53 is flowchart for a computer-interface process. The process starts in step S20 where a set of information hosted on the computer is arranged in a set of books. Each of the books includes a subset of the information from the set of information hosted on the computer. Once arranged, the process flows to step S21 where each of the books is labeled with a respective portion of the subset of information corresponding with each book. The process then flows to step S22 where, based on user input, a user can select a selected book by first viewing books which are displayed as a single book document image. The book document image is made up of individual pages that correspond to the respective portions of the books. The process then flows to step S23 where a command is generated, as actuated by the user, to move through the pages so that a user can view the individual pages and select a desired book. The process then flows to step S24 where the pages of the book are displayed in an animated image where the pages of the book document are being flipped on the screen. The process then flows to step S25 where, while viewing the animated image, the user via user input can select one of the pages. By selecting one of the pages, the user has selected the desired book. The process then flows to step S26 where the selected book is displayed as the image of a book document. However, pages of the selected book document include respective portions of the subset of information corresponding to the selected book. The process then flows to step S27 where a move command is generated for moving a pointer through a subset of the pages of the selected book. The process then flows to step S28 where an animated image is displayed of the pages in the selected book being shown as being flipped on the screen. The process then flows to step S29 where a selected book page of the selected book is selected by the user via a user input indication. Once the user has selected the desired book page, the process ends.

While particular embodiments of the present invention have been illustrated and described, it will be appreciated that numerous changes and modifications will occur to those skilled in the art, and it is intended that the appended claims cover all those changes and modifications which fall within the spirit and scope of the present invention. In particular, a number of electromechanical embodiments have been described herein with regard to the controller device. In view of the teachings herein, it should be recognized that the electrical signals could be generated with other devices that provide an electrical signal and tactile feedback in reply to a user applying pressure to the controller. Thus, the controller need not include spring members to provide the tactile feedback, but other bodies such as resilient solid members like rubber with embedded piezoelectric materials, or active electromechanical feedback mechanisms, such as active devices like electromagnetic members, or even gas inflatable bladders may be used as well.

As one example, the above description has been provided in the context of displaying an e-book on a monitor of a laptop or desktop computer. However, the controllers and interface control methods are equally applicable in other processor-based devices that have a visual display. Palm-top computers, personal digital assistants, and mobile phone displays are all equally applicable devices for hosting the mechanisms and methods described herein. Furthermore, the invention is applicable in the context of having the e-book displayed on all or just part of a television (e.g., digital HDTV). For example, either all or just a part of the HDTV screen can be dedicated to the display of the e-book and the controller embodiments described herein can interface with the television by way of a wireless (IR or RF) link to the HDTV video processor. Alternatively, a wired interface may be used as well, as previously discussed. Similarly, the HDTV display can be divided in half (or some other fraction) so that two people can use the same HDTV for different purposes: one person can watch television, while the other person can read an e-book. In this embodiment, the controllers described herein include a separate set of buttons, used to control the HDTV operations.

Obviously numerous modifications and variations of the present invention are possible in light of the above teachings. It is therefore to be understood that within the scope of the appended claims, the invention may be practiced otherwise than specifically described herein.

The invention claimed is:

1. A method for displaying a computer-based set of information on a display screen, comprising:
    displaying on said display screen a complex flipping image and a stationary page image, at least one of the complex flipping image and the stationary page image including a portion of the set of information,
    wherein said complex flipping image comprises at least one of
    a reverse-direction-of-a-single-last-trailing-page display,
    a reverse-direction-of-multiple-last-trailing-pages display,
    a reverse-direction-of-a-selected-group-of-flipping-pages display,
    an unfreeze-frozen-pages-and-let-pages-all-flip-in-a-same-direction display,
    an unfreeze-frozen-pages-and-let-subgroups-of-pages-flip-in-different-directions display,
    a launch-flipping-pages-while-a-thick-collection-of-pages-is-flipping display,
    a launch-at-least-one-other-thick-collections-of-pages-while-other-pages-are-flipping display,
    a move-at-least-one-of-a-held-pages-and-a-thick-collection-of-pages-in-a-selected-direction-and-at-a-selected-speed display,
    a-hold-a-single-page-in-mid-flip-and-collect-other-pages-that-flip-onto-the-single-page-in-mid-flip display,
    a hold-a-single-thick-collection-of-pages-in-mid-flip-and-collect-other-pages-that-flip-onto-the-single-thick-collection-of-pages-in-mid-flip-display,
    a-hold-at-least-one-of-a-single-page-and-a-thick-collection-of-pages-in-mid-flip-and-execute-at-least-one-of-the-set-of-page-flipping-commands-between-the-at-least-one-of-a-single-page-and-a-thick-collection-of-pages-in-mid-flip-and-a-thickness-of-a-side-of-a-book display,
    a-hold-at-least-one-of-two-pages-and-two-thick-collections-or-pages-in-mid-flip-and-displays-at-least-one-of-the-set-of-page-flipping-displays-between-the-at-least-one-of-two-pages-and-two-thick-collections-of-pages-in-mid-flip display,
    a select-to-hold-at-least-one-of-at-least-two-pages-and-at-least-two-thick-collections-of-pages display,
    a hold-a-single-thick-collection-of-pages-in-mid-flip-while-releasing-one-or-more-pages-from-the-collection display, and
    a select-a-desired-split-point-on-a-held-single-thick-collection-of-pages-in-mid-flip and-split-the-collection-of-pages-into-two-separate-collections-of-pages display.

2. The method of claim 1, further comprising:
    displaying on said display screen a first thickness image of the book image corresponding to an amount of said set of information on a first side and a second thickness image for the second side, said first thickness image being proportional to a first amount of information preceding a point in said set of information currently being displayed and said second thickness image being proportional to a second amount of information following the point in said set of information currently being displayed.

3. The method of claim 2, wherein said step of displaying a first thickness image comprises:
    displaying a left-side thickness of said book image as said first thickness image while keeping a right vertical edge thereof remaining stationary with respect to the display screen, displaying a right-side thickness of said book image as said second thickness image while keeping a left vertical edge thereof remaining stationary with respect to the display screen; and
    further comprising steps of
        changing the left-side thickness in response to moving through the set of information and generating a command to cause a left vertical edge of the displayed page to change position, and
        changing the right-side thickness in response to moving through the set of information and generating another command to cause a right vertical edge of the displayed page to change position.

4. The method of claim 2, further comprising:
    jumping to a selected page on at least one of said first thickness image and second thickness image, and displaying an animated image of skipped pages as a group of flipping pages moving across the screen, a thickness of said group of flipping pages being proportional to a number of the skipped pages.

5. The method of claim 2, further comprising:
    jumping to a selected page on at least one of said first thickness image and second thickness image;
    displaying an animated image of at least one skipped page flipping; and
    displaying a change in at least one of the first thickness image and the second thickness image.

6. The method of claim 5, wherein the change in at least one of the first thickness image and the second thickness image is proportional to an amount of skipped pages.

7. The method of claim 1, further comprising the steps of:
    displaying said set of information as a book image, said book image including at least a first thickness image and a second thickness image; and
    displaying a jump cursor on at least one of the first thickness image and the second thickness image, said jump cursor being user-activated and identifying a location in the set of information to which a jump operation will be made.

8. The method of claim 1, further comprising:

displaying said set of information as a book image;

displaying at least one of a thickness of a variable right-hand book thickness and a thickness of a variable left-hand book thickness, which are proportional to at least one of a disappearance of pages from one of the book right-side and the book left-side and an accumulation of pages on another of the book right-side and the book left-side, respectively.

9. The method of claim 1, further comprising:

displaying said set of information as book image, said book image including a thickness image; and displaying a bookmark in said thickness image.

10. The method of claim 9, wherein the bookmark is one of a permanent bookmark and a finger-bookmark.

11. The method of claim 1, further comprising:

displaying operating system entities on at least one of the displayed complex flipping image and the stationary page image.

12. The method of claim 11, wherein said operating system entities include at least one of an icon of a computer file, an icon of a directory, and a window of a software application user interface.

13. The method of claim 11, wherein said operating system entities include at least one of an icon of a computer file, an icon of a directory, and a window of a software application user interface.

14. The method of claim 1, further comprising:

displaying said set of information in a book image, wherein said set of information includes sub-directory and file icons.

15. The method of claim 1, further comprising:

organizing said set of information in a form of a table of contents; and displaying a book image, said book image including a page displaying the table of contents.

16. The method of claim 15, wherein the table of contents includes a hierarchal structure that organizes directories, sub-directories, and files.

17. The method of claim 1, further comprising:

displaying said set of information on the display screen, wherein said set of information includes working areas of a software application.

18. The method of claim 17, further comprising:

displaying said set of information in a book image, wherein the book image includes a page that displays one or more of the working areas of the software application.

19. The method of claim 1, further comprising:

while displaying said complex flipping image, fragmenting a control area into a plurality of fragments;

displaying each of the plurality of fragments on a different page of the electronic book; and using one of the plurality of fragments to control a region between two successive flipping page or one flipping page and one resting page.

* * * * *